United States Patent
Jiang et al.

(10) Patent No.: US 11,849,210 B2
(45) Date of Patent: Dec. 19, 2023

(54) PHOTOGRAPHING METHOD AND TERMINAL

(71) Applicant: Huawei Technologies Co., Ltd., Shenzhen (CN)

(72) Inventors: Xiuping Jiang, Wuhan (CN); Yunfei Qi, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 212 days.

(21) Appl. No.: 17/608,892

(22) PCT Filed: May 19, 2020

(86) PCT No.: PCT/CN2020/090945
§ 371 (c)(1),
(2) Date: Nov. 4, 2021

(87) PCT Pub. No.: WO2020/233553
PCT Pub. Date: Nov. 26, 2020

(65) Prior Publication Data
US 2022/0321795 A1 Oct. 6, 2022

(30) Foreign Application Priority Data
May 22, 2019 (CN) .......................... 201910430270.9

(51) Int. Cl.
*H04N 23/63* (2023.01)
*H04M 1/72403* (2021.01)
(Continued)

(52) U.S. Cl.
CPC ........ *H04N 23/632* (2023.01); *H04M 1/0214* (2013.01); *H04M 1/0268* (2013.01);
(Continued)

(58) Field of Classification Search
CPC .. H04N 5/2621; H04N 5/2624; H04N 23/632; H04N 23/62; H04N 23/50;
(Continued)

(56) References Cited

U.S. PATENT DOCUMENTS

2013/0321340 A1  12/2013  Seo et al.
2018/0088764 A1  3/2018  Lu et al.
(Continued)

FOREIGN PATENT DOCUMENTS

CN    105843574 A    8/2016
CN    106168892 A    11/2016
(Continued)

*Primary Examiner* — Kelly L Jerabek
(74) *Attorney, Agent, or Firm* — Conley Rose, P.C.

(57) ABSTRACT

A method includes detecting a first operation from a user to start a camera of an electronic device, when a display of the electronic device is unfolded to a plane state, starting a camera application, displaying a preview interface in a first display area of the display, where the preview interface includes a viewfinder frame, and the viewfinder frame includes a first picture, detecting a second operation from the user to indicate photographing, controlling the camera to perform a photographing action to generate a first multimedia file, simultaneously displaying the preview interface and a gallery application interface in the first display area of the display, where the gallery application interface displays the first multimedia file, and the gallery application interface includes a deletion control, detecting a deletion operation from the user, deleting the first multimedia file, and displaying the preview interface in the first display area of the display.

20 Claims, 75 Drawing Sheets

(51) Int. Cl.
  *H04M 1/02* (2006.01)
  *H04N 23/62* (2023.01)
(52) U.S. Cl.
  CPC ........ *H04M 1/72403* (2021.01); *H04N 23/62* (2023.01); *H04M 2250/52* (2013.01)
(58) Field of Classification Search
  CPC .. H04N 23/531; H04N 23/631; H04N 23/633; H04N 23/80; H04N 23/57; H04M 1/0214; H04M 1/0268; H04M 1/0245; H04M 1/72403; H04M 2250/52; H04M 2250/22; G06F 1/1652; G06F 1/1677
  See application file for complete search history.

(56) References Cited

U.S. PATENT DOCUMENTS

| | | | |
|---|---|---|---|
| 2018/0091660 A1 | 3/2018 | Lu et al. | |
| 2019/0042066 A1* | 2/2019 | Kim | .................... H04M 1/725 |
| 2020/0329178 A1* | 10/2020 | Moon | .................... G06F 1/1652 |
| 2021/0389873 A1* | 12/2021 | Chen | .................. G06Q 20/3274 |
| 2022/0222027 A1* | 7/2022 | Zhang | ................. H04M 1/0241 |

FOREIGN PATENT DOCUMENTS

| | | |
|---|---|---|
| CN | 107623793 A | 1/2018 |
| CN | 107770312 A | 3/2018 |
| CN | 107800878 A | 3/2018 |
| CN | 108076292 A | 5/2018 |
| CN | 108153900 A | 6/2018 |
| CN | 109348020 A | 2/2019 |
| CN | 109429005 A | 3/2019 |
| CN | 110401766 A | 11/2019 |
| EP | 2981050 A1 | 2/2016 |
| EP | 3035152 A1 | 6/2016 |
| EP | 3279763 A1 | 2/2018 |
| EP | 3288254 A1 | 2/2018 |
| WO | 2017057783 A1 | 4/2017 |
| WO | 2019027090 A1 | 2/2019 |

* cited by examiner

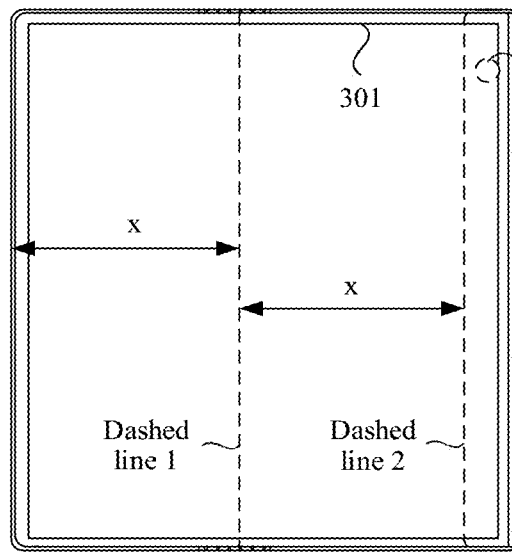 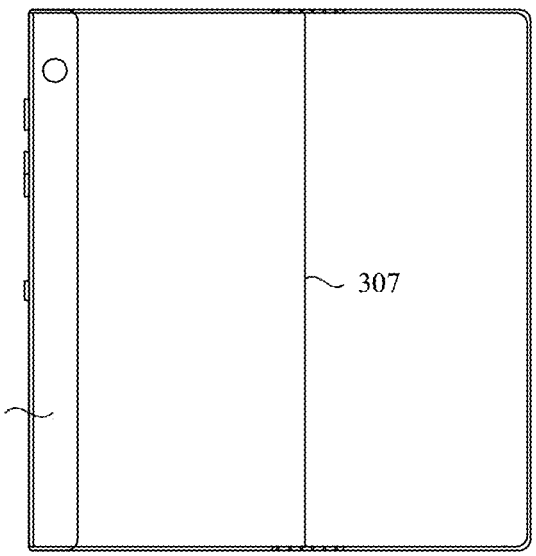
FIG. 3(a)　　　　　　　　FIG. 3(b)
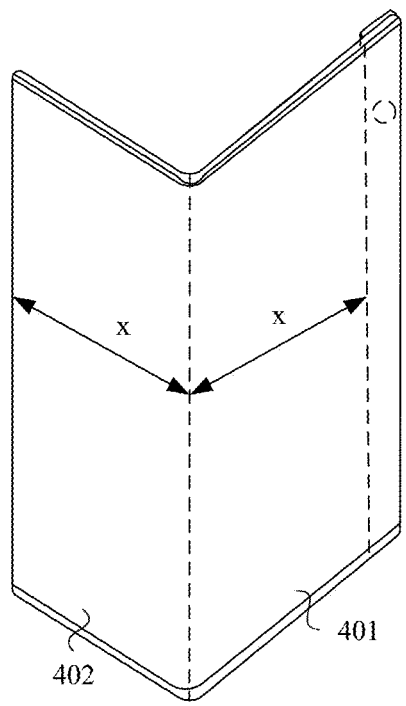 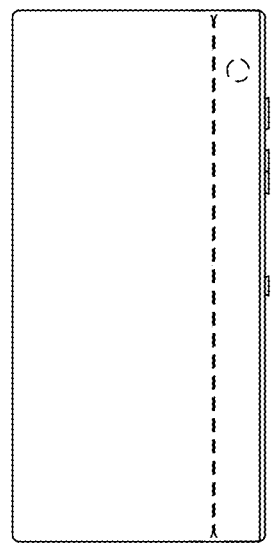 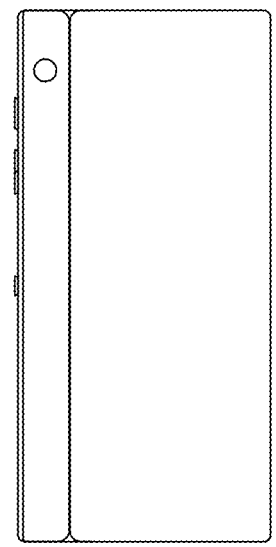
FIG. 4(a)　　　　FIG. 4(b)　　FIG. 4(c)

PHOTOGRAPHING METHOD AND TERMINAL

CROSS-REFERENCE TO RELATED APPLICATIONS

This is a U.S. National Stage of International Patent Application No. PCT/CN2020/090945 filed on May 19, 2020, which claims priority to Chinese Patent Application No. 201910430270.9 filed on May 22, 2019, both of which are hereby incorporated by reference in their entireties.

TECHNICAL FIELD

The present invention relates to the communications field, and in particular, to a photographing method and a terminal.

BACKGROUND

With upgrading of mobile terminals, the mobile terminals are developing towards foldable screens, such as Samsung Galaxy Fold and Huawei Mate X. Screen sizes and ratios of the mobile terminals have exceeded original ratios of 16:9/18:9 of common mobile phones. A larger screen size of the mobile terminal causes a stronger visual impact to a user. In addition, how to properly use a screen resource of the mobile terminal with a large screen size to avoid an unnecessary screen resource waste is also a current problem that deserves consideration.

A camera application and a gallery application are two related but independent applications. After capturing a picture on the mobile terminal, the user usually needs to process the captured picture in time. Therefore, it may be considered that the camera application and the gallery application are simultaneously displayed on a display of the mobile terminal. In the conventional technology, operations performed by a user on a camera application and a gallery application are independent. Generally, the user needs to manually to call the gallery application on a preview interface, so that the camera application and the gallery application can be simultaneously displayed on a display of an electronic device. Switching between the two modules requires the user to perform many operations, and consequently user experience is poor.

SUMMARY

The present invention provides a photographing method and a terminal. After detecting an operation performed by a user to indicate photographing, an electronic device may simultaneously display a preview interface and a gallery application interface on a display, so that the user can preview a captured picture while photographing in a photographing process, without manually calling a gallery application. This helps the user view the captured picture.

To achieve the foregoing objective, the following technical solutions are used in the embodiments of the present invention:

According to a first aspect, an embodiment of the present invention provides a photographing method, applied to an electronic device. A display of the electronic device is foldable, and the method includes: When the display of the electronic device is unfolded to a plane state, after detecting a first operation that is entered by a user and that is used to start a camera, the electronic device starts a camera application, and displays a preview interface in a first display area of the display, where the preview interface includes a viewfinder frame, and the viewfinder frame includes a first picture. After detecting a second operation that is entered by the user and that is used to indicate photographing, the electronic device controls, in response to the second operation, the camera to perform a photographing action to generate a first multimedia file, and simultaneously displays the preview interface and a gallery application interface in the first display area of the display, where the gallery application interface is used to display the first multimedia file, and the gallery application interface includes a deletion control. After detecting a deletion operation that is entered by the user and that is used to indicate deletion, the electronic device deletes the first multimedia file in response to the deletion operation, and displays the preview interface in the first display area of the display.

The multimedia file may be a picture or a video.

In this solution, the electronic device has a form of a foldable screen, and includes a foldable touchscreen, a camera configured to capture a picture, and a hinge used to fold the foldable screen. The camera may be located under the screen, inside the screen, or between the display and a rear cover, or may be located on a side bezel of the electronic device. The hinge of the foldable screen may or may not be located in the middle of the screen.

In this solution, the user displays the preview interface in the first display area of the display before photographing, and simultaneously displays the preview interface and the gallery application interface in the first display area after photographing, and the gallery application interface displays the photographed first multimedia file. This helps the user view the photographed multimedia file. The gallery application interface includes a deletion control, which is used to delete the first multimedia file. After photographing is completed, the user may quickly delete an unsatisfactory captured picture or video. After the deletion, the display of the electronic device resumes to the preview interface, and the user may choose to continue to perform a photographing operation.

With reference to the first aspect, in another possible implementation of the first aspect, the method further includes: When the display of the electronic device is in a folded state, after detecting the first operation that is entered by the user and that is used to start the camera, the electronic device starts the camera application, and displays the preview interface in a second display area of the display of the electronic device, where the second display area is a display area that faces the user when the display of the electronic device is in a folded state. After detecting the second operation that is entered by the user and that is used to indicate photographing, the electronic device controls, in response to the second operation, the camera to perform the photographing action to generate the first multimedia file. After detecting a third operation that is entered by the user and that is used to unfold the display of the electronic device from a folded state to a plane state, the electronic device simultaneously displays the preview interface and the gallery application interface in a third display area of the display of the electronic device in response to the third operation, where the gallery application interface includes the deletion control. After detecting the deletion operation that is entered by the user and that is used to indicate deletion, the electronic device deletes the first multimedia file in response to the deletion operation, and displays the preview interface in the third display area of the display.

The third display area is a display area that faces the user when the display of the electronic device is in an unfolded state, the third display area is greater than the second display area, and the third display area may be the same as or different from the first display area.

In this solution, the user may perform photographing when the foldable screen is in a folded state. When the foldable screen is in a folded state, a display area that faces the user is the second display area. In this case, the second display area displays the preview interface. After the user performs the photographing operation, the second display area still displays the preview picture, and the photographed first multimedia file is stored in a gallery. The user unfolds the foldable screen after the photographing. In this case, the third display area of the display of the electronic device simultaneously displays the preview interface and the gallery application interface, and the gallery application interface displays the photographed first multimedia file. The third display area is a display area that faces the user when the display of the electronic device is in an unfolded state, the third display area is greater than the second display area, and the third display area may be the same as or different from the first display area.

In another possible implementation, after the first display area of the electronic device simultaneously displays the preview interface and the gallery application interface, the method may further include: The gallery application interface includes an edition control. After detecting an edition operation entered by the user, the electronic device displays an edition interface in the first display area of the display of the electronic device in response to the edition operation. The edition operation corresponds to the edition control.

In this way, the user may edit the first multimedia file in the first display area.

In another possible implementation, after the third display area of the electronic device simultaneously displays the preview interface and the gallery application interface, the method may further include: The gallery application interface includes an edition control. After detecting an edition operation entered by the user, the electronic device displays an edition interface in the third display area of the display of the electronic device in response to the edition operation.

In this way, the user may edit the first multimedia file in the third display area.

In another possible implementation, after the preview interface and the gallery application interface are simultaneously displayed, the method may further include: The gallery application interface includes a back control. After detecting a back operation entered by the user, the electronic device displays, on the gallery application interface in response to the back operation, thumbnails of a plurality of multimedia files stored in the electronic device. The back operation corresponds to the back control.

In this way, the user may return to a gallery thumbnail interface, and quickly view, in a form of a small picture, the plurality of multimedia files stored in the gallery application.

In another possible implementation, that the electronic device detects a second operation that is used by the user to indicate photographing includes: The second operation is used to indicate the electronic device to perform a continuous photographing action, and the first multimedia file includes a plurality of continuously photographed multimedia files. That the gallery application interface is used to display the first multimedia file includes: The gallery application interface is used to display thumbnails of the plurality of continuously photographed multimedia files.

In this solution, the user may choose to perform a photographing operation in a continuous capture mode, and the electronic device may store a plurality of photographed multimedia files. After the photographing ends, the display of the electronic device simultaneously displays the preview interface and the gallery application interface, and the gallery application interface displays the continuously photographed multimedia files. This helps the user quickly view the plurality of continuously photographed multimedia files.

In another possible implementation, after the continuous photographing action is performed in response to the second operation, and the preview interface and the gallery application interface are simultaneously displayed, the method further includes: The gallery application interface includes a selection control. After detecting a selection operation entered by the user, the electronic device selects, in response to the selection operation, thumbnails of N continuously photographed multimedia files displayed on the gallery application interface, where N is a positive integer.

The selection operation corresponds to the selection control, and may be used to select the plurality of multimedia files. In this way, the user may select the thumbnails of the N continuously photographed multimedia files displayed on the application interface.

In another possible implementation, after the electronic device selects, in response to the selection operation, the thumbnails of the N continuously photographed multimedia files displayed on the gallery application interface, the method further includes: After detecting the deletion operation entered by the user, the electronic device deletes, in response to the deletion operation, the selected N continuously photographed multimedia files, where the gallery application interface is used to display thumbnails of unselected continuously photographed multimedia files.

In this way, the user may quickly delete the selected multimedia files, and after the deletion operation, the gallery application interface displays the thumbnails of the unselected continuously photographed multimedia files.

In another possible implementation, after the continuous photographing action is performed in response to the second operation, and the preview interface and the gallery application interface are simultaneously displayed, the method further includes: The electronic device detects a fourth operation entered by the user, where the fourth operation corresponds to a first thumbnail in the thumbnails of the continuously photographed multimedia files. In response to the fourth operation, the electronic device displays, on the gallery application interface, a multimedia file corresponding to the first thumbnail.

In this way, the user may choose to stretch one of the thumbnails of the plurality of continuously photographed multimedia files, and display the thumbnail on the gallery application interface. This facilitates viewing by the user.

In another possible implementation, that the electronic device starts a camera application in response to a first operation, and displays a preview interface in a first display area of the display includes: The electronic device starts the camera application in response to the first operation, and simultaneously displays the preview interface and a recommendation interface in the first display area of the display, where the recommendation interface is used to display photographing recommendation information.

In this solution, after the user starts the camera, the display simultaneously displays the preview interface and the recommendation interface, and the recommendation interface may be used to recommend a photographing guide for the user based on a factor such as a photographing location or weather, so that the user can view the photographing guide while performing photographing. After the electronic device detects the second operation that is used by the user to indicate photographing, the display of the electronic device simultaneously displays the preview interface and the gallery application interface in response to the second operation, where the gallery application interface is used to display the photographed first multimedia file.

According to another aspect, an embodiment of this application provides an electronic device, including: one or more cameras, configured to capture a picture; a display, configured to display an interface, where the display is foldable; and one or more processors, one or more memories, and one or more computer programs, where the one or more computer programs are stored in the memory, the one or more computer programs include instructions, and when the instructions are executed by the processor, the electronic device is enabled to perform the photographing method in any possible implementation of the foregoing aspect.

According to still another aspect, an embodiment of this application provides an electronic device, including:

a first detection unit, configured to: detect a first operation entered by a user, and send a first signal to a first processing unit based on the first operation, where the first processing unit is configured to: start a camera application based on the first signal, and display a preview interface in a first display area of a display;

a second detection unit, configured to: detect a second operation entered by the user, and send a second signal to a second processing unit based on the second operation, where the second processing unit is configured to: control, based on the second signal, a camera to perform a photographing action to generate a first multimedia file, and simultaneously display the preview interface and a gallery application interface in the first display area of the display, where the gallery application interface is used to display the first multimedia file, and the gallery application interface includes a deletion control; and the first display area of the display is used to simultaneously display the preview interface and the gallery application interface; and a third detection unit, configured to: detect a deletion operation entered by the user, and send a third signal to a third processing unit based on the deletion operation, where the third processing unit is configured to: delete the first multimedia file based on the third signal, and display the preview interface in the first display area of the display.

According to another aspect, an embodiment of this application provides a computer storage medium, including computer instructions. When the computer instructions are run on an electronic device, the electronic device is enabled to perform the photographing method in any possible implementation of the foregoing aspect.

According to still another aspect, an embodiment of this application provides a computer program product. When the computer program product is run on a computer, the computer is enabled to perform the photographing method in any possible implementation of the foregoing aspect.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

FIG. 3(a) and FIG. 3(b) are a schematic diagram when a foldable screen of an electronic device is in an unfolded state according to an embodiment of this application;

FIG. 4(a) to FIG. 4(c) are a schematic diagram when a foldable screen of an electronic device is in a folded state according to an embodiment of this application;

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
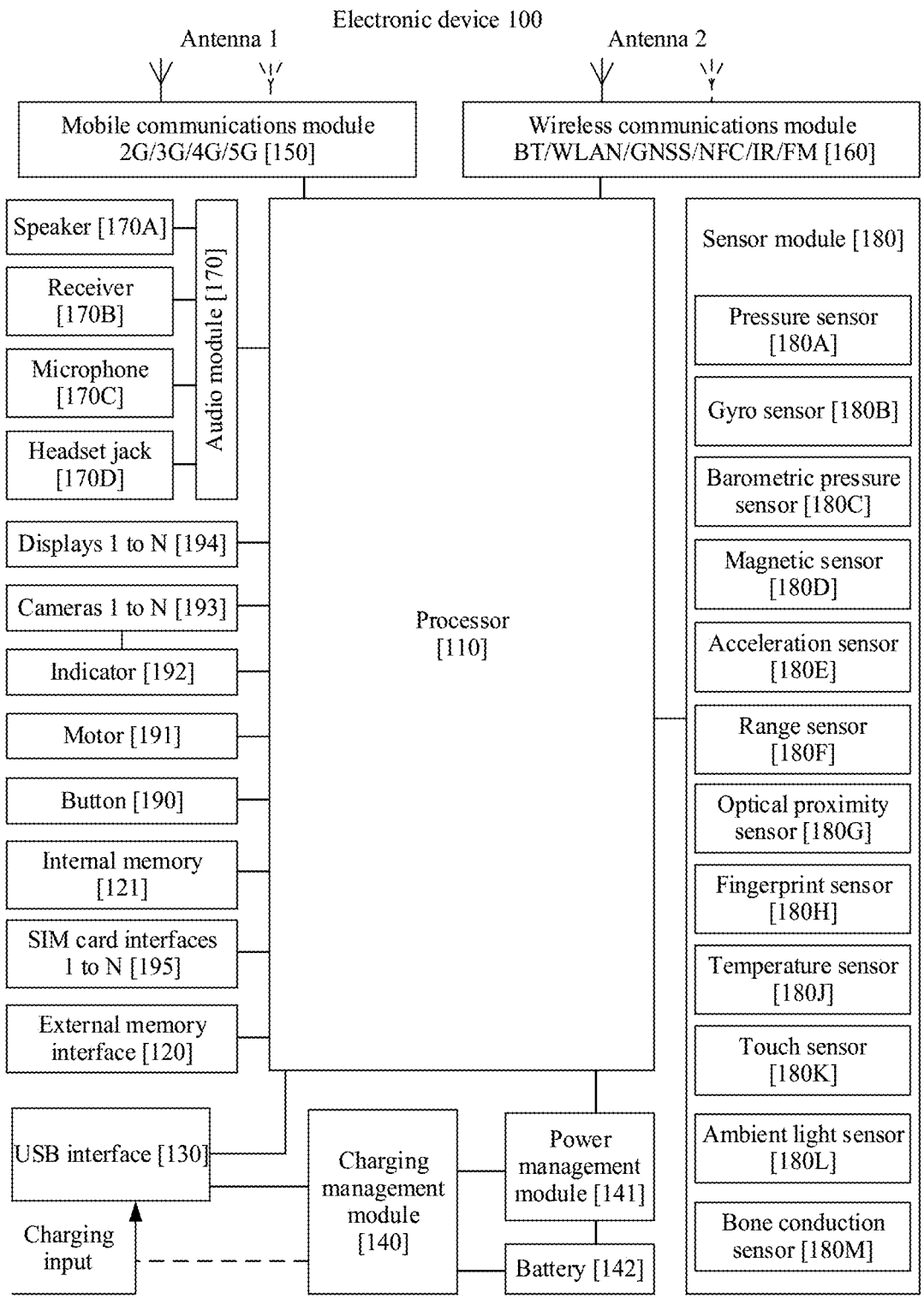
FIG. 1 is a schematic diagram of a hardware structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the schematic structure in this embodiment of this application does not constitute any specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

The memory may be further disposed in the processor 110, and is configured to store instructions and data. In some embodiments, the memory in the processor 110 is a cache. The memory may store instructions or data that are/is used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDL) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transmit the audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), or the like. In some embodiments, the processor 110 communicates with the camera 193 through the CSI interface, to implement a photographing function of the electronic device 100. The processor 110 communicates with the display 194 by using the DSI interface, to implement a display function of the electronic device 100.

The GPIO interface may be configured through software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may be alternatively configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface 130 may be used to connect to a charger for charging the electronic device 100, may be used to transmit data between the electronic device 100 and a peripheral device, or may be used to connect to a headset for playing audio through the headset. Alternatively, the interface may be used to connect to another electronic device, for example, an AR device.

It may be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from an interface connection manner in this embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect the battery 142 and the charging management module 140 to the processor 110. The power management module 141 receives input from the battery 142 and/or the charging management module 140, and supplies power to the processor 110, the internal memory 121, the external memory, the display 194, the camera 193, the wireless communications module 160, and the like. The power management unit 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be further multiplexed to improve antenna utilization. For example, the antenna 1 may be multiplexed as a diversity antenna in a wireless local area network. In other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then transferred to the application processor. The application processor outputs a sound signal by using an audio device (not limited to the speaker 170A, the receiver 170B, and the like), or displays an image or a video by using the display 194. In some embodiments, the modem processor may be an independent device. In some other embodiments, the modem processor may be independent of the processor 110, and is disposed in a same device with the mobile communication module 150 or another function module.

The wireless communications module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like and that is applied to the electronic device 100. The wireless communications module 160 may be one or more components integrating at least one communication processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave by using the antenna 2 for radiation.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-code division multiple access (time-division code division multiple access, TD-CDMA), long term evolution (long term evolution, LTE), a fifth-generation wireless communications system (5G, the 5th Generation of wireless communication system), BT, the GNSS, the WLAN, the NFC, the FM, the IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite systems, QZSS), a satellite based augmentation system (satellite based augmentation system, SBAS), and/or the like.

The electronic device 100 implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a miniLED, a microLED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 may implement the photographing function through the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge coupled device, CCD) or a complementary metal-oxide-semiconductor (complementary metal-oxide-semiconductor, CMOS) photoelectric transistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may further process another digital signal in addition to the digital image signal. For example, when the electronic device 100 selects a frequency, the digital signal processor is configured to perform Fourier transform on frequency energy and the like.

The video codec is configured to compress or decompress a digital video. The electronic device 100 may support one or more video codecs. Therefore, the electronic device 100 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. By using a biological neural network structure, for example, by using a mode of transmission between human brain neurons, the NPU can rapidly process input information, and can further perform continuous self-learning. Applications such as intelligent cognition of the electronic device 100 may be implemented through the NPU, for example, image recognition, facial recognition, speech recognition, and text understanding.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to implement various function applications and data processing of the electronic device 100. The internal memory 121 may include a program storage area and a data storage area. The program storage area may store an operating system, an application required by at least one function (for example, a sound playing function and an image playing function), and the like. The data storage area may store data (such as audio data and a phone book) created when the electronic device 100 is used, and the like. In addition, the internal memory 121 may include a high-speed random access memory, and may further include a nonvolatile memory, for example, at least one magnetic disk storage device, a flash memory, or a universal flash storage (universal flash storage, UFS).

The electronic device 100 may implement audio functions, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, for example, a resistive pressure sensor, an inductive pressure sensor, a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a messaging application icon, an instruction for viewing an SMS message is executed. When a touch operation whose touch operation intensity is greater than or equal to the first pressure threshold is performed on a Messages application icon, an instruction for creating an SMS message is executed.

The gyro sensor 180B may be configured to determine a motion posture of the electronic device 100. In some embodiments, an angular velocity of the electronic device 100 around three axes (namely, axes X, Y, and Z) may be determined by using the gyroscope sensor 180B. The gyro sensor 180B may be configured to implement image stabilization during shooting. For example, when a shutter is pressed, the gyro sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude by using the barometric pressure measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is used in an application such as switching between a landscape mode and a portrait mode or a pedometer.

The range sensor 180F is configured to measure a distance. The electronic device 100 may measure the distance in an infrared or a laser manner. In some embodiments, in a photographing scenario, the electronic device 100 may measure a distance by using the range sensor 180F to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during shooting. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is lower than another threshold, the electronic device 100 heats the battery 142 to prevent the electronic device 100 from being shut down abnormally because of a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation on or near the touch sensor 180K. The touch sensor may transfer a detected touch operation to the application processor, to determine a type of a touch event. The display 194 may provide a visual output related to the touch operation. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human voice part. The bone conduction sensor 180M may also be in contact with a human pulse, and receive a blood pressure beating signal. In some embodiments, the bone conduction sensor 180M may alternatively be disposed in a headset, to form a bone conduction headset. The audio module 170 may obtain a voice signal through parsing based on the vibration signal that is of the vibration bone of the voice part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power key, a volume key, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, shooting and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted in a same SIM card interface 195. The plurality of cards may be of a same type or of different types. The SIM card interface 195 may also be compatible with different types of SIM cards. The SIM card interface 195 may also be compatible with the external storage card. The electronic device 100 interacts with a network by using the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In an embodiment of this application, an Android system with a layered architecture is used as an example to describe a software structure of the electronic device 100.

Figure 2:
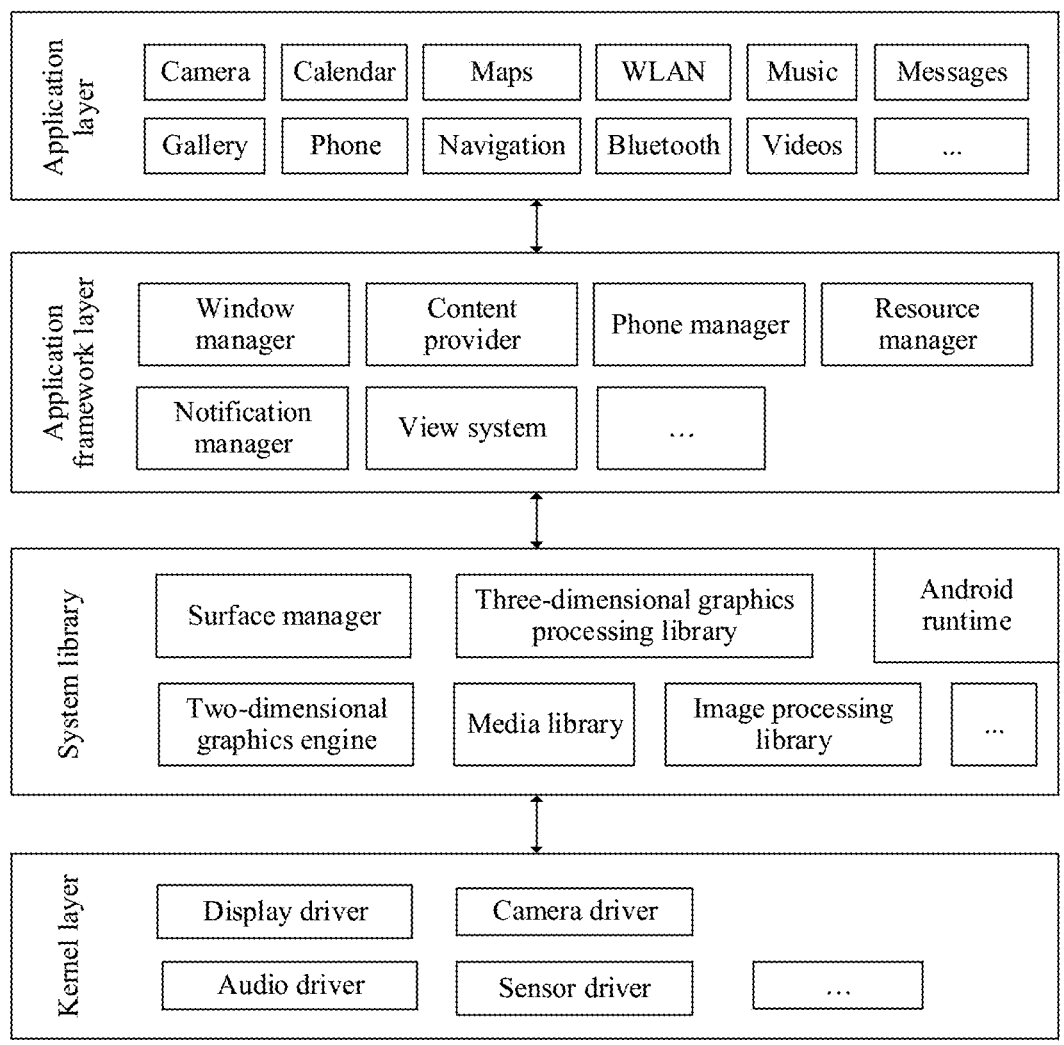
FIG. 2 is a schematic diagram of a software structure of an electronic device according to an embodiment of this application.

FIG. 2 is a block diagram of the software structure of the electronic device 100 in this embodiment of this application. In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom. The application layer may include a series of application packages.

As shown in FIG. 2, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying a picture. The view system may be configured to construct an application. A display interface may include one or more views. For example, a display interface including a Messages notification icon, and may include a text display view and a picture display view.

The phone manager is configured to provide a communication function of the electronic device 100, for example, management of a call status (including answering or declining a call).

The resource manager provides various resources for an application, such as a localized character string, an icon, a picture, a layout file, and a video file.

The notification manager enables an application to display notification information in a status bar, and may be configured to convey a notification type message. The notification manager may automatically disappear after a short pause without user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of a plurality of commonly used audio and video formats, static image files, and the like. The media library may support a plurality of audio and video coding formats, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In the descriptions of the embodiments of this application, the terminal has a form of a foldable screen. The terminal is not limited to a mobile phone, and further includes another mobile terminal device that has a photographing function and a foldable screen, for example, a tablet computer. A camera of the terminal with the foldable screen may be located under the screen, inside the screen, or between a display and a rear cover, or may be located on a side bezel of the terminal. In addition, a hinge of the foldable screen may be or may not be located in the middle of the screen. In the description of the embodiments, an example in which the hinge of the foldable screen is not located in the middle of the screen is used for description. The solutions of the present invention are applicable to a static picture and a dynamic picture. In the description of the embodiments, a static picture is used as an example for description.

For example, FIG. 3(a) and FIG. 3(b) are a schematic diagram of a structure of a terminal having a foldable screen.

FIG. 3(a) is a schematic diagram of a front facet of a terminal having a foldable screen when the screen is in an unfolded state. When the foldable screen of the mobile terminal is unfolded, the screen of the terminal may become a complete plane. When the terminal is placed horizontally, the screen plane may be parallel to a horizontal plane. The mobile terminal includes a foldable touchscreen 301, a camera 302 configured to capture a picture, a power key 303 used for power-on/off and screen unlocking, a volume key 304 used for volume control, and an eject key 305 used for ejecting the foldable screen from a folded state. FIG. 3(b) is a schematic diagram of a back facet of a terminal having a foldable screen when the screen is in an unfolded state. A raised part 306 on the back of the foldable screen is used to install components such as a camera, a key, and a battery. A vertical distance from a hinge 307 of the foldable screen to the left edge of a terminal bezel is greater than a vertical distance from the hinge 307 to the right edge of the terminal bezel. A dashed line 1 and a dashed line 2 in FIG. 3(a) indicate locations of the hinge and the left edge of the raised part on the back, respectively. In FIG. 3(a), the vertical distance from the location of the hinge to the left edge of the terminal bezel is X, and the vertical distance from the location of the hinge to the left edge of the raised part is also X. Therefore, the vertical distance from the location of the hinge to the left edge of the terminal bezel is equal to the vertical distance from the location of the hinge to the left edge of the raised part.

FIG. 4(a) to FIG. 4(c) are a schematic diagram when a foldable screen of a mobile terminal is in a folded state. FIG. 4(a) shows a state of a screen of a mobile phone when the foldable screen is folded. When the screen of the mobile terminal is folded, the screen is divided into two parts: a primary screen 401 and a secondary screen 402. FIG. 4(b) shows a state of the primary screen when the foldable screen is folded, and FIG. 4(c) shows a state of the secondary screen when the foldable screen is folded. When the foldable screen of the terminal is in a folded state, the secondary screen of the foldable screen may fit with a raised part on the back of the primary screen. In an actual use process, when a mobile phone is in a folded state, a user may press an eject key on the right side of the mobile phone to eject the mobile phone from the folded state.

For ease of understanding, a mobile phone having the structures shown in FIG. 1 to FIG. 4(a) to FIG. 4(c) is used as an example in the following embodiments of this application, and the photographing method provided in the embodiments of this application is specifically described with reference to the accompanying drawings.

Figure 5A:
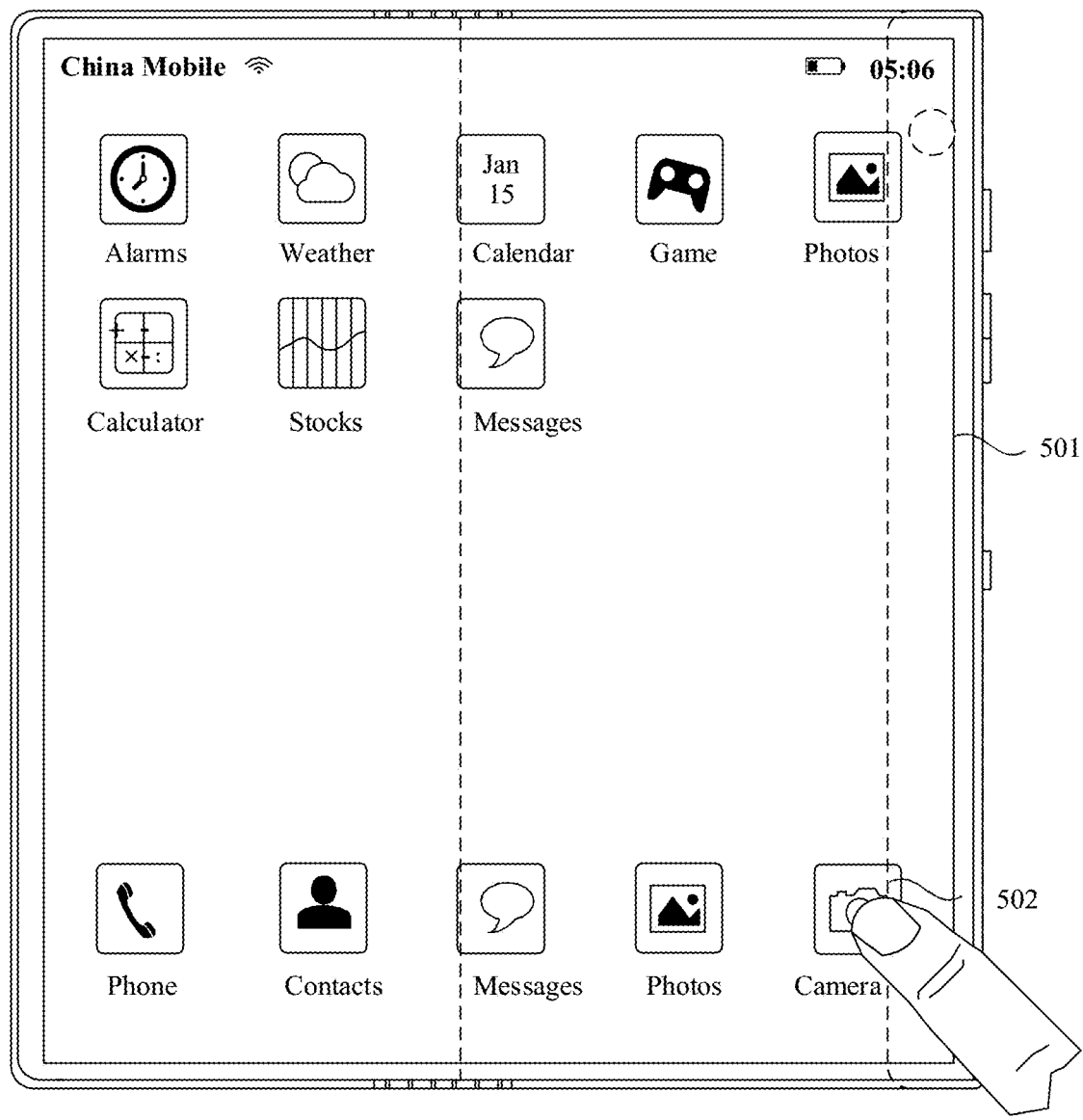
FIG. 5A is a schematic diagram of a group of display interfaces according to an embodiment of this application.
Figure 5B:
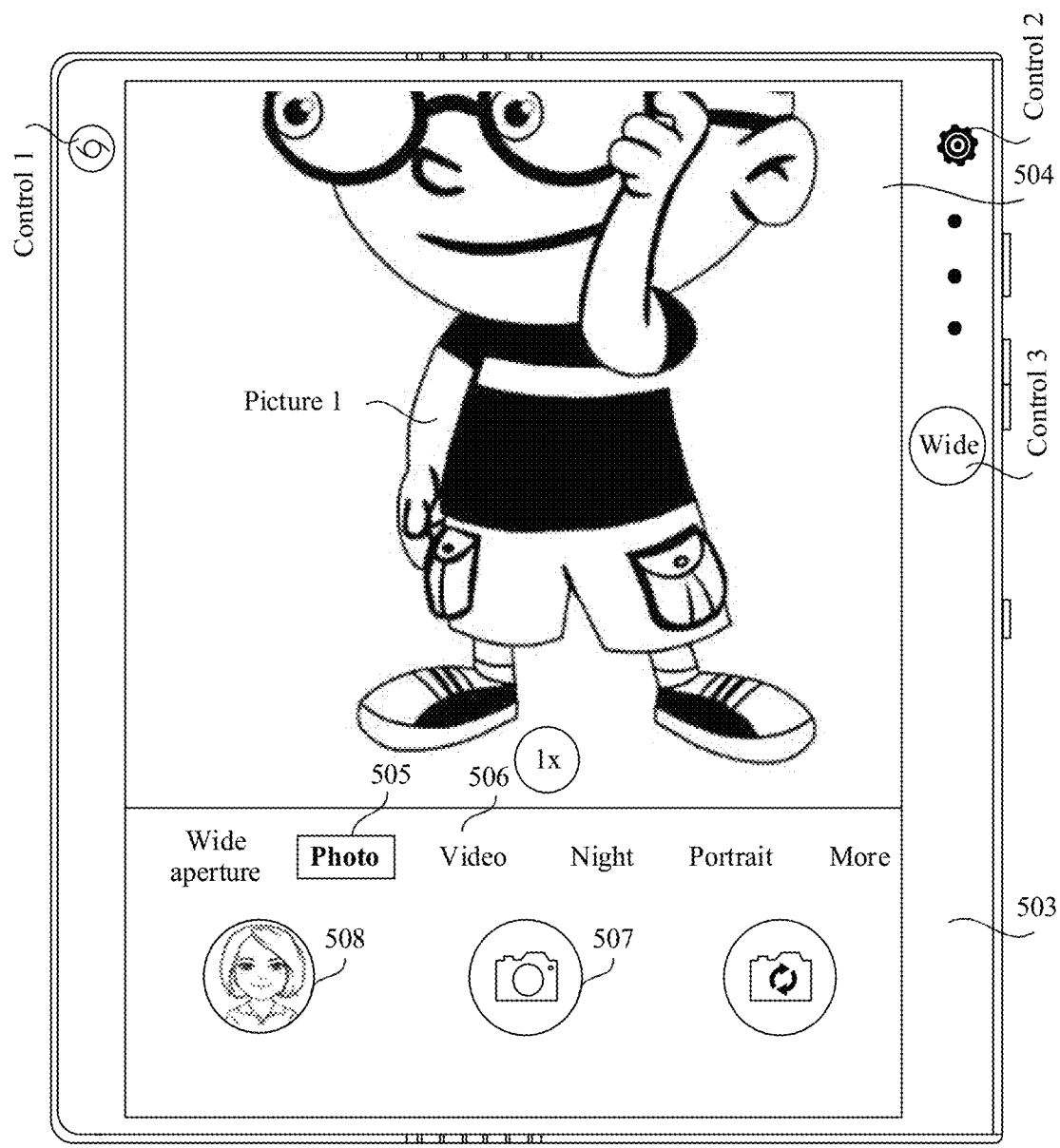
FIG. 5B is a schematic diagram of another group of display interfaces according to an embodiment of this application.

FIG. 5A shows a graphical user interface (graphical user interface, GUI) when a mobile phone with a foldable screen is unfolded. The GUI is a home screen 501 of the mobile phone. After detecting that a user taps an icon 502 of a camera application (application, APP) on the home screen 501, the mobile phone may start the camera application, and display another GUI shown in FIG. 5B. The GUI may be referred to as a preview interface 503. Refer to FIG. 5B. After the mobile phone detects that the user taps the icon 502 of the camera application on the home screen 501, the preview interface 503 is displayed in full screen on the user interface of the foldable screen. The preview interface 503 may include a viewfinder frame 504. In a preview state, the viewfinder frame 504 may display a preview picture in real time. It may be understood that the viewfinder frame 504 may have different sizes in a photo mode and a video mode (that is, a video shooting mode). For example, the viewfinder frame shown in FIG. 5A may be a viewfinder frame in a photo mode. In the video mode, the viewfinder frame 504 may be an entire touchscreen.

For example, refer to FIG. 5B. After the mobile phone starts the camera, the viewfinder frame 504 may display a picture 1. The preview interface 503 may further include a control 505 used to indicate a photo mode, a control 506 used to indicate a video mode, a photographing control 507, and a control 508 used to associate a gallery. In this case, the control 508 used to associate a gallery displays a thumbnail of the last picture in the gallery in a form of a thumbnail. For example, the preview interface 503 further includes other controls such as a control 1, a control 2, and a control 3.

Figure 5C:
FIG. 5C is a schematic diagram of another group of display interfaces according to an embodiment of this application.

For example, refer to FIG. 5C. In the photo mode, after the mobile phone detects that the user taps the photographing control, the mobile phone performs a photographing operation; and in the video mode, after the mobile phone detects that the user taps the photographing control, the mobile phone performs a video shooting operation.

Figure 5D:
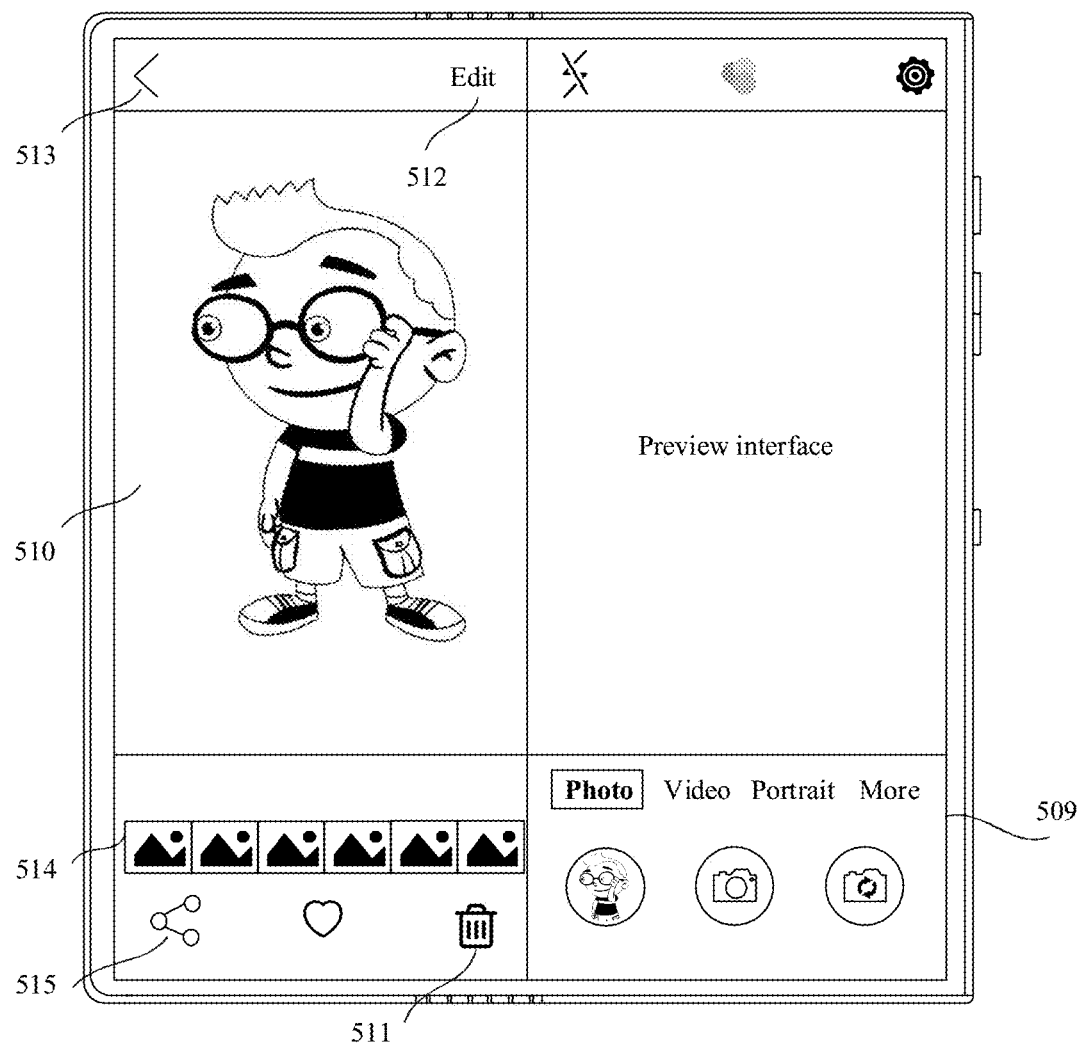
FIG. 5D is a schematic diagram of another group of display interfaces according to an embodiment of this application.

After the mobile phone detects that the user taps the photographing control, the mobile phone performs a photographing operation. After the photographing is completed, another GUI shown in FIG. 5D is displayed. The GUI may be referred to as a split-screen interface 509. The split-screen interface 509 divides the entire screen into two parts by using a screen center line as a dividing line. A preview interface is still displayed on a same screen as a camera placement location, and a gallery application interface 510 is displayed on the other screen. In this case, the gallery application interface 510 displays the captured picture. In addition, the preview interface is used by a control used to associate a gallery application to display a thumbnail of the captured picture in a form of a thumbnail. In this example, the preview screen (and the camera) is on the right screen, and the gallery application interface is on the left screen. From FIG. 5C to FIG. 4D, a change process of the GUI may be an animation effect such as pushing rightward, appearing, and fading out. The gallery application interface displayed on the left of FIG. 5D may further include a deletion control 511 used to delete a picture, an edition control 512 used to edit a picture, a back control 513 used to return to a thumbnail interface from a gallery application interface, a control 514 used to quickly preview a gallery picture thumbnail, and a sharing control 515 used to share a picture.

It should be noted that, in the embodiments of this application, when the user uses a photographing function for the first time, after the photographing is completed, the preview interface and the gallery application interface are simultaneously displayed on the display. In this case, a prompt may be displayed on the mobile phone interface to indicate the user to continue using the function or disable the function. If the user chooses to continue using the function, when photographing is performed next time, split-screen display is set by default and no prompt is displayed after the photographing is completed. If the user chooses to disable the function, split-screen display is cancelled when photographing is performed next time, and the function may be subsequently enabled again in settings.

Figure 5E:
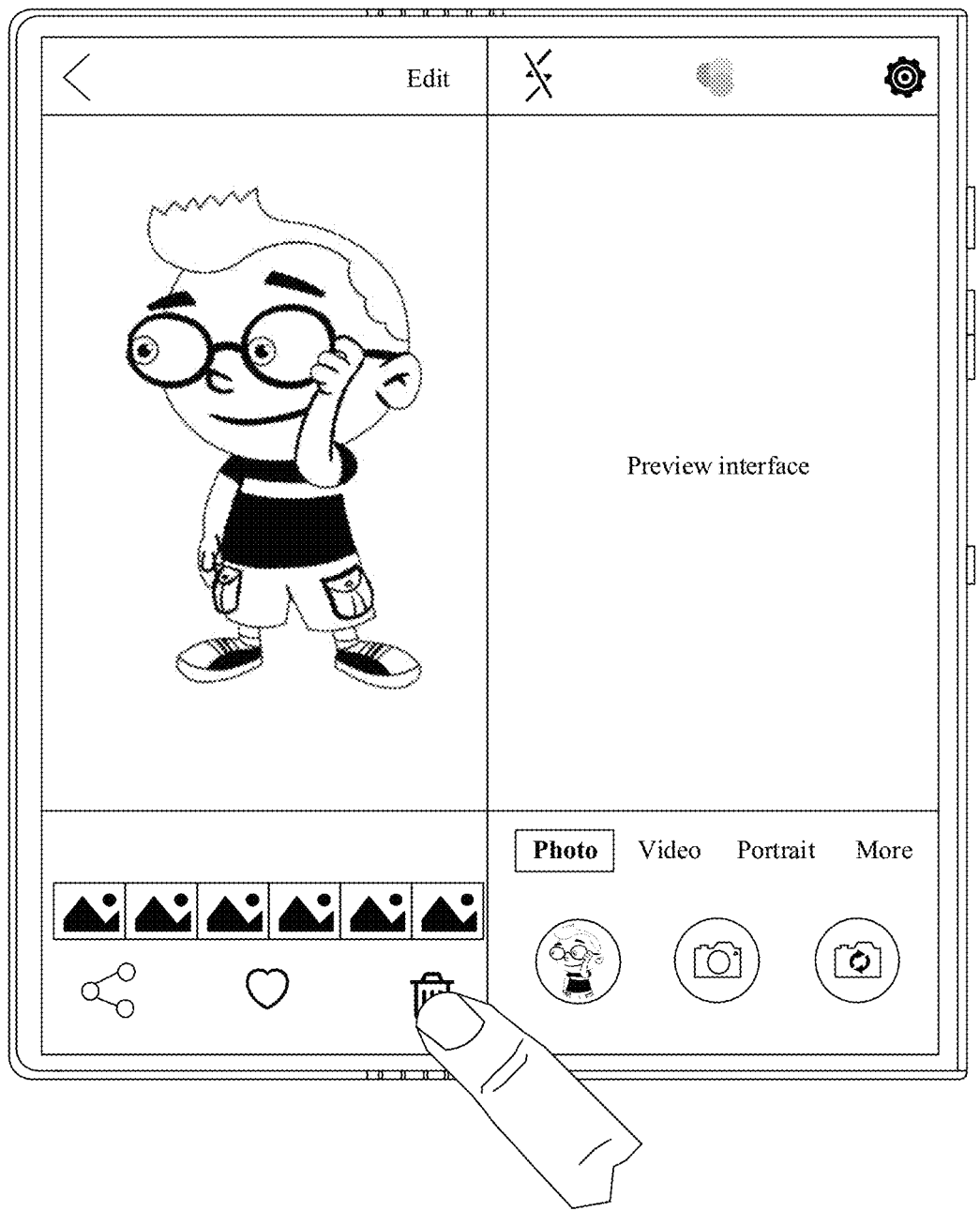
FIG. 5E is a schematic diagram of another group of display interfaces according to an embodiment of this application.

For example, refer to FIG. 5E. After a picture is captured, after the mobile phone detects that the user taps the deletion control, the mobile phone deletes the captured picture. In this case, the GUI changes to that in FIG. 5F, that is, from split-screen display (the preview interface is displayed on the right, and the gallery application interface is displayed on the left) to displaying the preview interface in full screen. The user may choose to continue capturing a new picture.

Figure 5F:
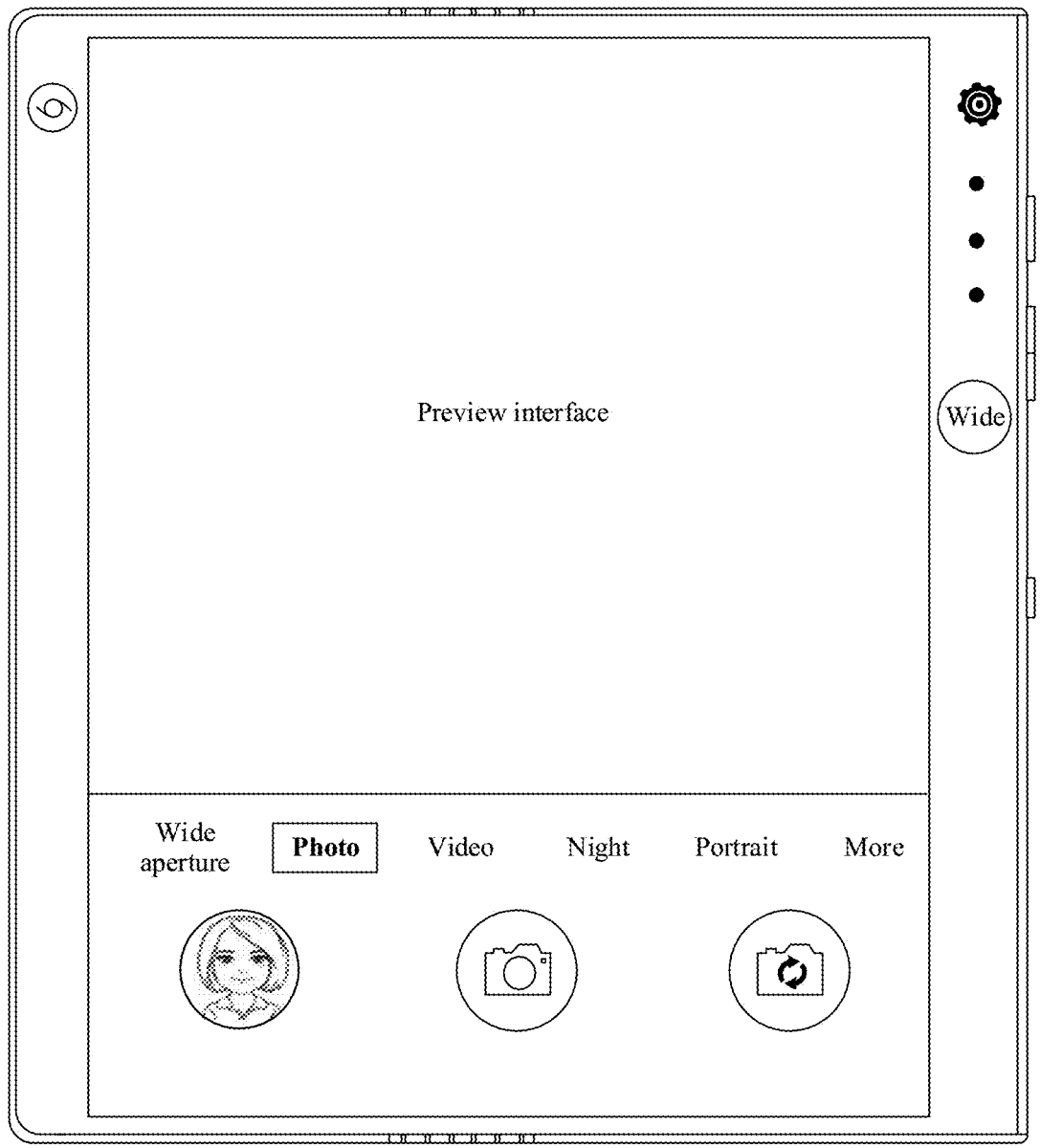
FIG. 5F is a schematic diagram of another group of display interfaces according to an embodiment of this application.
Figure 5G:
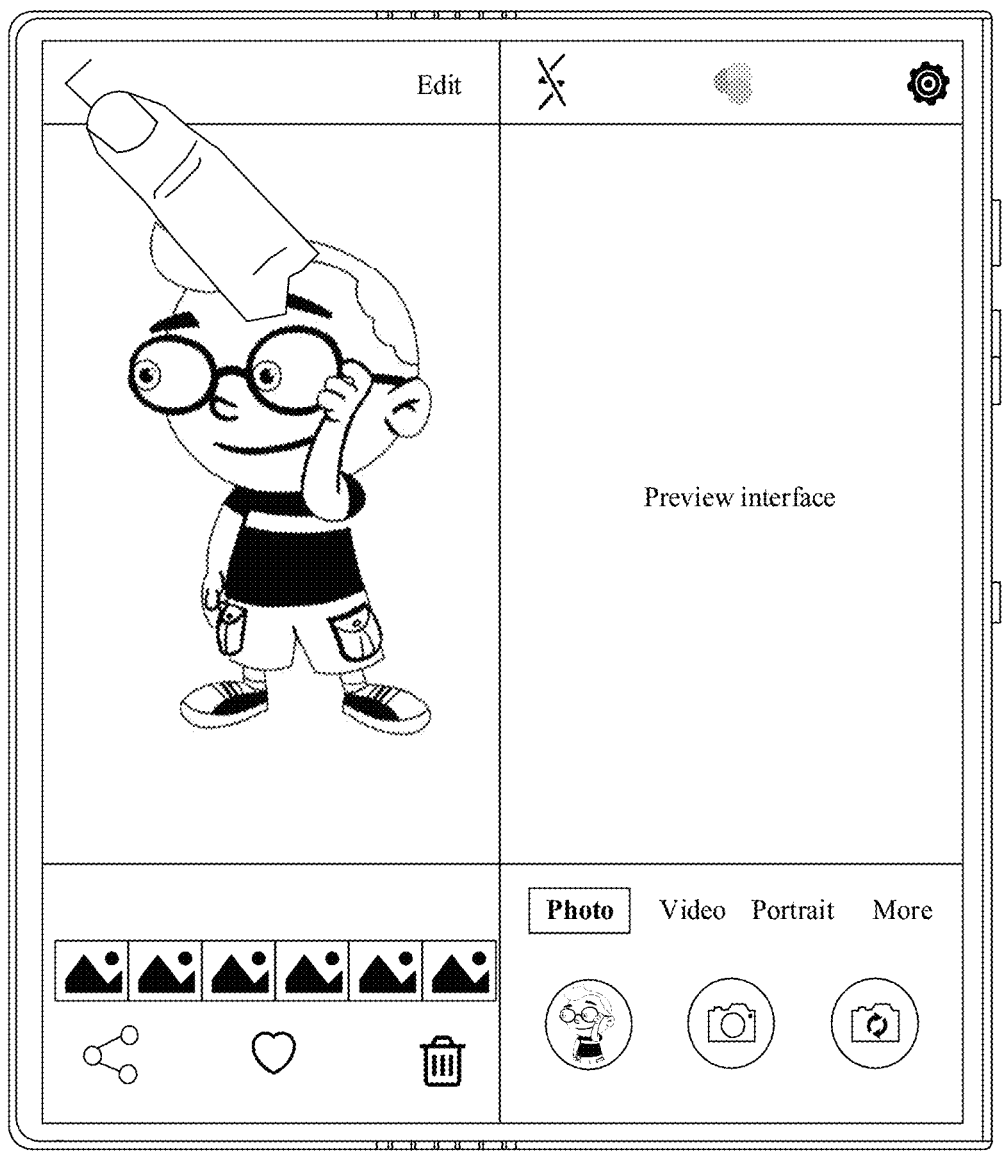
FIG. 5G is a schematic diagram of another group of display interfaces according to an embodiment of this application.

For example, refer to FIG. 5G. After a picture is captured, after the mobile phone detects that the user taps the back control, the left GUI changes to that in FIG. 5H, and the gallery application interface displays a picture in the gallery in a form of a thumbnail, so that the user quickly previews the picture in the gallery.

There may be a plurality of screen split manners of the foldable screen.

Figure 6A:
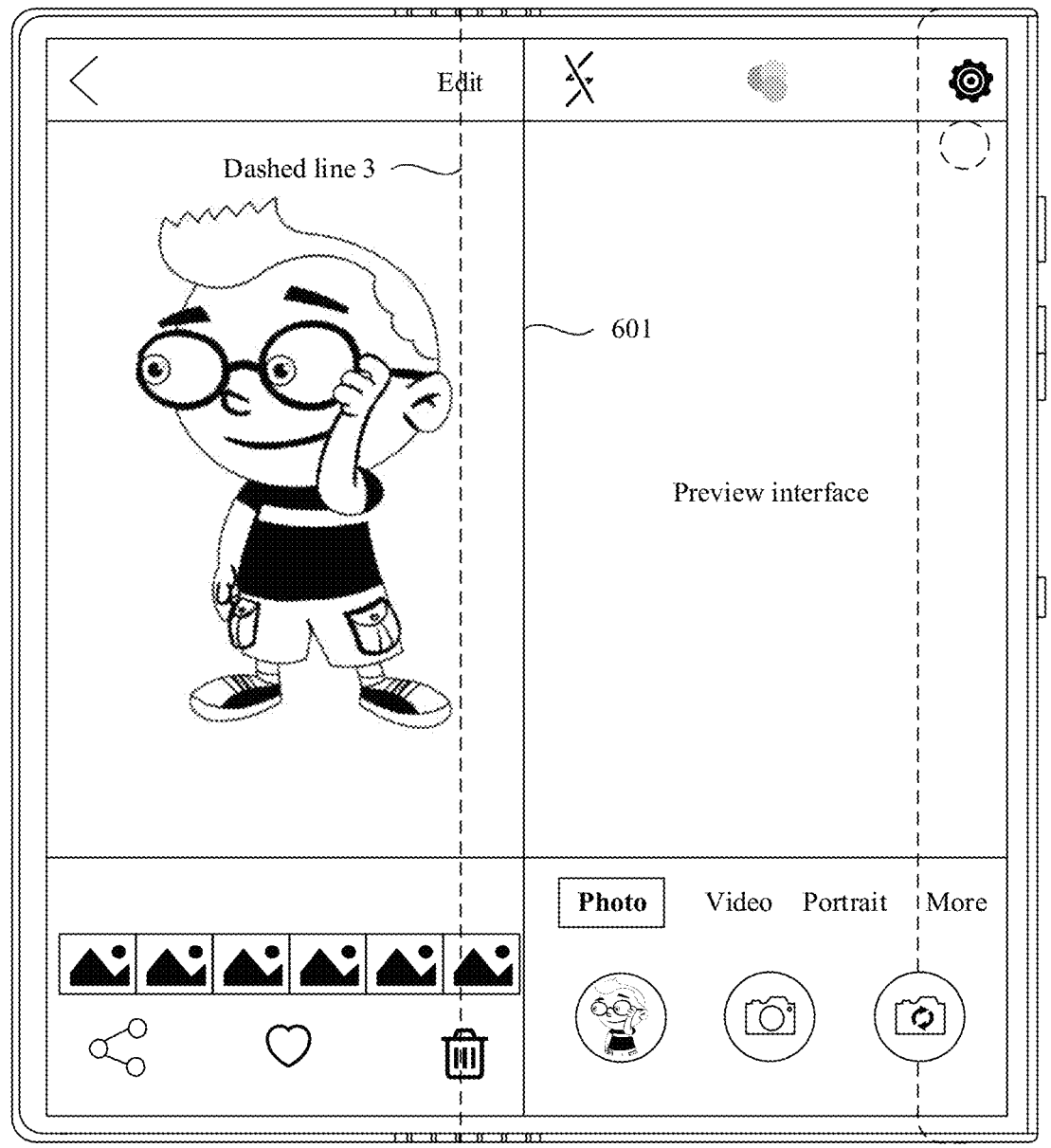
FIG. 6(a) to FIG. 6(d) are a schematic diagram of another group of display interfaces according to an embodiment of this application.
Figure 6B:
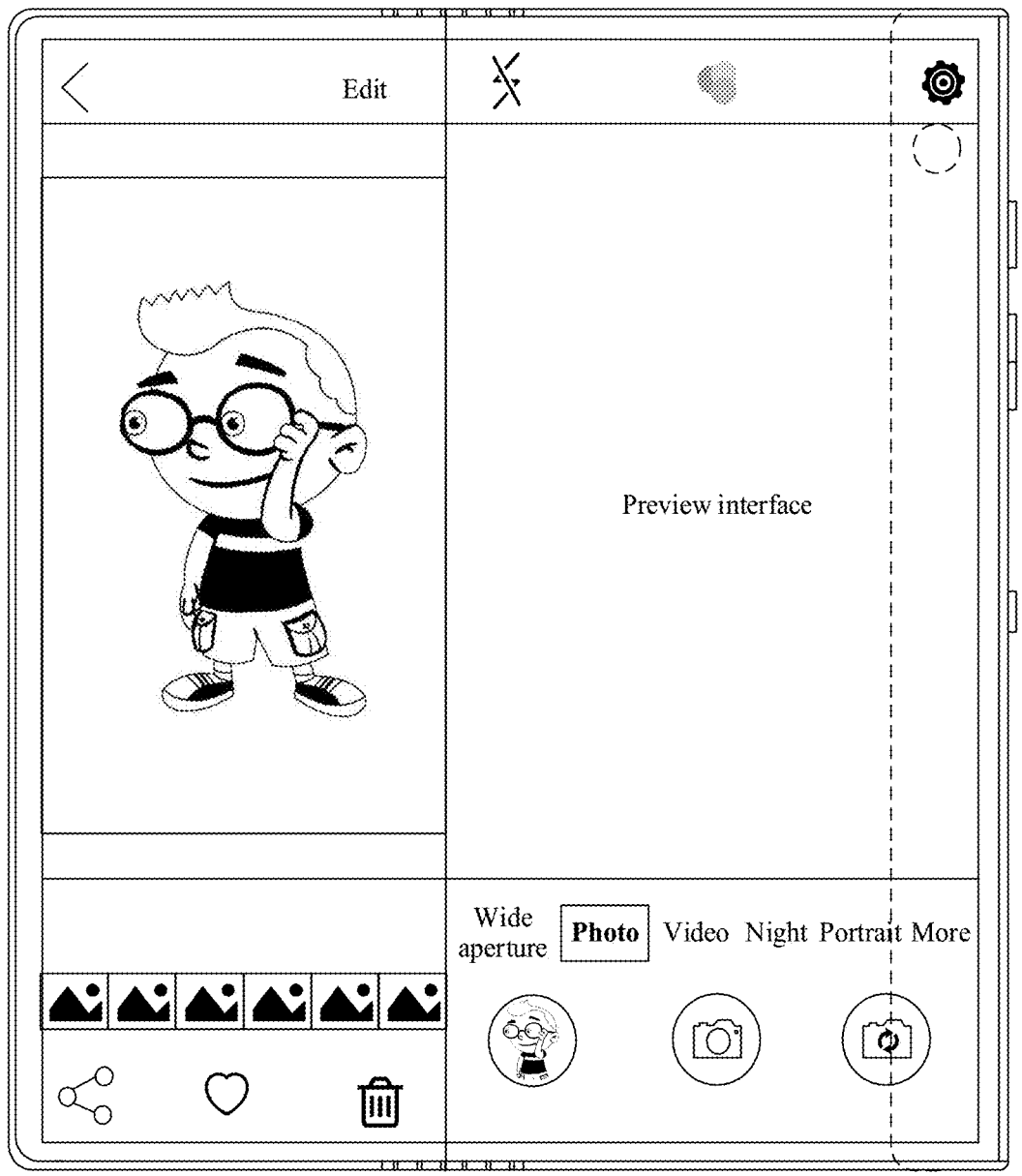
Figure 6C:
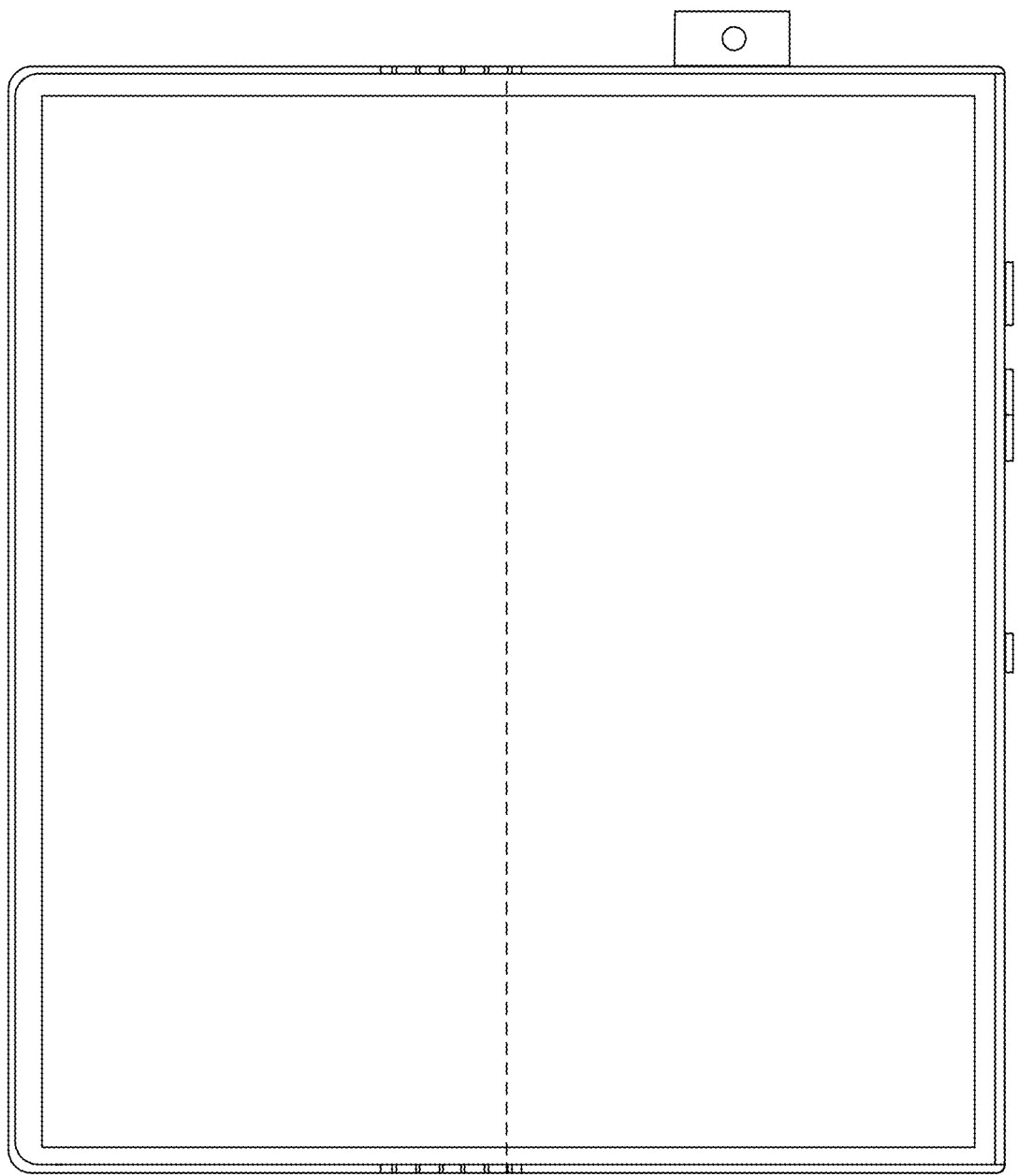
Figure 6D:
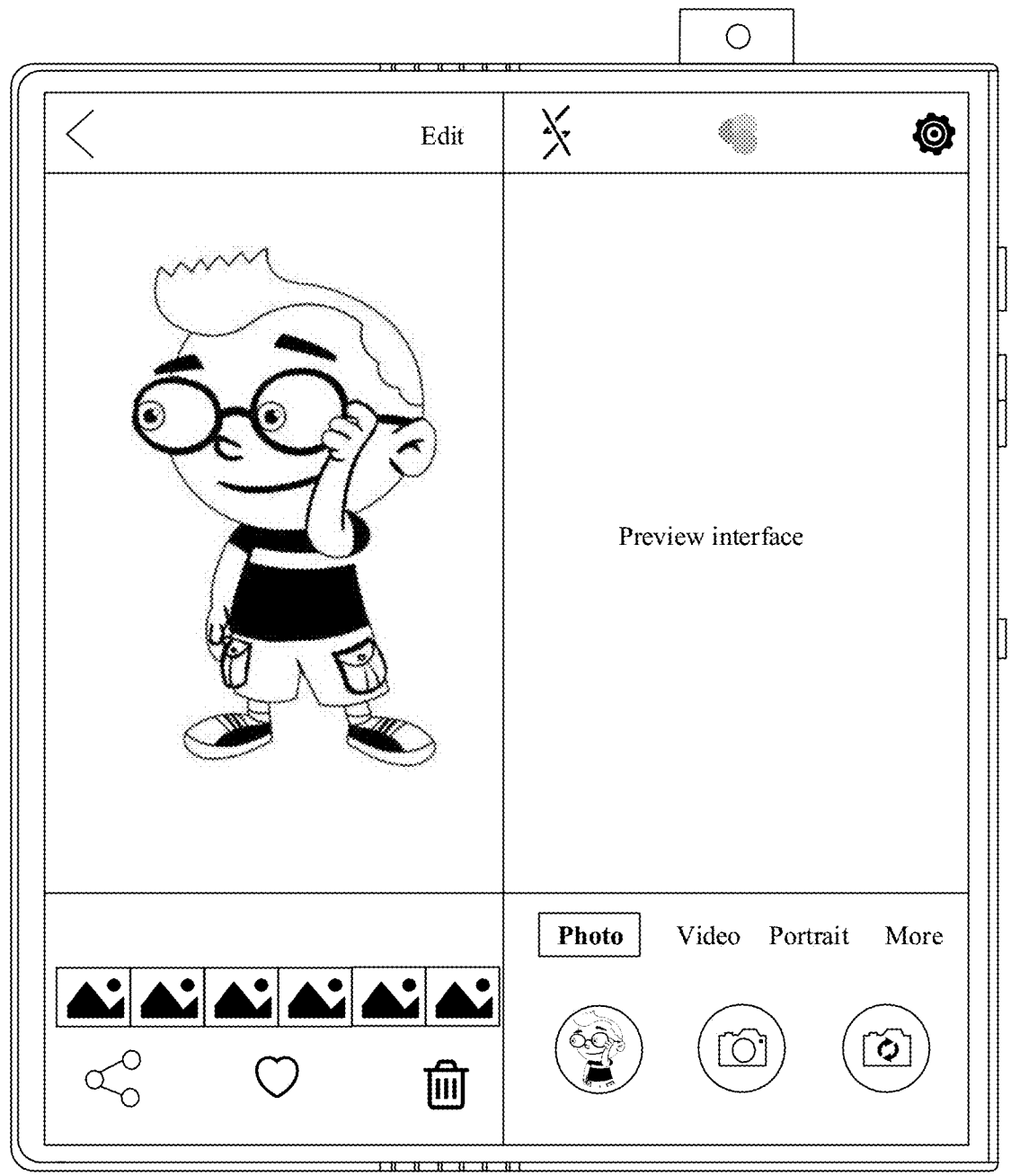

In the descriptions in the embodiments of this application, a split-screen display manner in which a hinge of the foldable screen is not in the middle and a screen center line is used as a dividing line is used. In an actual mobile phone design, the foldable screen may be designed in two structures: the hinge is not in the middle of the screen, or the hinge is in the middle of the screen. In the split-screen display manner, the hinge or the screen center line may be used as a dividing line. For example, refer to FIG. 6(a). A dashed line 3 indicates a location of the hinge. In this case, FIG. 6(a) shows a split-screen display manner in which the hinge is not in the middle of the screen and a screen center line 601 is used as a dividing line, that is, a form of the mobile phone described in the embodiments of this application, and FIG. 6(b) shows a split-screen display manner in which the hinge is not in the middle of the screen and the hinge is used as a dividing line. For example, FIG. 6(c) shows a form of the mobile phone with the foldable screen when the hinge is in the middle of the screen, and FIG. 6(d) shows a split-screen display manner in which the hinge is used as a dividing line when the hinge is in the middle of the screen. In this case, a case in which the hinge is used as a dividing line is the same as a case in which the screen is evenly divided. For example, the camera of the mobile phone may be located above the screen.

Figure 7A:
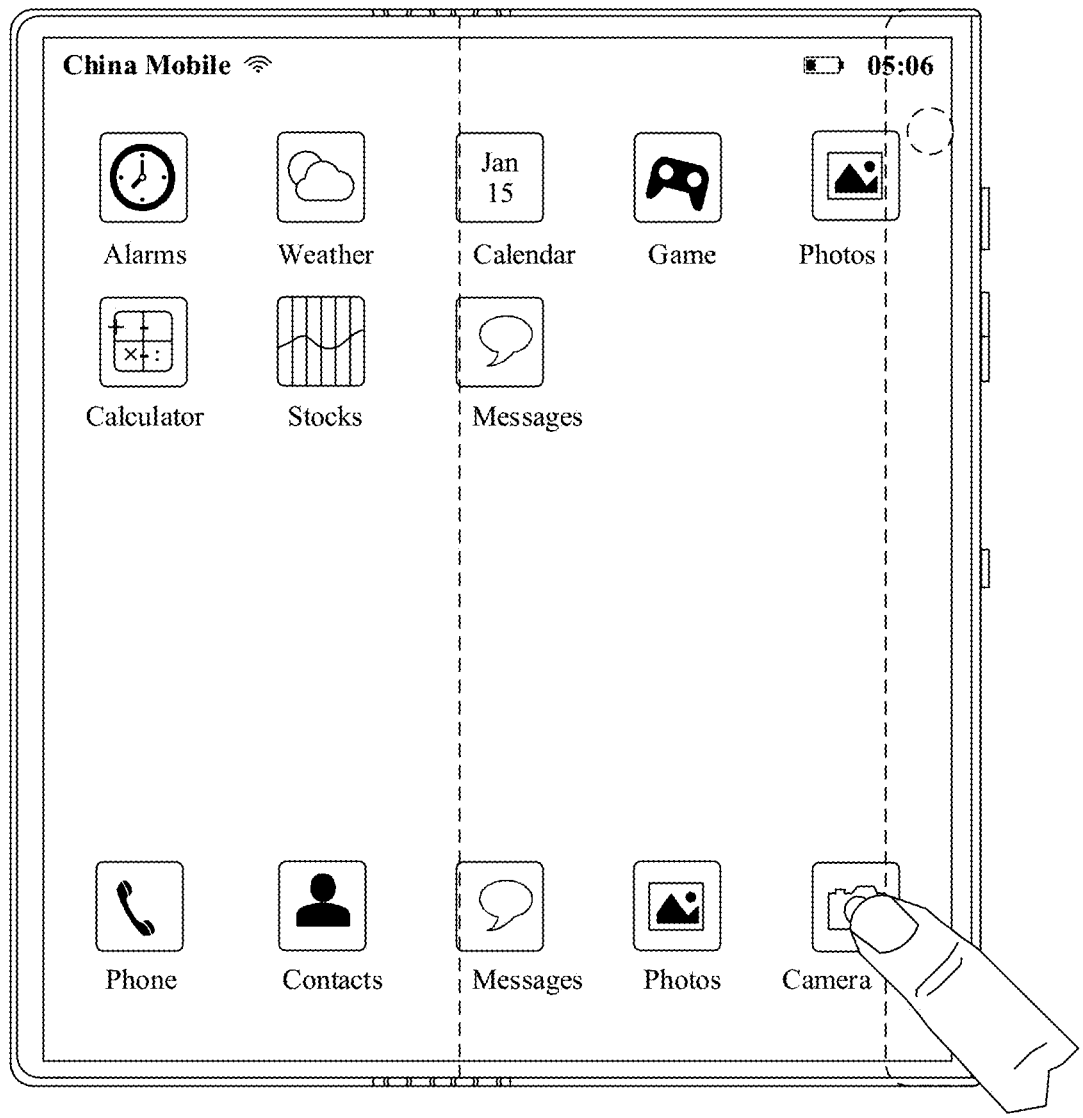
FIG. 7(a) to FIG. 7(f) are a schematic diagram of another group of display interfaces according to an embodiment of this application.
Figure 7B:
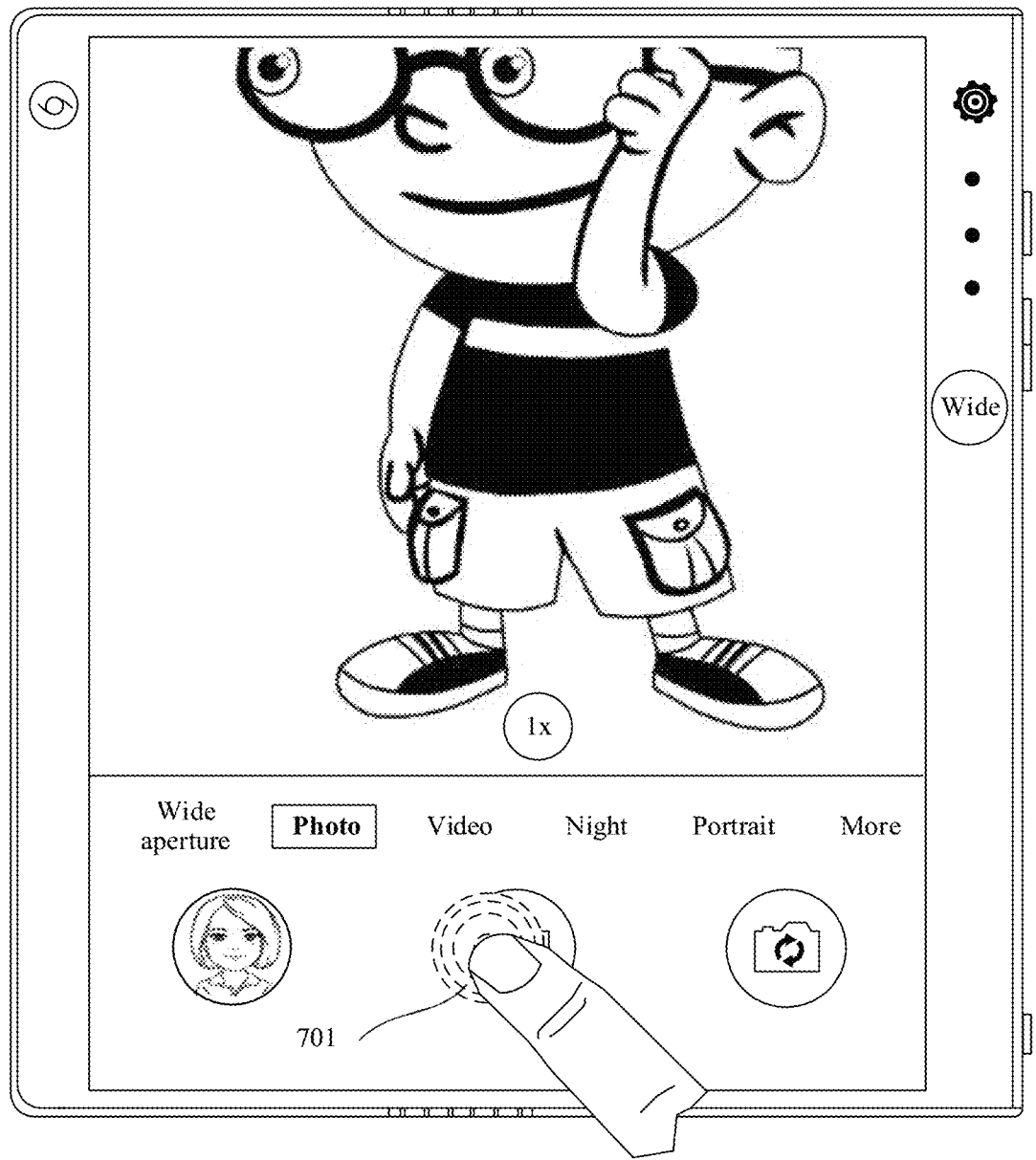
Figure 7C:
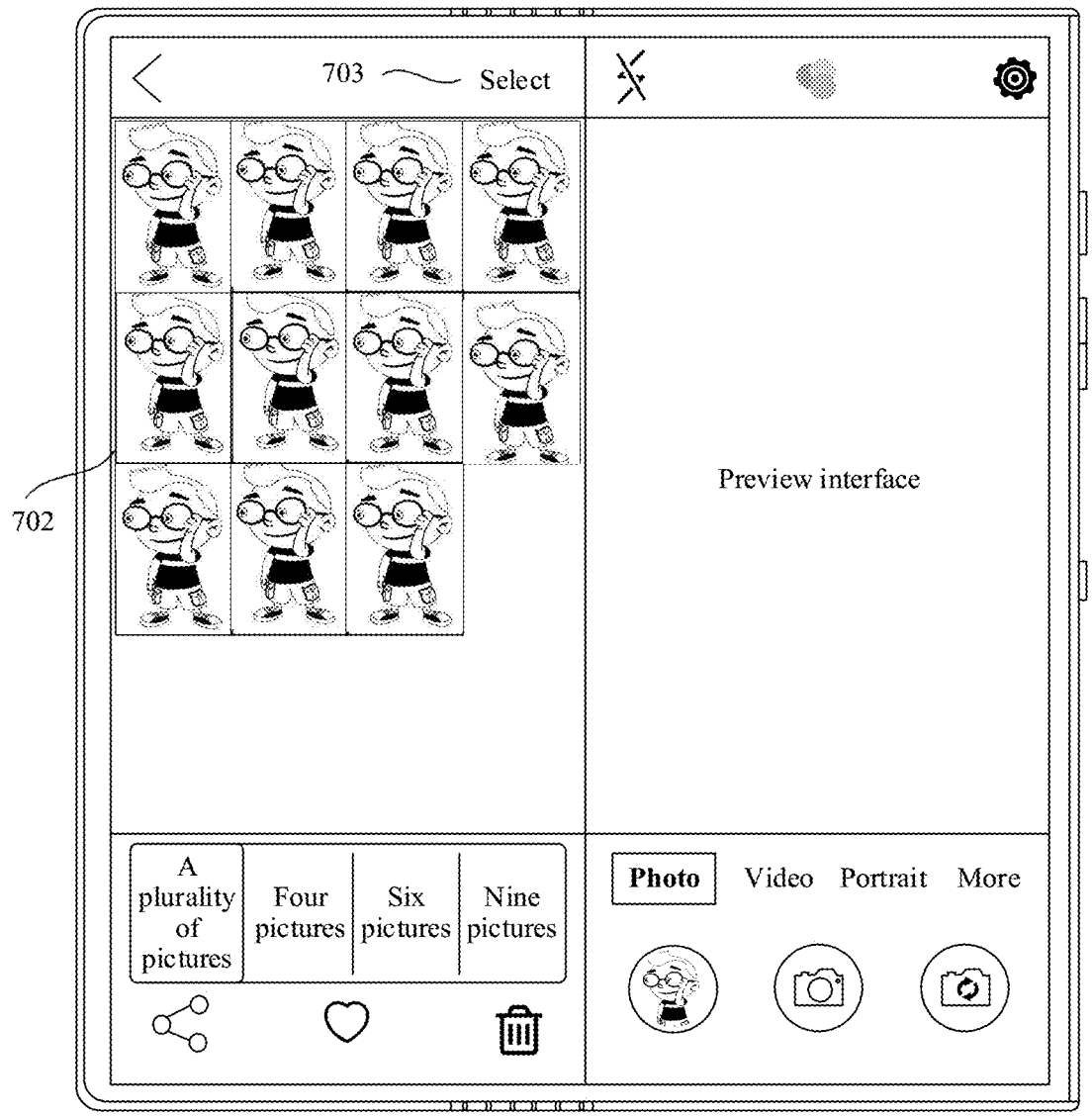

In an embodiment, the user chooses to perform a continuous photographing action. For example, as shown in FIG. 7(a), the foldable screen of the mobile phone is in an unfolded state. After detecting that the user taps the icon of the camera application on the home screen, the mobile phone displays a GUI shown in FIG. 7(b). In this case, the preview interface is displayed in full screen on the user interface of the foldable screen. For example, after detecting that the user triggers a continuous photographing control 701, the mobile phone displays another GUI shown in FIG. 7(c). A screen on the GUI is evenly divided into two parts. The preview interface is displayed on the right screen, and the gallery application interface is displayed on the left screen. The gallery application interface displays continuously captured pictures in a form of a thumbnail, and the left GUI may be referred to as a continuous photographing thumbnail interface 702. The gallery application interface displayed on the continuous photographing thumbnail interface 702 may further include a deletion control used to delete a picture, a back control used to return to a thumbnail interface from a gallery application interface, and a selection control 703 used to select a plurality of pictures.

It should be noted that, in an actual mobile phone design, an operation of performing continuous photographing may be triggered by touching and holding a photographing control, by making voice, by calling a continuous photographing function in settings, or the like. This is not limited herein.

Figure 7D:
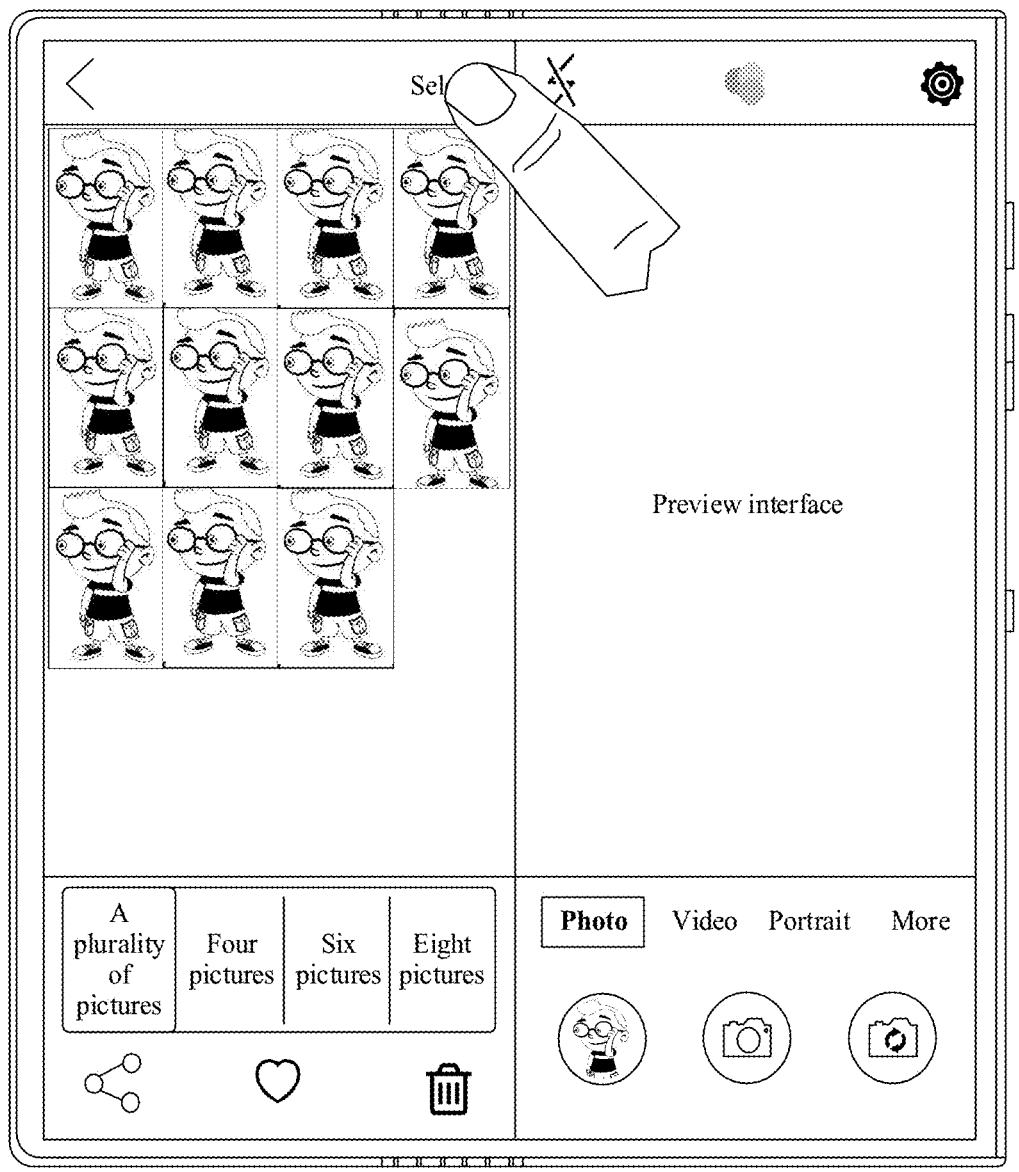
Figure 7E:
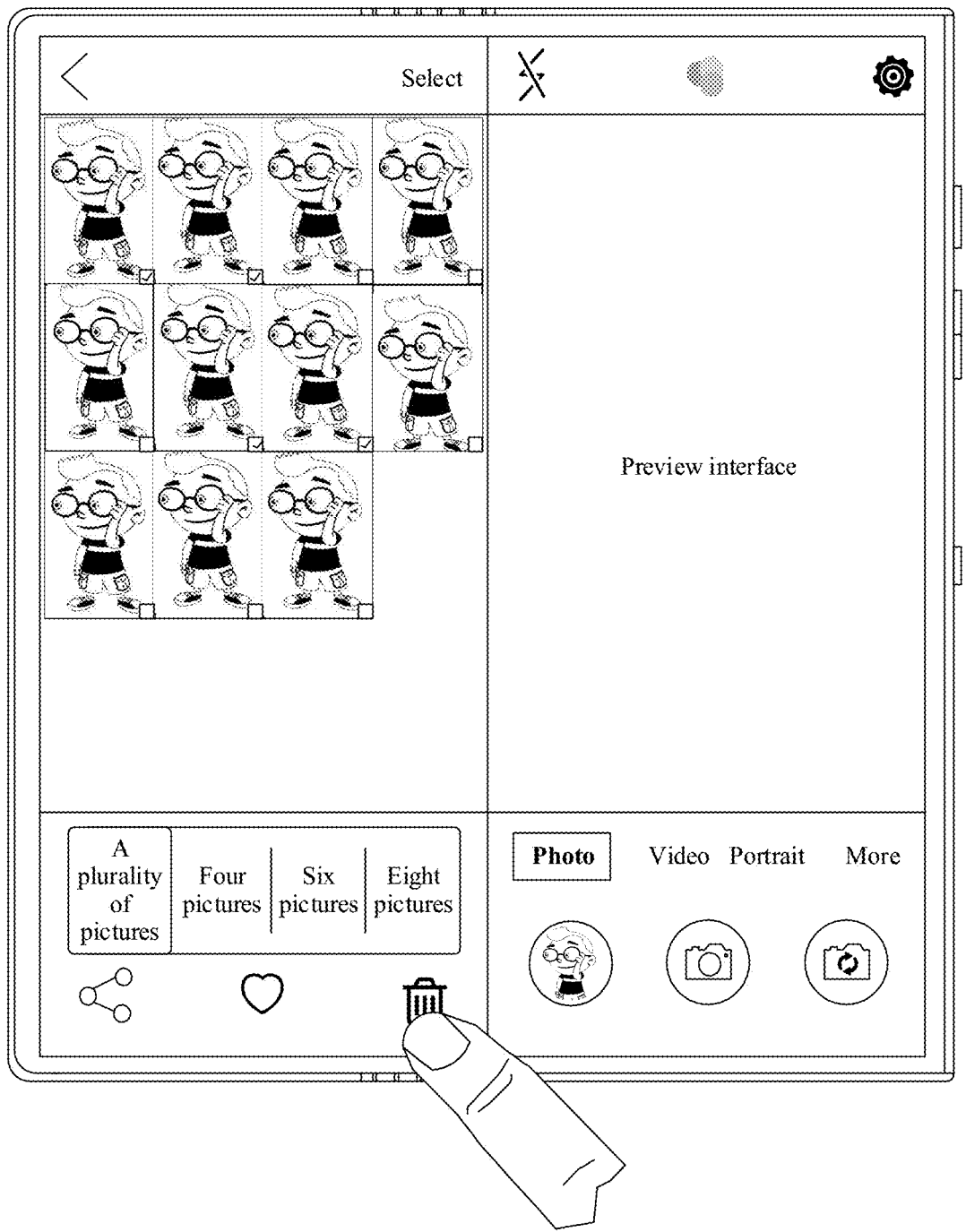
Figure 7F:
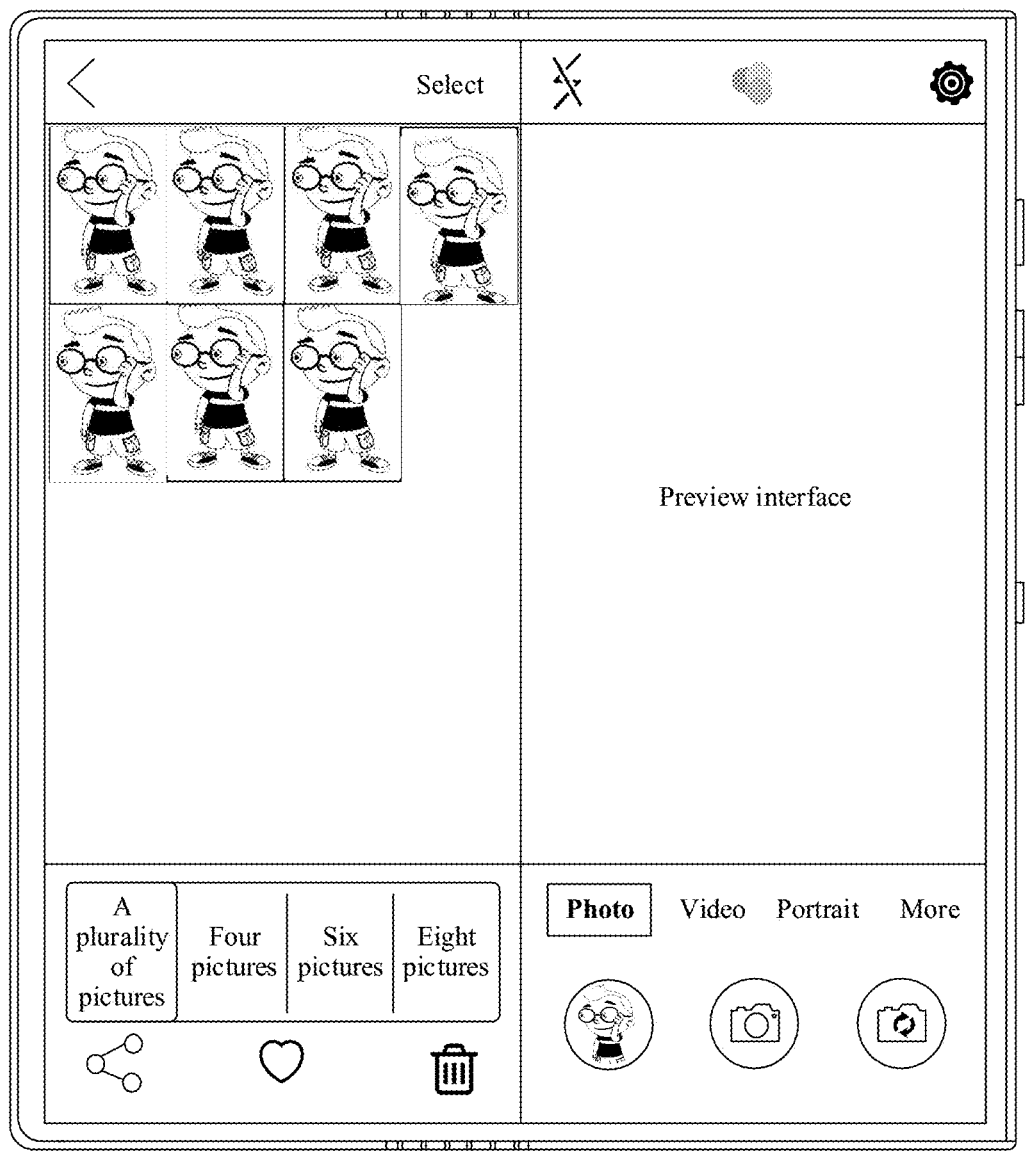

For example, refer to FIG. 7(d). After the mobile phone detects that the user taps the selection control, the user may select a plurality of pictures. A manner of selecting a picture may be a tap operation or a continuous slide operation. As shown in FIG. 7(e), the user selects four of thumbnails of the plurality of continuously captured pictures. After the mobile phone detects that the user taps the deletion control, the pictures selected by the user may be deleted. After the pictures are deleted, a GUI is shown in FIG. 7(f). In this case, the gallery application interface displays thumbnails of unselected pictures.

In another embodiment, the continuous photographing thumbnail interface may further include a control used to adjust a thumbnail layout. The user may choose to display continuously captured pictures in four pictures, six pictures, nine pictures, or more pictures by manually selecting a thumbnail layout, so as to facilitate quick preview of the pictures.

Figure 8A:
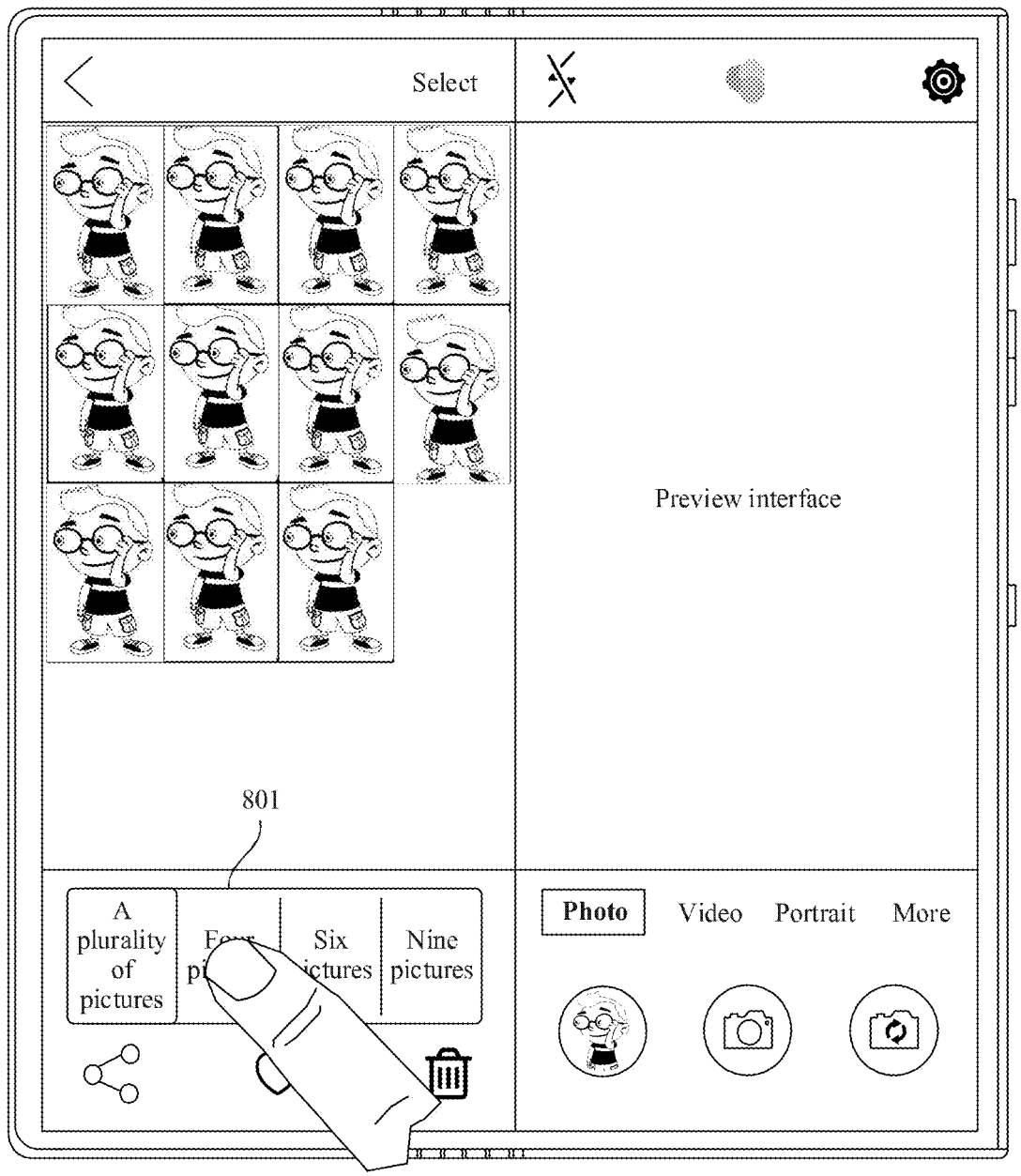
FIG. 8(a) to FIG. 8(c) are a schematic diagram of another group of display interfaces according to an embodiment of this application.
Figure 8B:
Figure 8C:
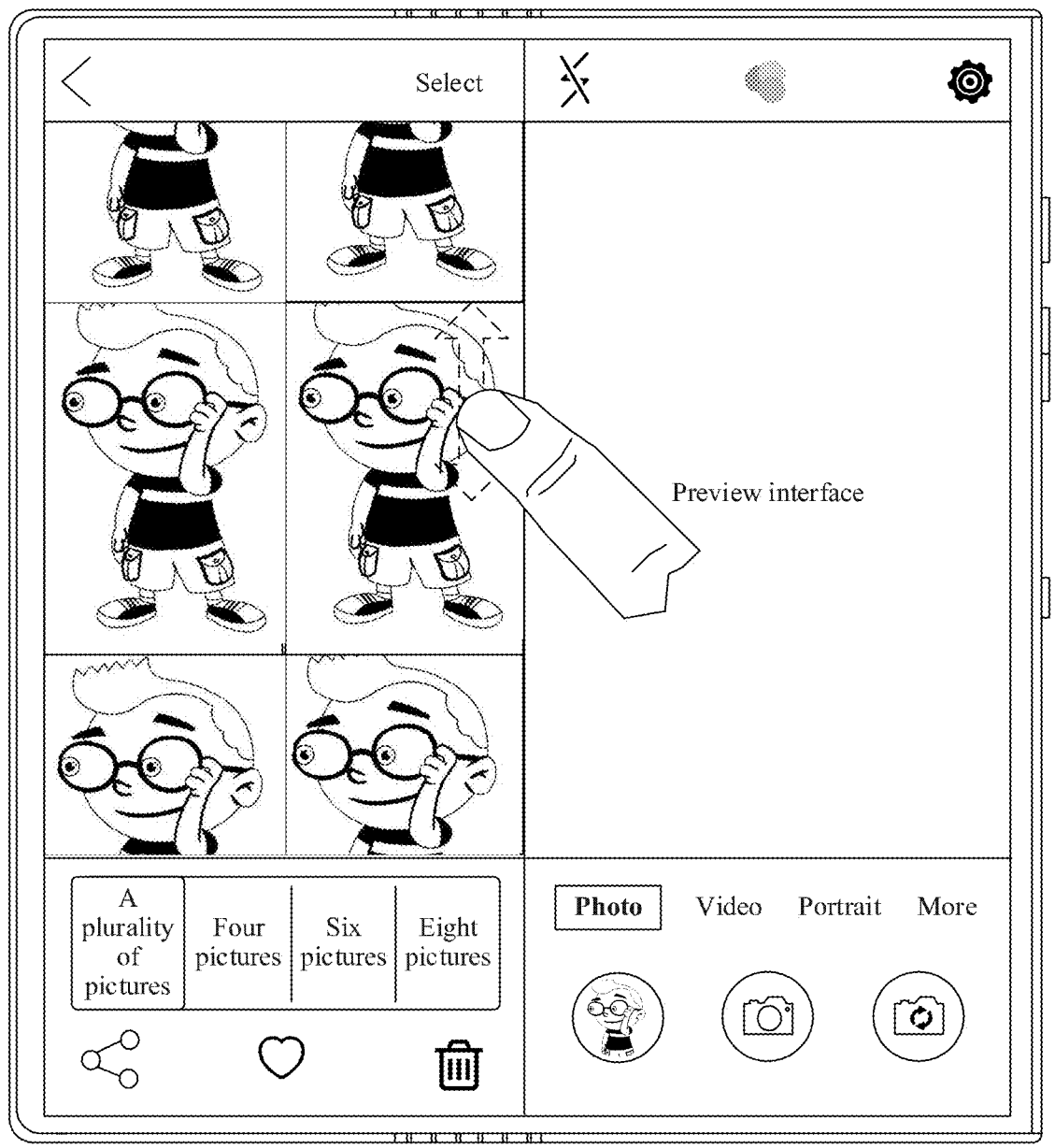

For example, refer to FIG. 8(a). The continuous photographing thumbnail interface includes a control 801 used to adjust a thumbnail layout. The user may choose to display continuously captured pictures in four pictures, six pictures, nine pictures, or more pictures. After the mobile phone detects that the user taps the control 801 used to adjust a thumbnail layout, the user chooses to display the continuously captured pictures in four pictures. In this case, the continuous photographing thumbnail interface is shown in FIG. 8(b). The user may preview the plurality of continuously captured pictures by performing a manual operation. The manual operation may be an up-down slide operation or a left-right slide operation, or may be tapping a button on the screen. For example, as shown in FIG. 8(c), the user quickly previews the plurality of continuously captured pictures by performing an up-down slide operation.

In another embodiment, after the mobile phone detects that the user taps a picture in thumbnails, the tapped picture is displayed on the left screen in a form of a large picture.

Figure 9A:
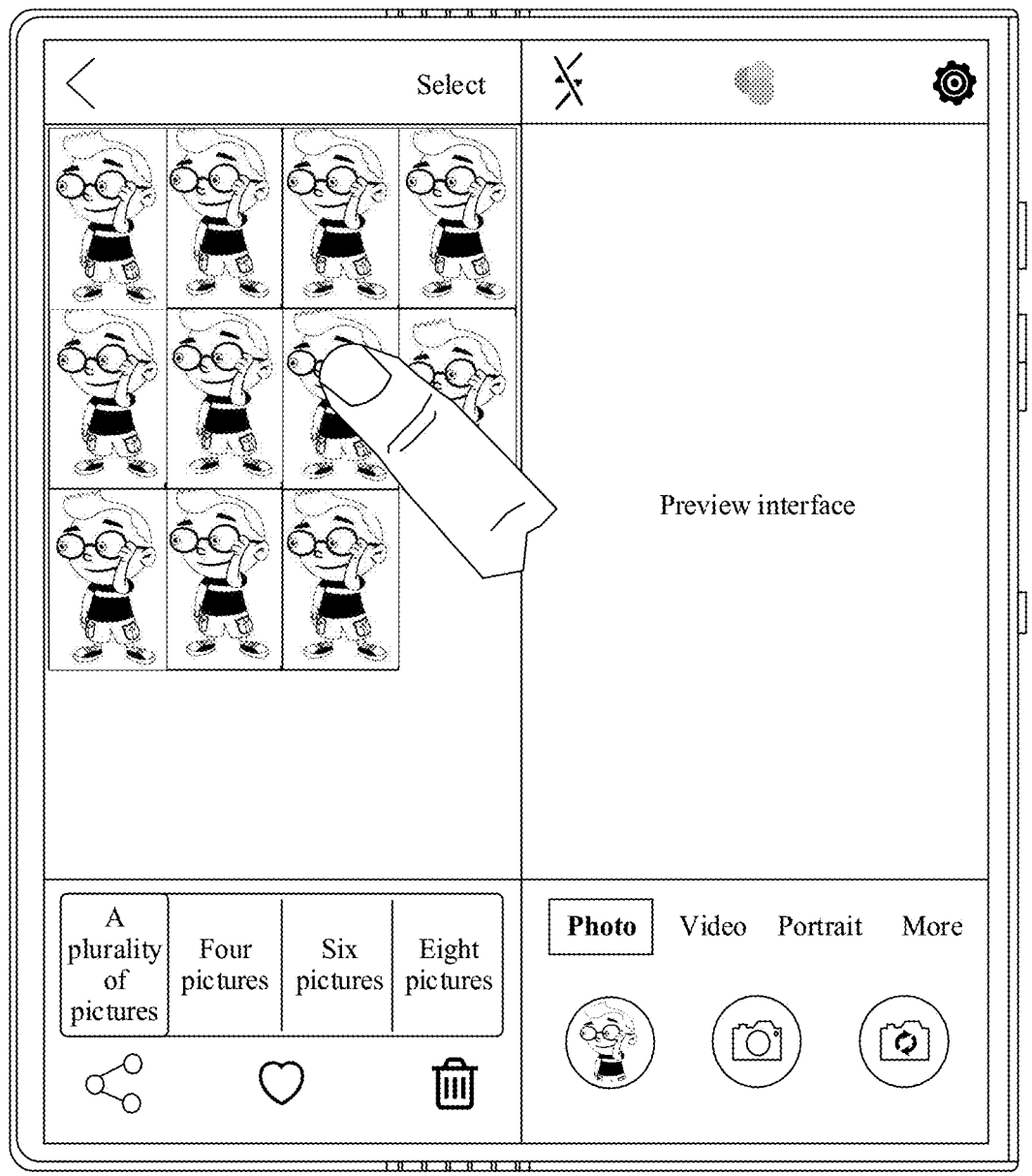
FIG. 9(a) to FIG. 9(h) are a schematic diagram of another group of display interfaces according to an embodiment of this application.
Figure 9B:
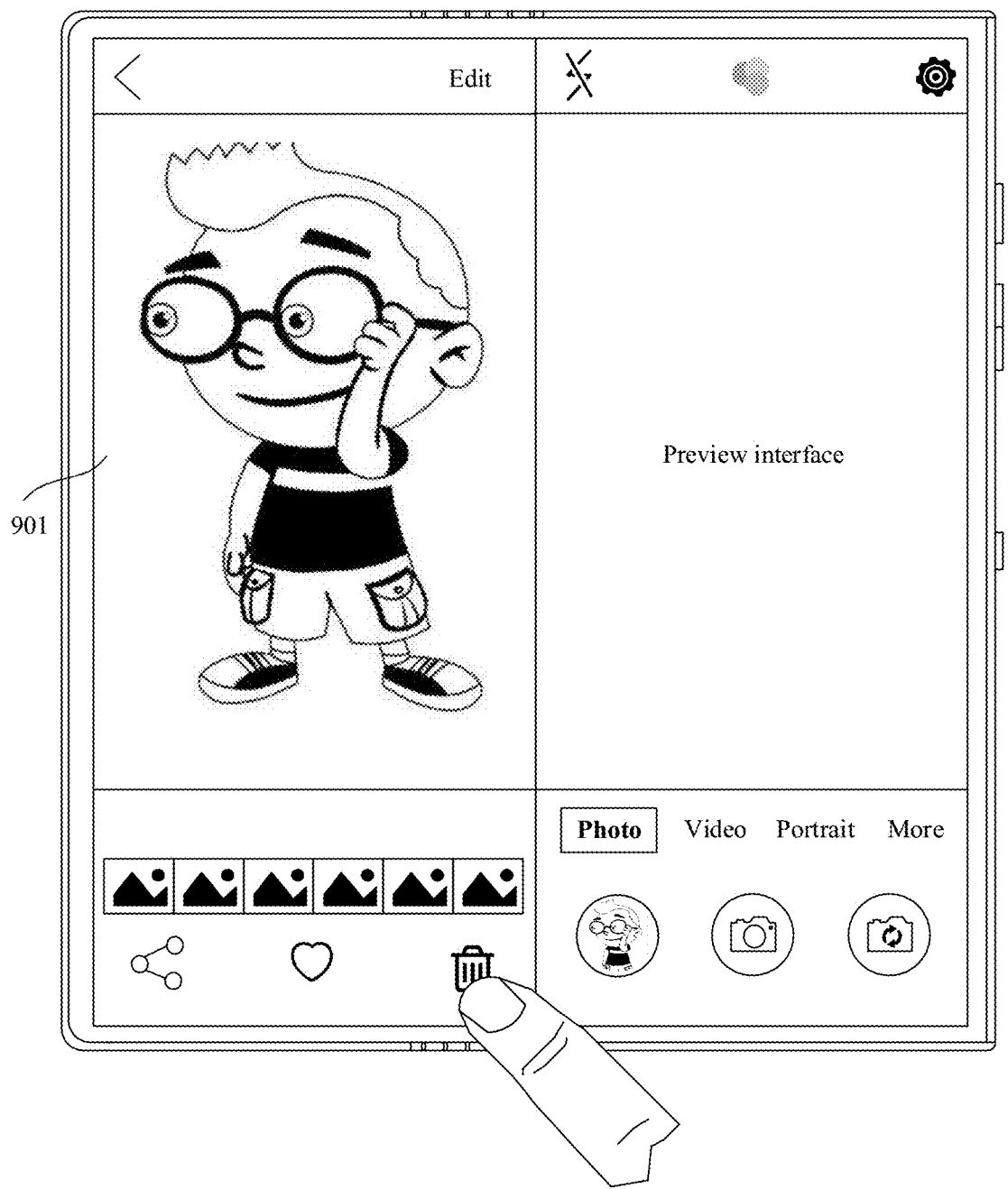

For example, as shown in FIG. 9(a), the user taps a seventh picture in the continuous photographing thumbnail interface. In this case, another GUI shown in FIG. 9(b) is displayed, and the gallery application interface is on the left of the GUI. A seventh picture 901 in continuously captured pictures is displayed in a form of a large picture. The GUI includes a deletion control used to delete a picture, an edition control used to edit a picture, a back control used to return to a thumbnail interface from a gallery application, and a control used to quickly preview a gallery picture thumbnail. The user may switch between pictures by performing a slide operation or a key operation, to facilitate preview by the user.

Figure 9C:
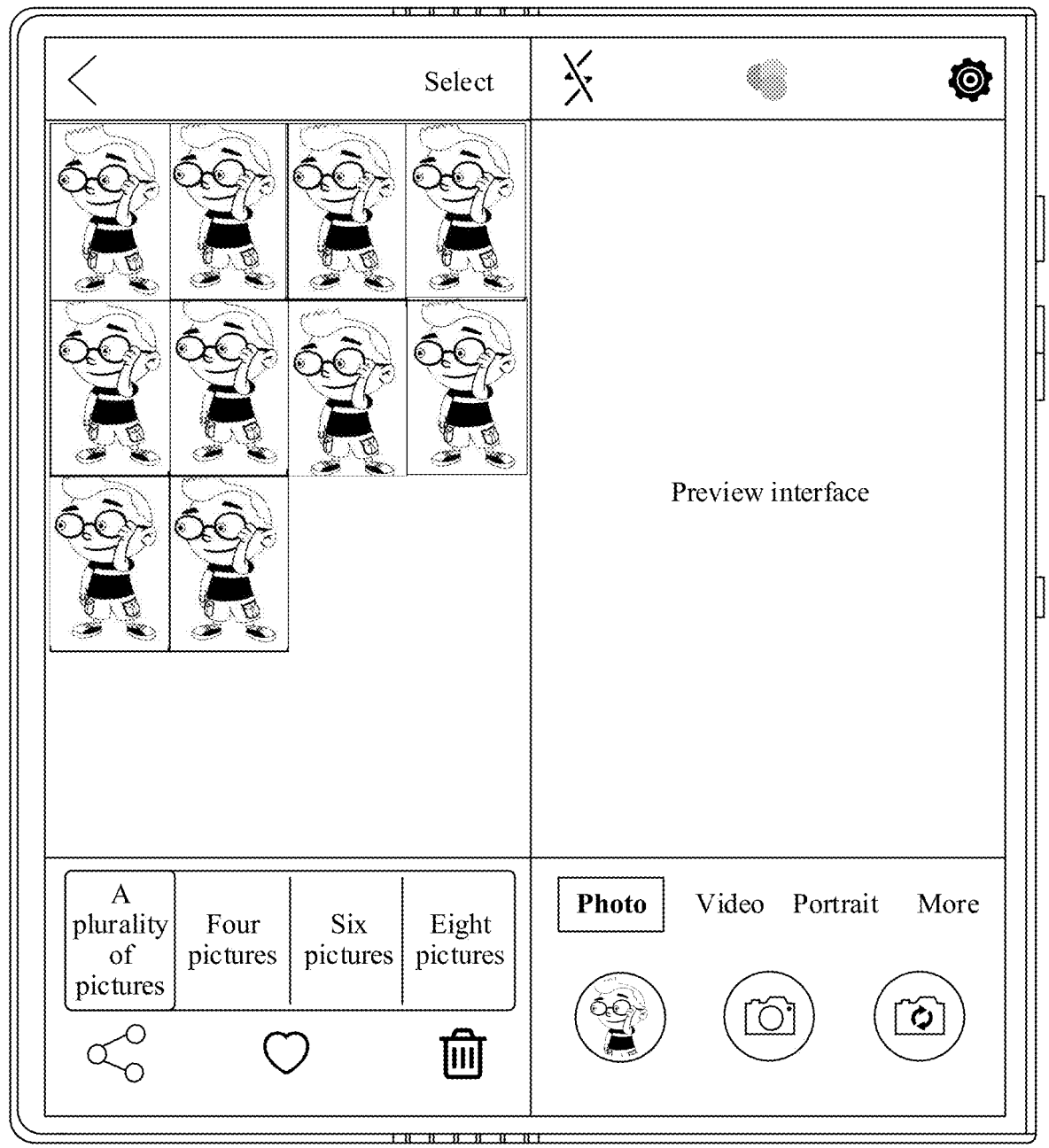
Figure 9D:
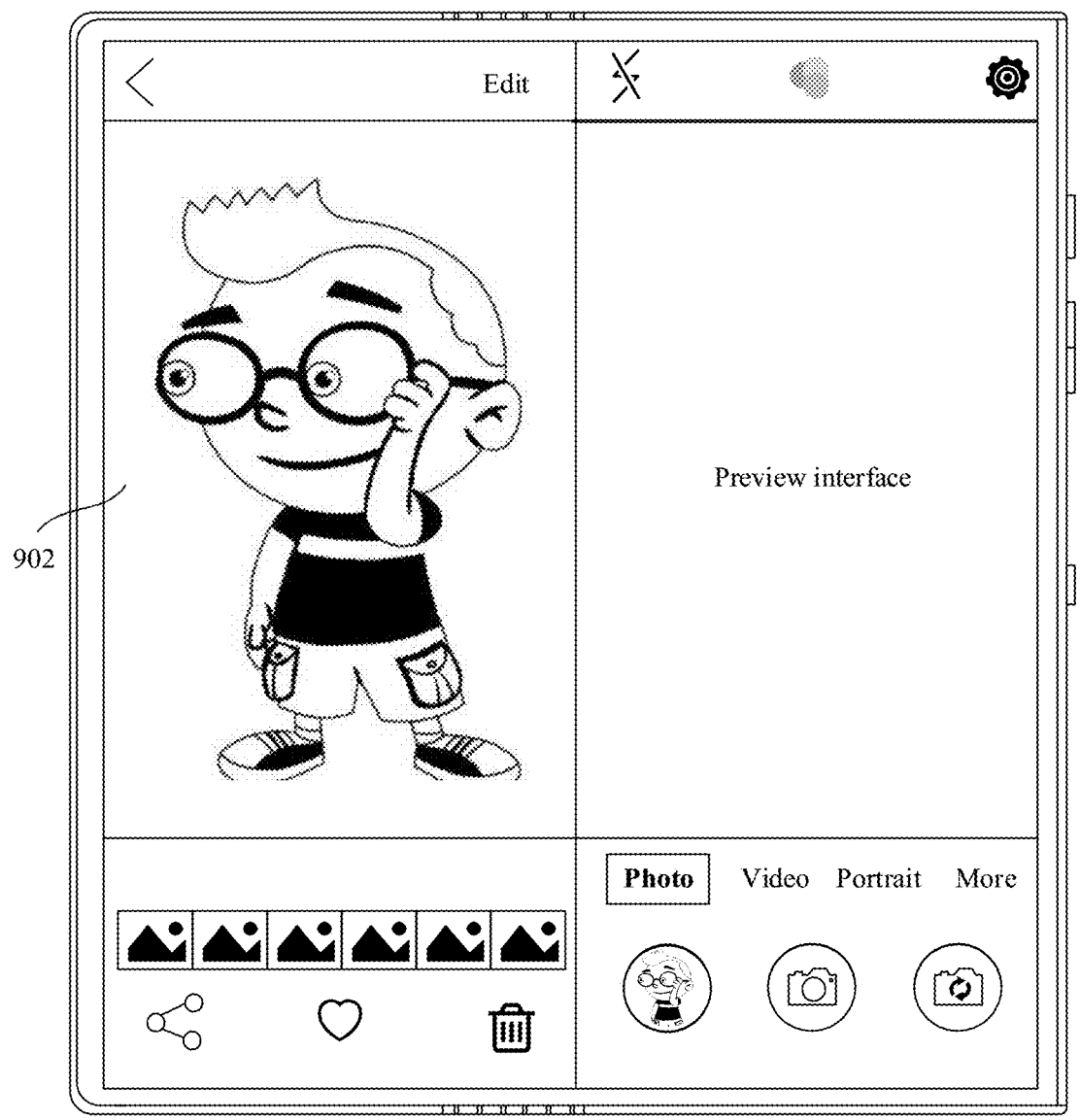
Figure 9E:

After the mobile phone detects that the user taps the deletion control, a change of the GUI may be one of returning to the continuous photographing thumbnail interface, displaying a next picture in a form of a large picture, or displaying a previous picture in a form of a large picture. Refer to FIG. 9(c), FIG. 9(d), and FIG. 9(e). In FIG. 9(c), after the deletion control is tapped, the GUI returns to the continuous photographing thumbnail interface; in FIG. 9(d), after the deletion control is tapped, a next picture in the gallery is displayed in a form of a large picture, that is, an eighth picture 902 in FIG. 9(a); and in FIG. 9(e), after the deletion control is tapped, a previous picture in the gallery is displayed in a form of a large picture, that is, a sixth picture 903 in FIG. 9(a). In the latter two cases, whether a next picture or a previous picture is specifically displayed depends on a picture slide direction in which the user previews pictures before a deletion operation. If the slide direction indicates that a next picture is displayed, a next picture of a deleted picture is displayed after the deletion operation. Alternatively, if the slide direction indicates that a previous picture is displayed, a previous picture of a deleted picture is displayed after the deletion operation. Alternatively, if there is no slide operation before the deletion operation, a next picture is displayed by default. Alternatively, if the last picture in the gallery is currently deleted, the last picture in the gallery is displayed by default after the deletion, that is, a previous picture of the deleted picture is displayed.

Figure 9F:
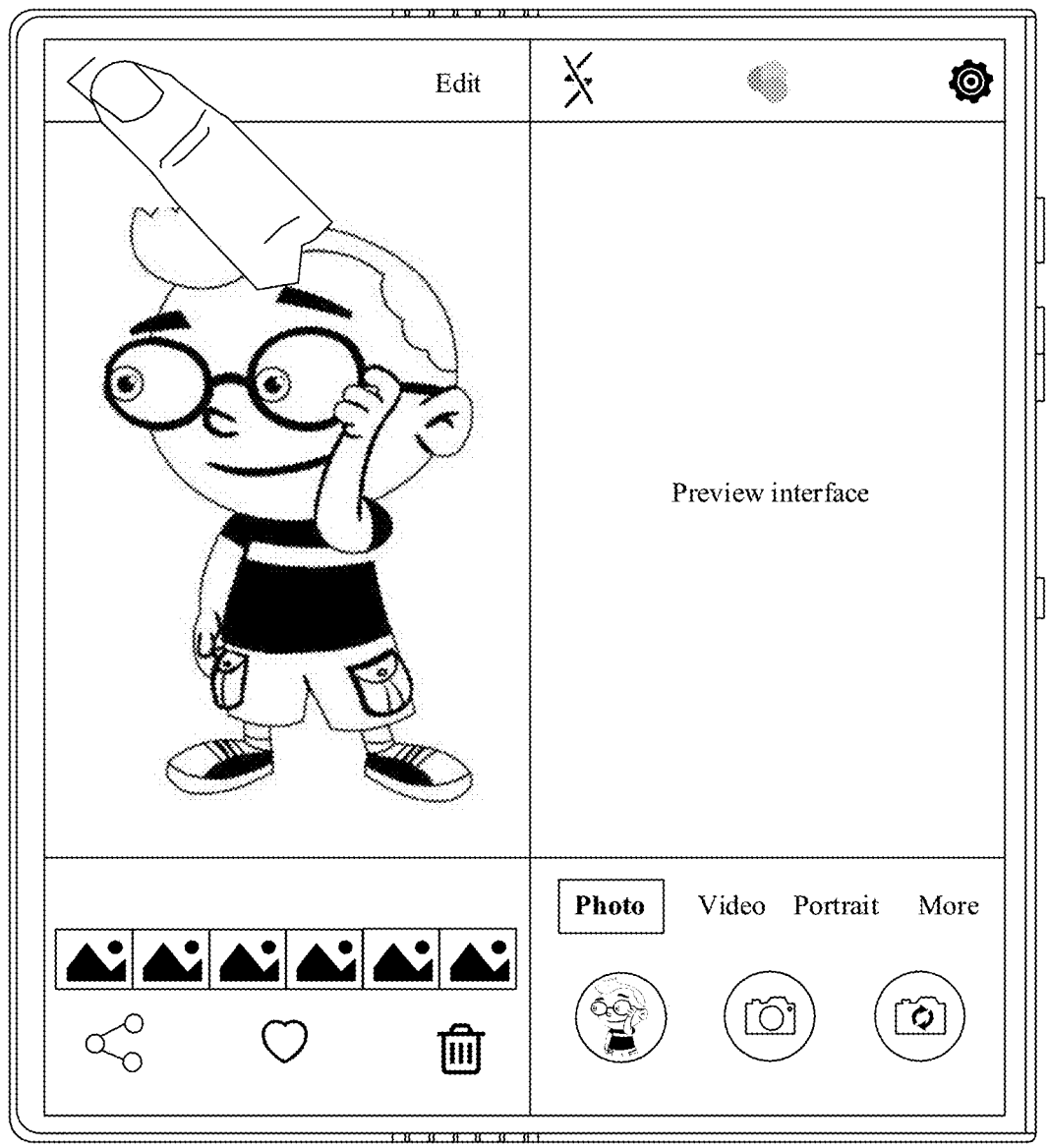
Figure 9G:
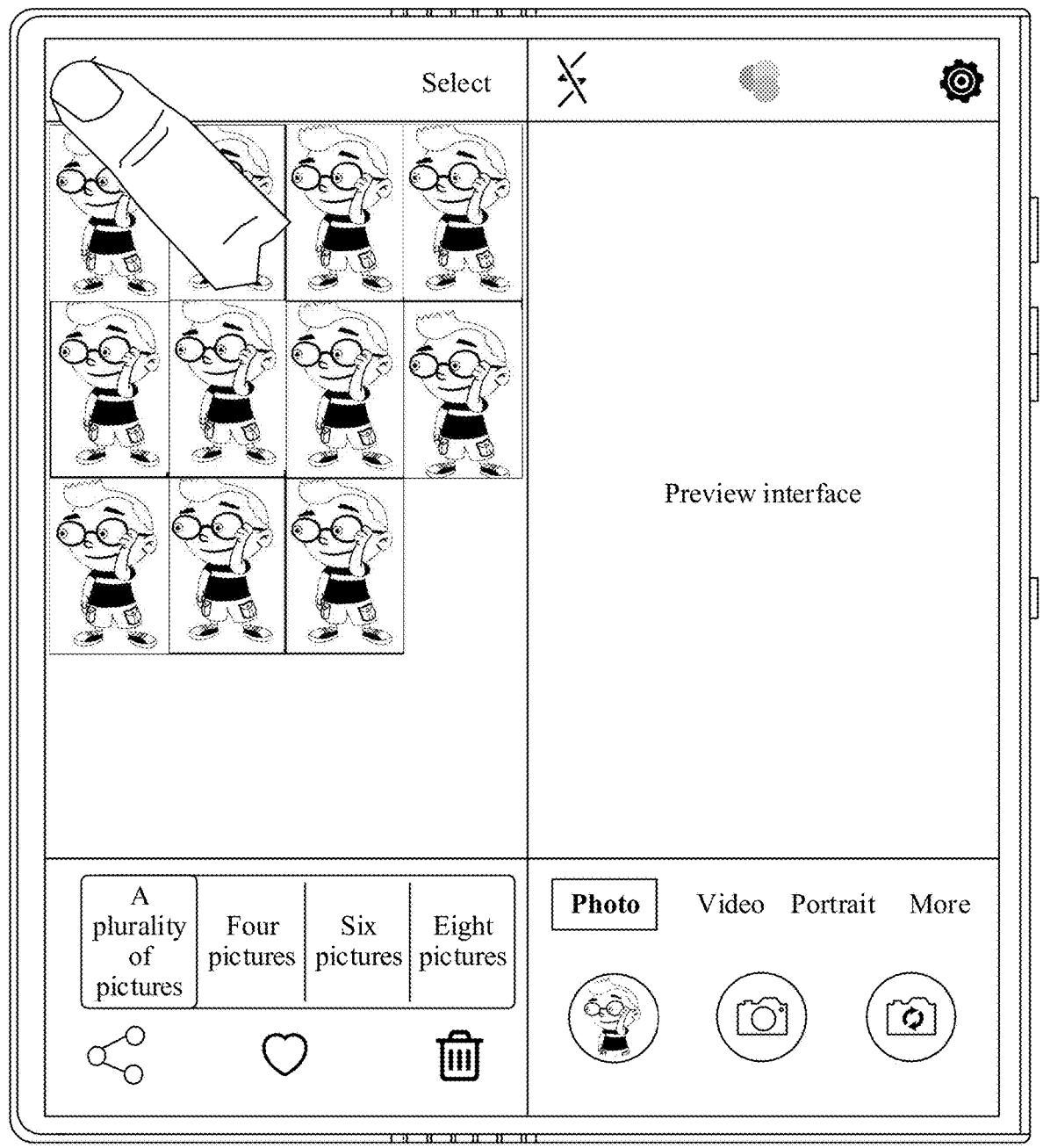
Figure 9H:
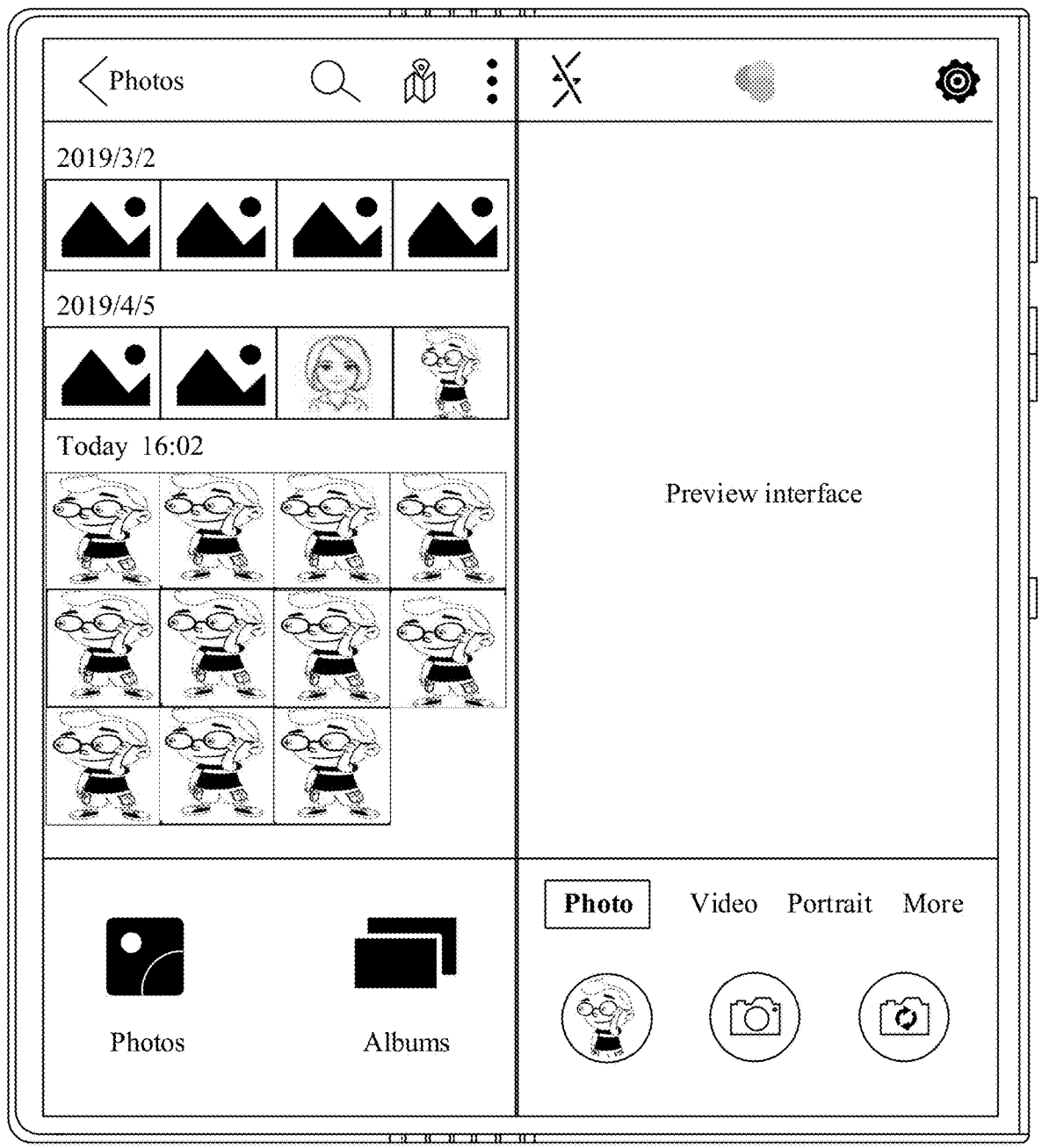

For another example, refer to FIG. 9(f). After the mobile phone detects that the user taps the back control, the GUI on the left screen changes to that in FIG. 9(g), that is, returns to the continuous photographing thumbnail interface. When the user taps the back control again, the GUI on the left screen changes to that in FIG. 9(h), that is, returns to the gallery application interface.

In an embodiment, when the foldable screen of the mobile phone is folded in half, the user may start the camera on the primary screen to perform photographing, and unfold the foldable screen after the photographing is completed. A preview interface is still displayed on the right screen, and a gallery application interface is displayed on the left screen. The gallery application interface is used to display the captured picture.

Figure 10A:
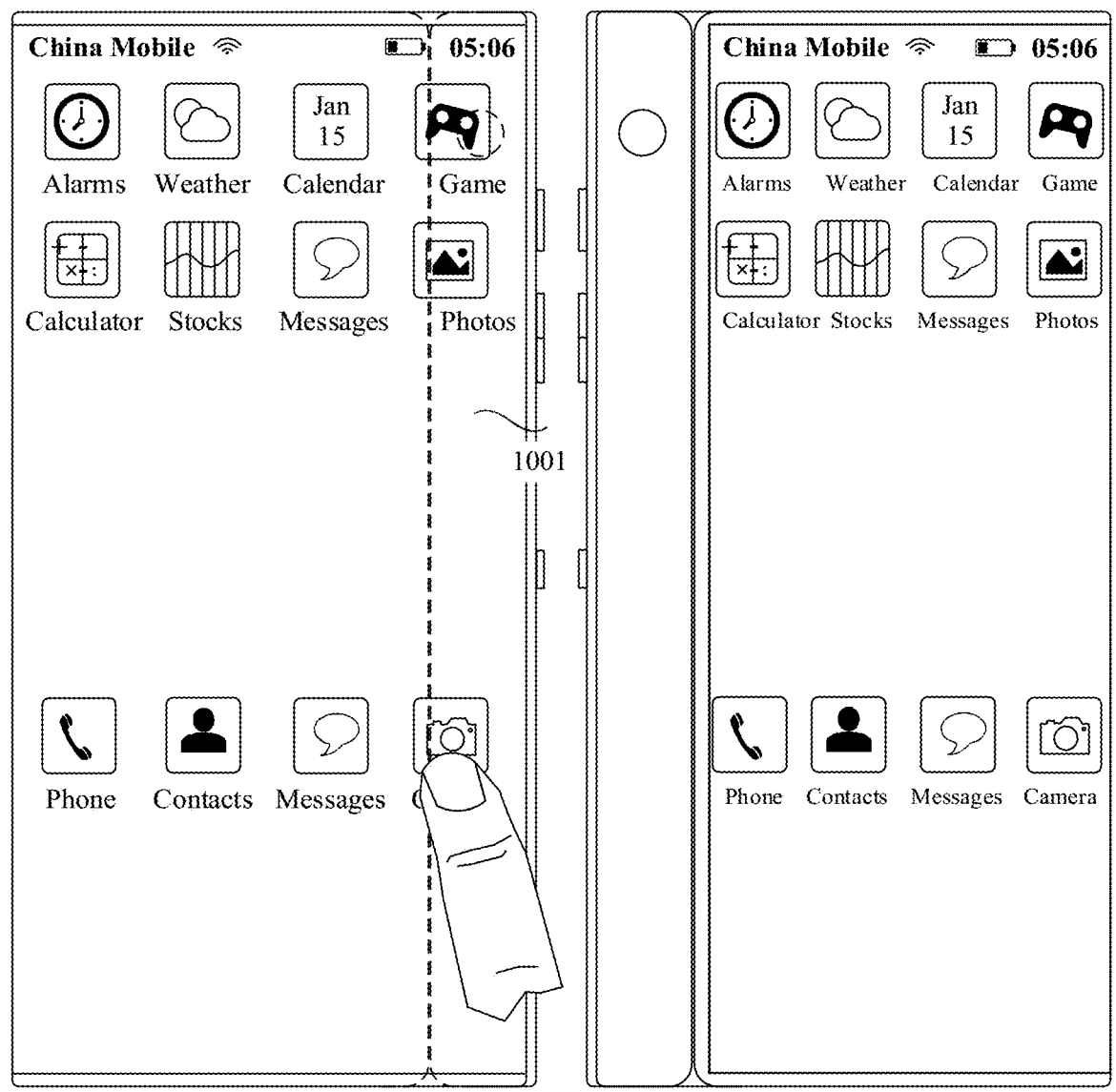
FIG. 10(a) to FIG. 10(d) are a schematic diagram of another group of display interfaces according to an embodiment of this application.
Figure 10B:
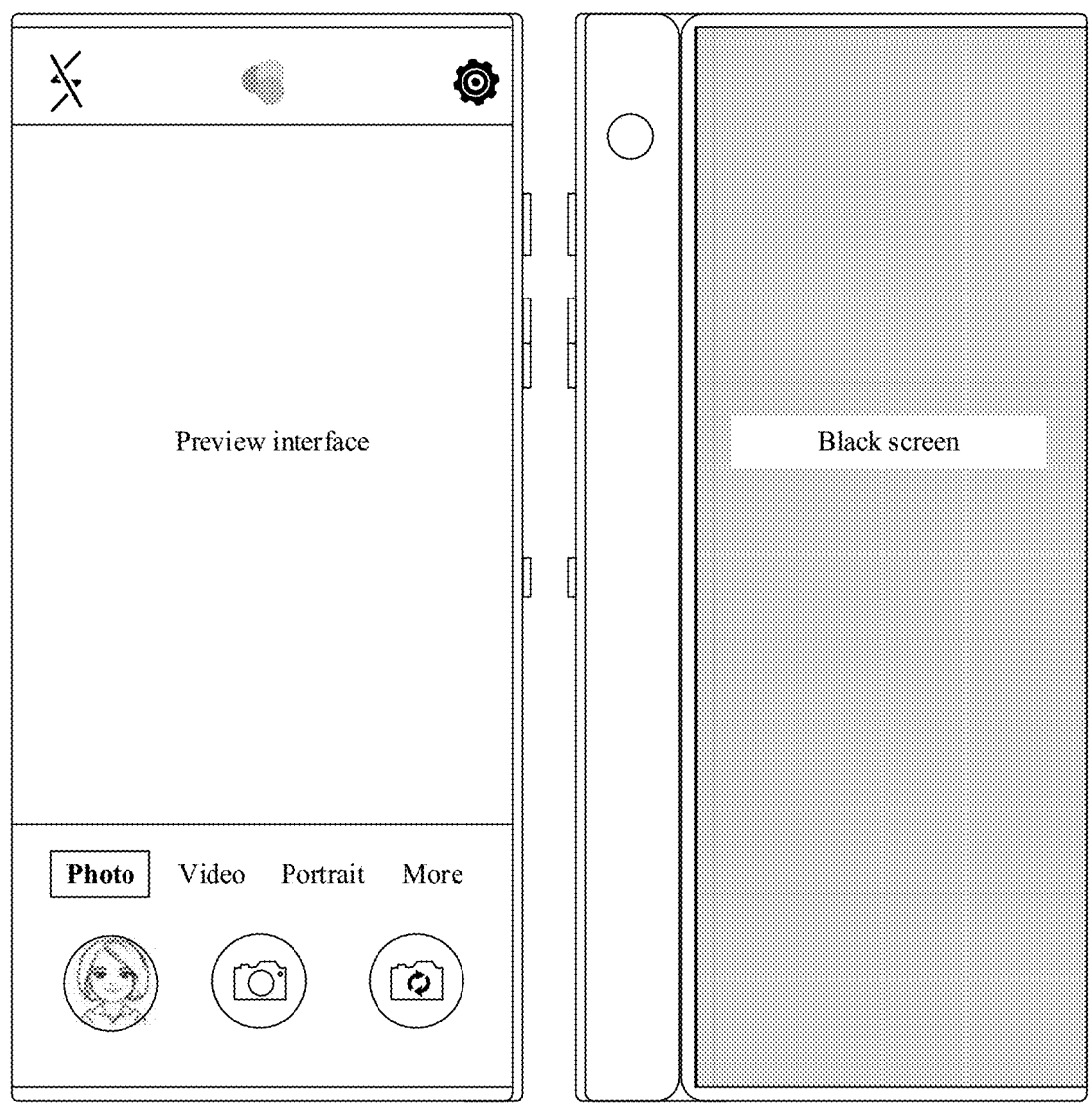
Figure 10C:
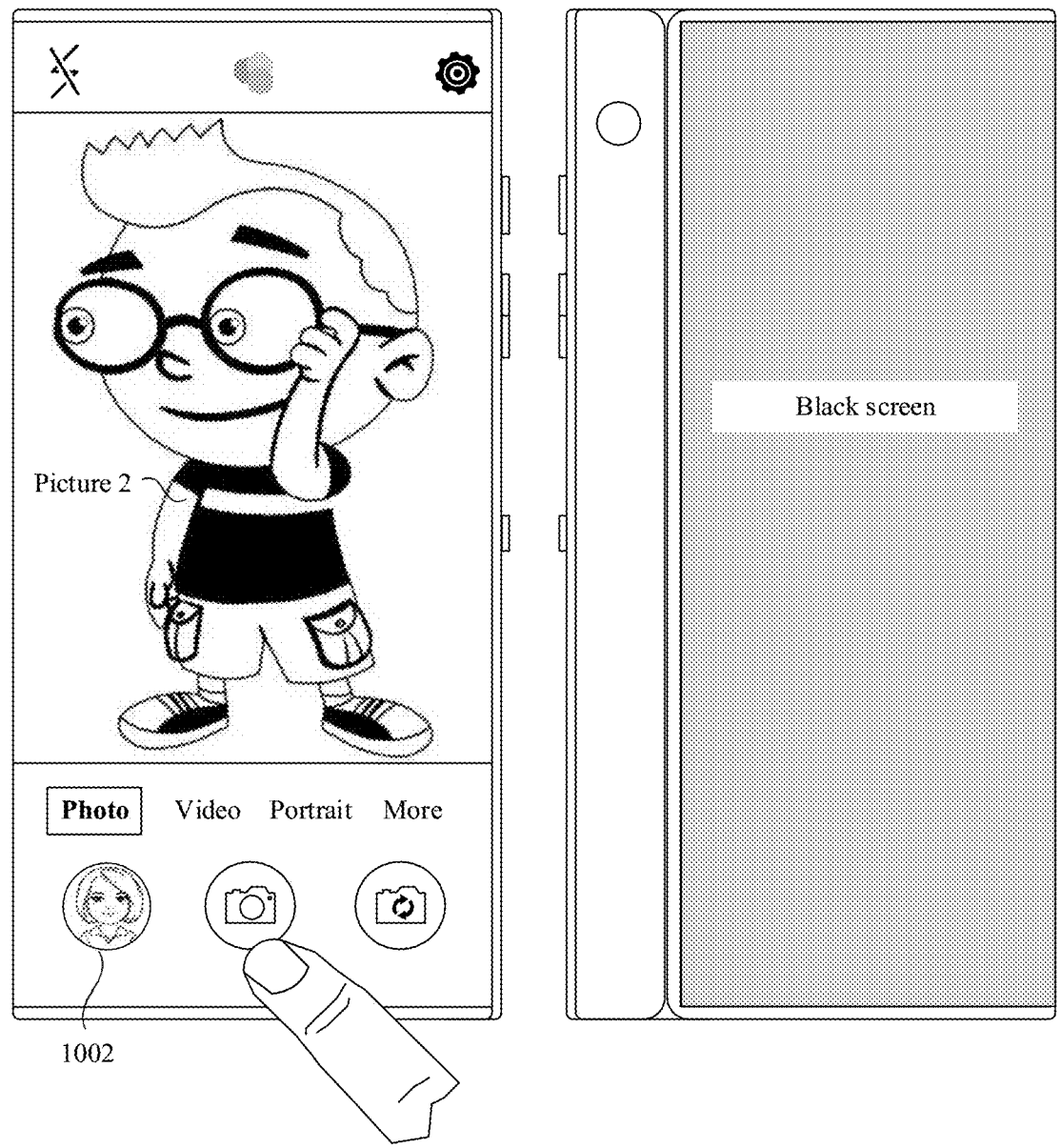
Figure 10D:
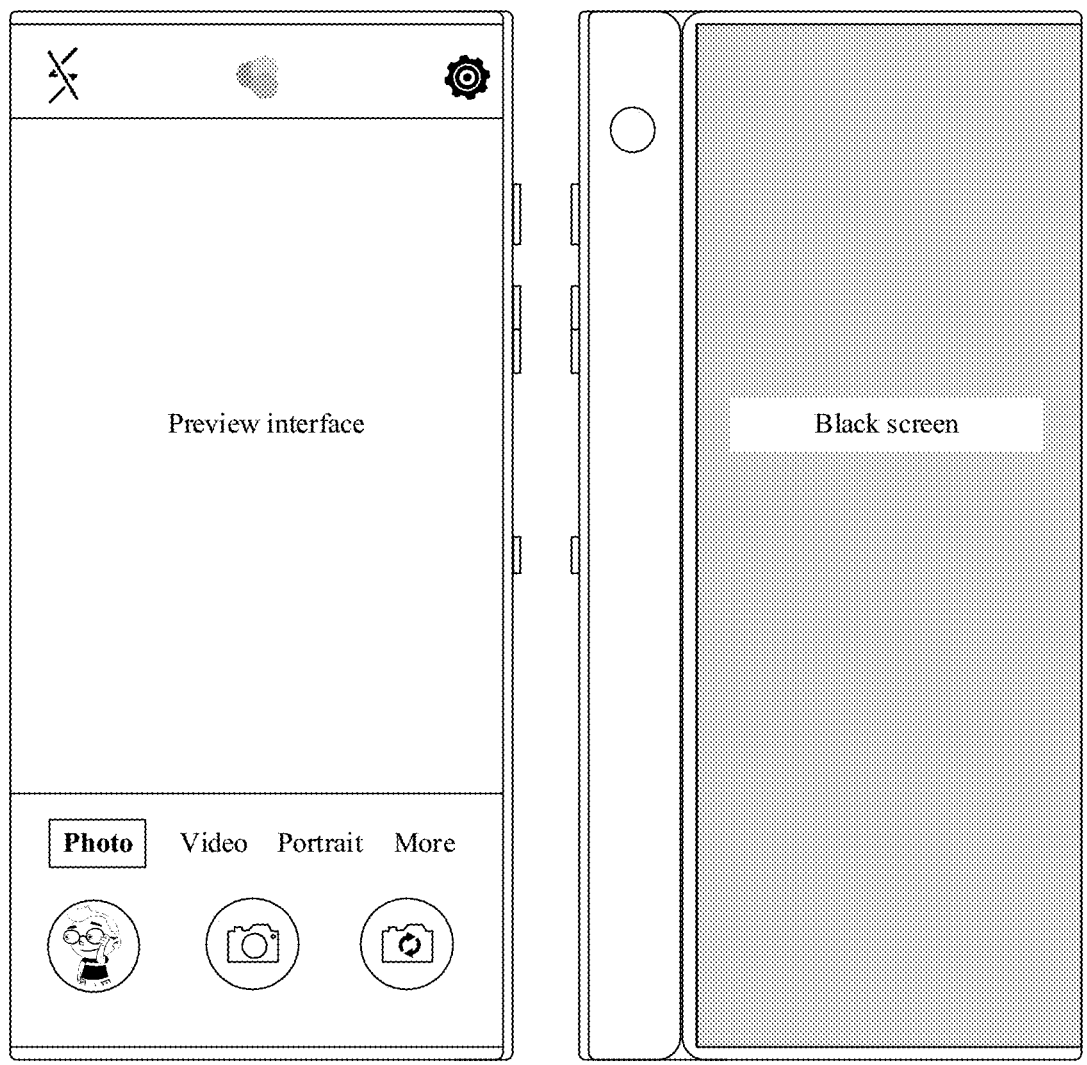

For example, FIG. 10(a) shows graphical user interfaces (graphical user interface, GUI) displayed on a primary screen and a secondary screen when the mobile phone with the foldable screen is in a folded state. The GUI on the primary screen displays a home screen 1001 of the mobile phone. The GUI on the secondary screen is the same as that on the primary screen. After detecting that the user taps an icon of a camera application on the primary screen, the mobile phone may start the camera application, and display another GUI shown in FIG. 10(*b*). In this case, the primary screen displays a preview interface, and the secondary screen is in a black screen state. The preview interface may include a viewfinder frame. In a preview state, the viewfinder frame may display a preview picture in real time.

For example, refer to FIG. 10(*c*). After the mobile phone starts the camera, the viewfinder frame may display a picture 2. The preview interface may further include a control used to indicate a photo mode, a control used to indicate a video mode, a photographing control, and a control 1002 used to associate a gallery application. In this case, the control 1002 used to associate a gallery application displays the last picture in the gallery in a form of a thumbnail. After the mobile phone detects that the user taps the photographing control, the mobile phone performs a photographing operation, and displays an interface shown in FIG. 10(*d*). In this case, the primary screen still displays the preview interface, and the captured picture is stored in the gallery, and is displayed in a form of a thumbnail in the control used to associate a gallery application.

For another example, as shown in FIG. 11(*a*), after the mobile phone performs a photographing action, after the mobile phone detects that the user presses the eject key on the right side of the screen, the foldable screen ejects. FIG. 11(*b*) shows a form in which the foldable screen is in an unfolded state. When the user may unfold the foldable screen, the screen of the mobile phone is evenly divided into two parts, as shown in FIG. 11(*c*). A preview interface is still displayed on the right screen, a gallery application interface is displayed on the left screen, and a captured picture is displayed in a form of a large picture. The gallery application interface displayed on the left of FIG. 11(*c*) may further include a deletion control used to delete a picture, an edition control used to edit a picture, a back control used to return to a thumbnail interface from a gallery application, a sharing control used to share a picture, and a control used to quickly preview a gallery picture thumbnail.

In another embodiment, when the user presses the eject key to unfold the foldable screen, the screen is divided into two parts (in a case of non-even division) by using a hinge as a dividing line. For example, as shown in FIG. 11(*d*), a preview interface is still displayed on the right screen, and a gallery application interface is displayed on the left screen. The gallery application interface is used to display a captured picture. However, because area sizes of the two screens are different, a display area of the gallery application interface is smaller than a display area when the screen is evenly divided. In this case, a picture on the left screen is smaller than a picture when the screen is evenly divided.

Figure 12A:
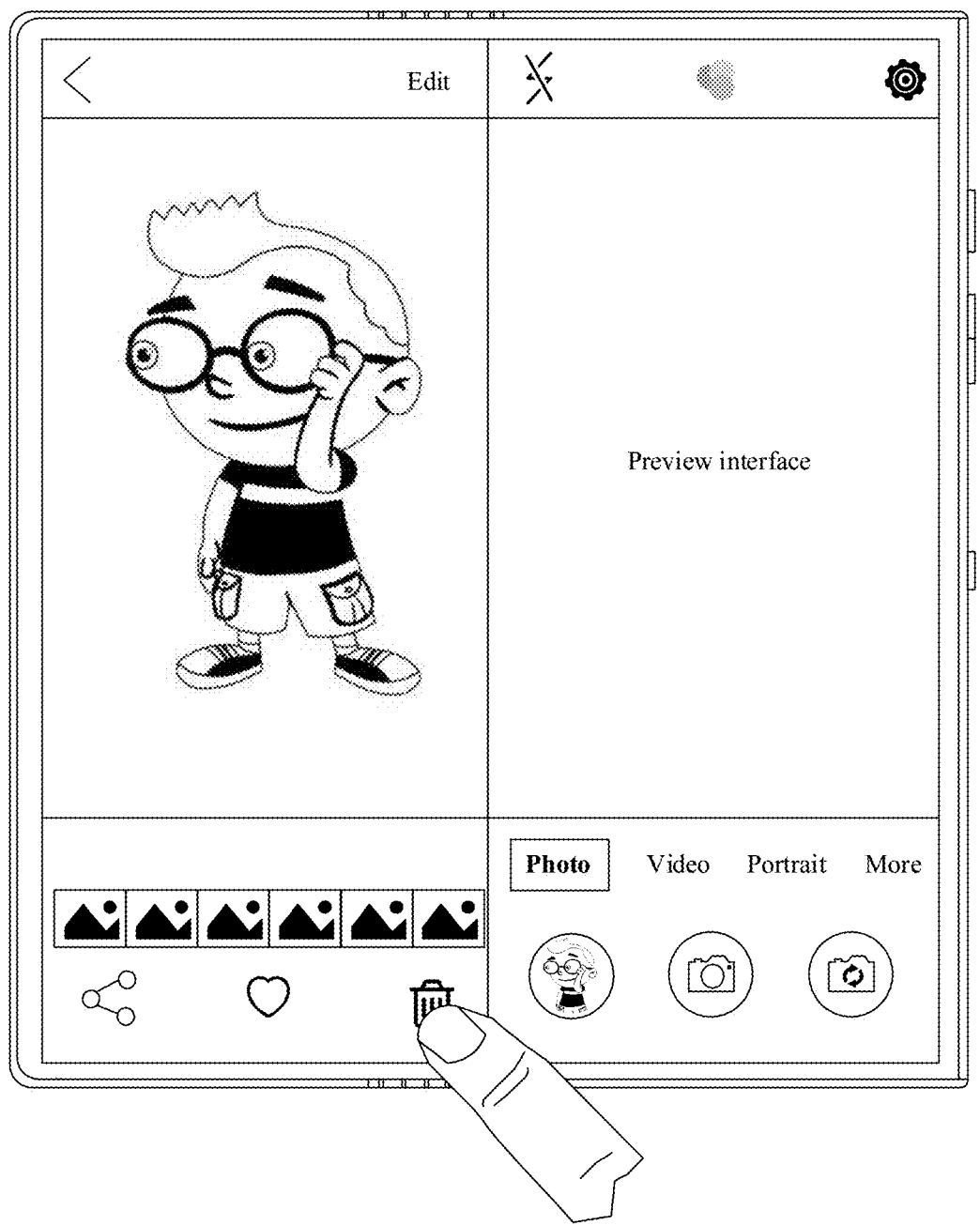
FIG. 12(a) and FIG. 12(b) are a schematic diagram of another group of display interfaces according to an embodiment of this application.

For another example, as shown in FIG. 12(*a*), after detecting that the user taps the deletion control, the mobile phone deletes a captured picture. In this case, the GUI changes to that in FIG. 12(*b*), that is, from split-screen display (the preview interface is displayed on the right, and the gallery application interface is displayed on the left) to displaying the preview interface in full screen. In this case, the user may choose to continue capturing a new picture in full screen. In this case, the case is the same as that in the foregoing embodiment. If the user chooses to fold the foldable screen and then perform photographing, the primary screen displays the preview interface, and the secondary screen is in a black screen state.

Figure 13A:
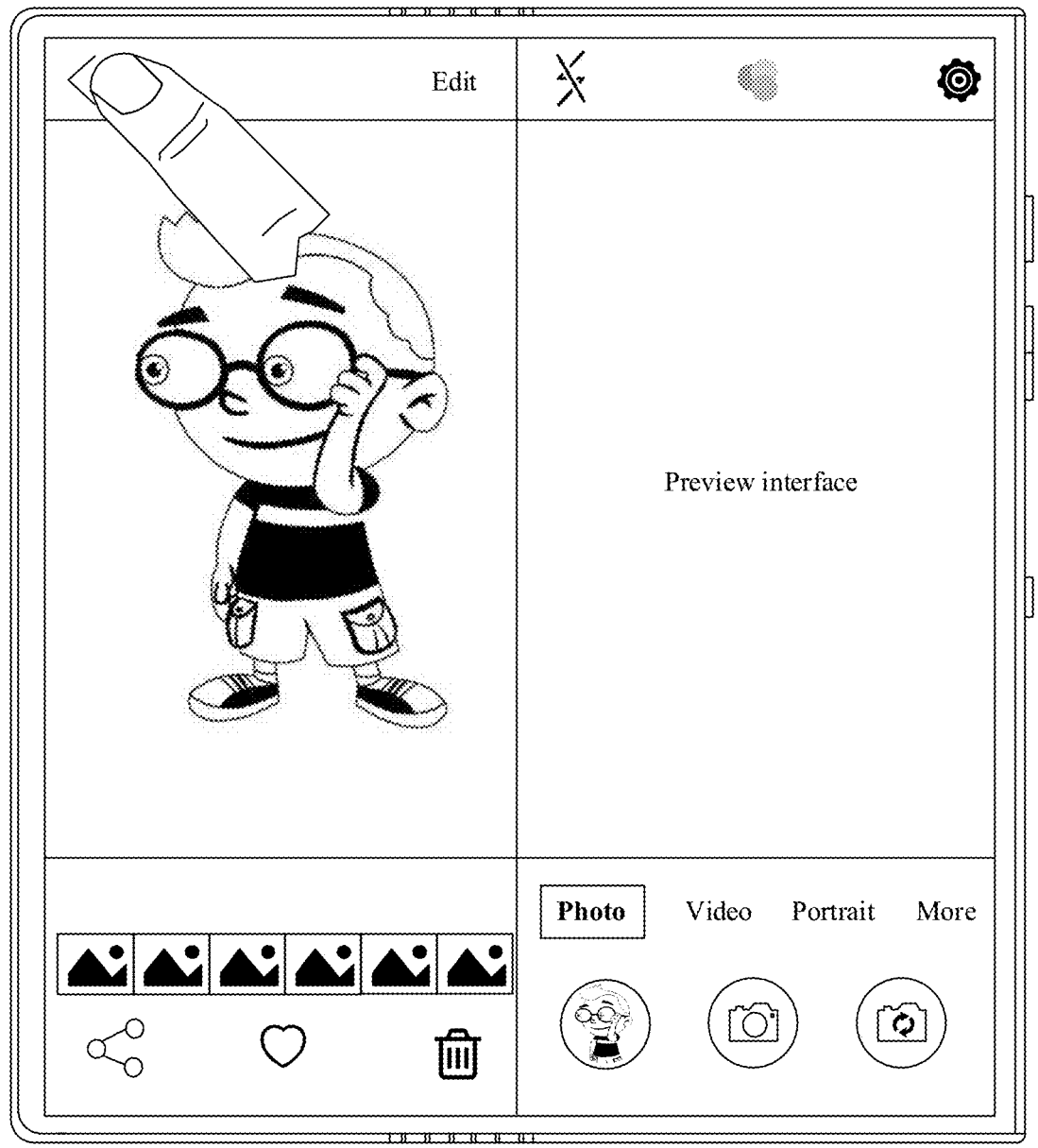
FIG. 13(a) and FIG. 13(b) are a schematic diagram of another group of display interfaces according to an embodiment of this application.

For another example, as shown in FIG. 13(*a*), after the mobile phone detects that the user taps the back control, the GUI changes to that in FIG. 13(*b*), and a gallery picture is displayed on the left screen in a form of a thumbnail, so that the user quickly previews the gallery picture.

In an embodiment, when the foldable screen of the mobile phone is folded in half, the user may start the camera on the primary screen, tap a control that is on the primary screen and that is used to simultaneously display a preview interface on the primary screen and the secondary screen, and perform photographing. In this case, both the primary screen and the secondary screen may display a captured picture. In addition, after the photographing is completed, if the user unfolds the foldable screen, the captured picture is displayed in full screen.

For example, FIG. 14(*a*) shows a graphical user interface when the mobile phone with the foldable screen is in a folded state. When the foldable screen is in a folded state, after detecting that the user taps an icon of a camera application on the primary screen, the mobile phone may start the camera application, and display another GUI shown in FIG. 14(*b*). In this case, the primary screen displays a complete preview interface, and the secondary screen is in a black screen state. The preview interface on the primary screen may include a viewfinder frame, a control used to indicate a photo mode, a control used to indicate a video mode, a photographing control, a control used to associate a gallery, and a control 1401 used to simultaneously display the preview interface on the primary screen and the secondary screen.

For example, refer to FIG. 14(*c*). After detecting that the user taps the control 1401 used to simultaneously display the preview interface on the primary screen and the secondary screen, the mobile phone displays an interface shown in FIG. 14(*d*). In this case, both the primary screen and the secondary screen display the preview interface. The control 1401 that is on the primary screen and that is used to simultaneously display the preview interface on the primary screen and the secondary screen is lit. For example, when the control 1401 is displayed in bold type, the control 1401 is in a lit state.

Figure 15A:
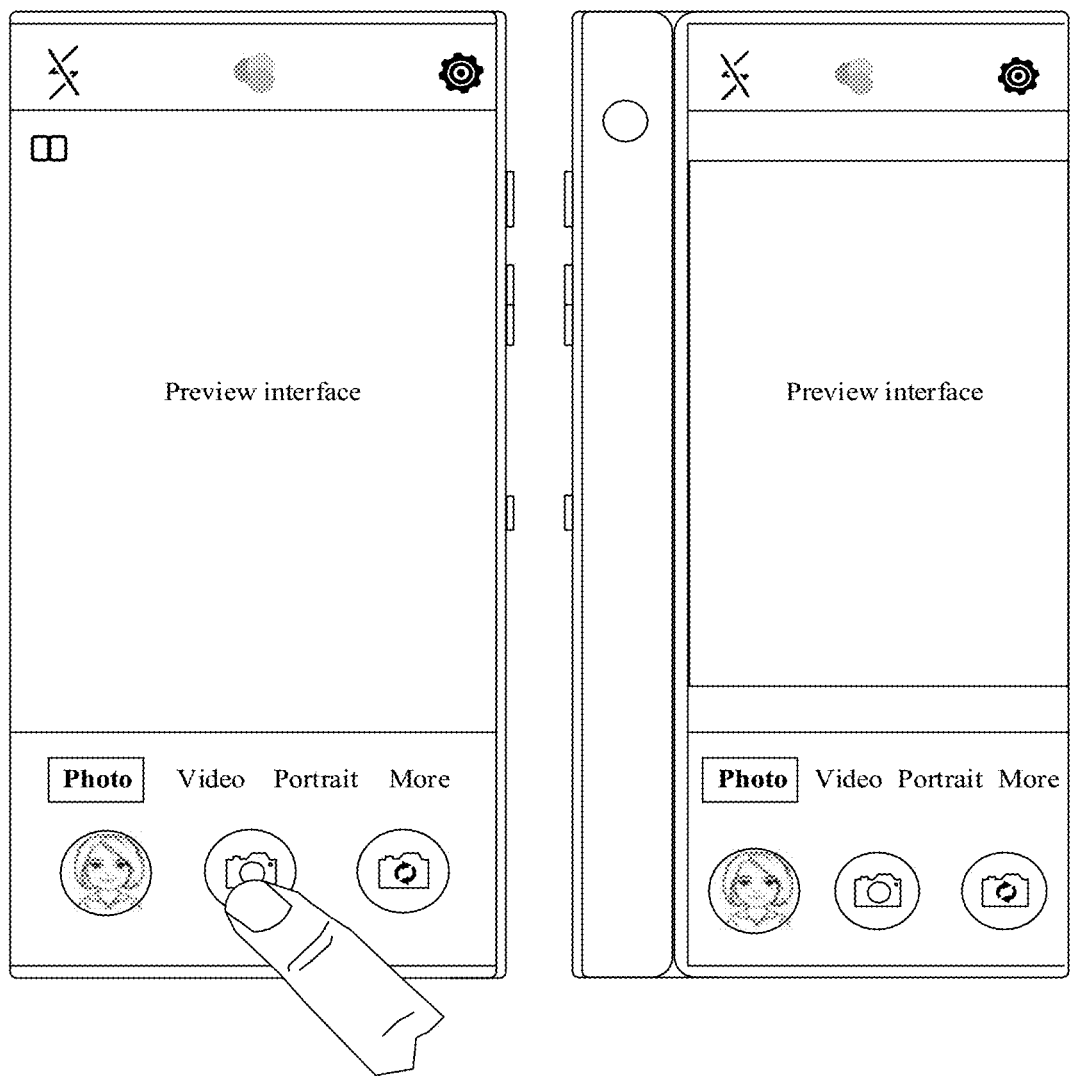
FIG. 15(a) and FIG. 15(b) are a schematic diagram of another group of display interfaces according to an embodiment of this application.
Figure 15B:
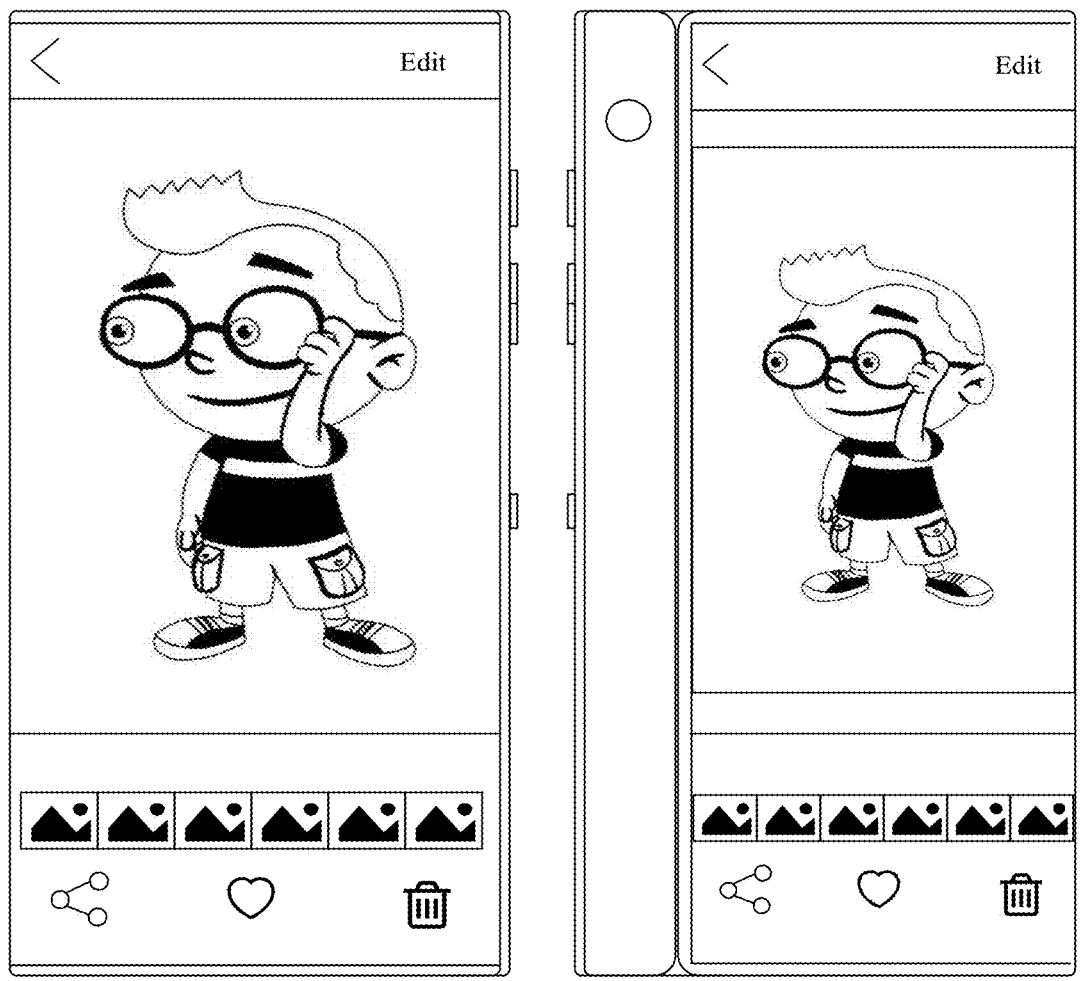

For example, refer to FIG. 15(*a*). After the mobile phone detects that the user taps the photographing control, the screen of the mobile phone is shown in FIG. 15(*b*). In this case, both the primary screen and the secondary screen display a gallery application interface. The gallery application interface displays a captured picture. Both the user and a photographed person can edit, share, and delete the picture.

Figure 16A:
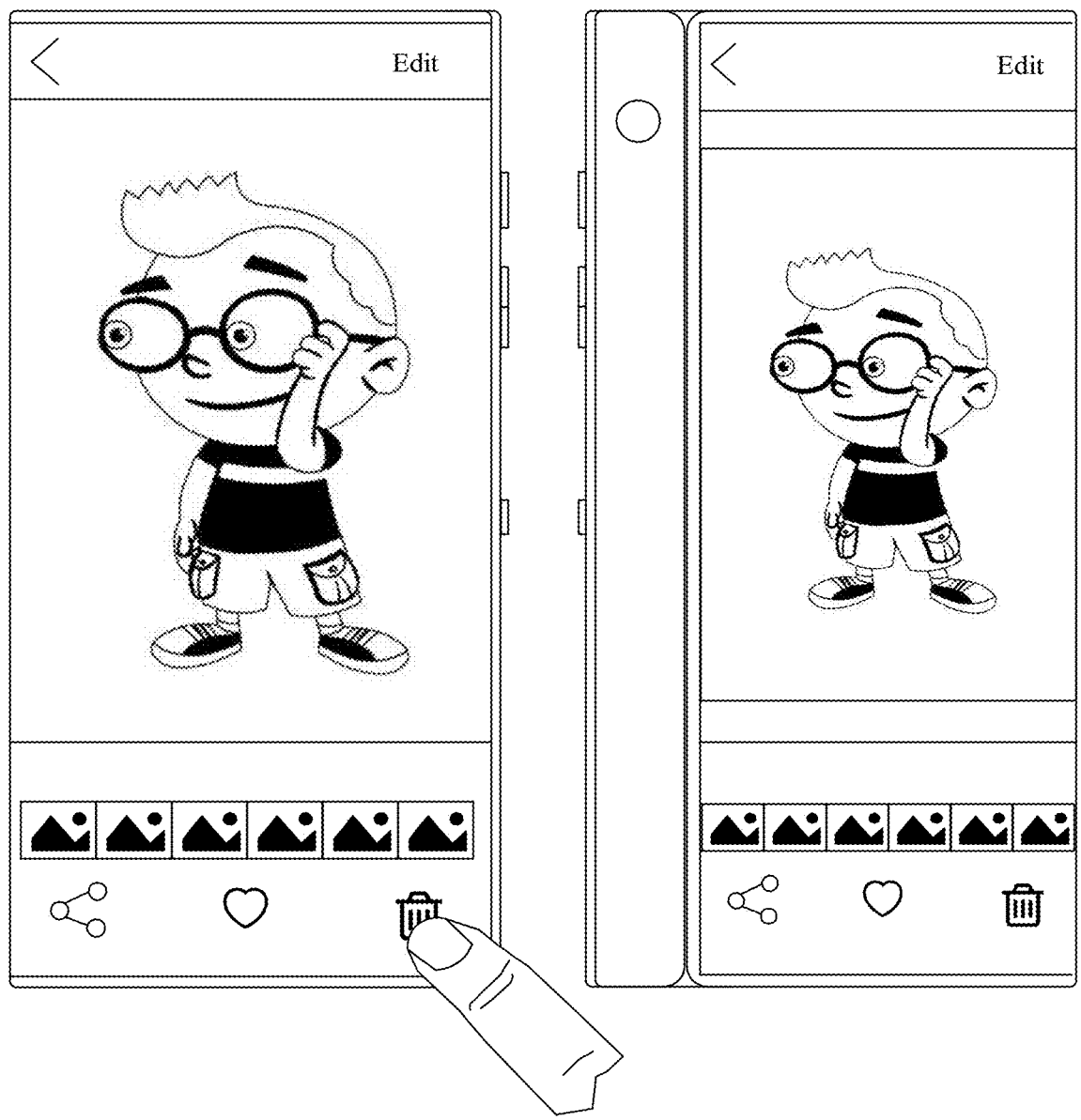
FIG. 16(a) and FIG. 16(b) are a schematic diagram of another group of display interfaces according to an embodiment of this application.
Figure 16B:
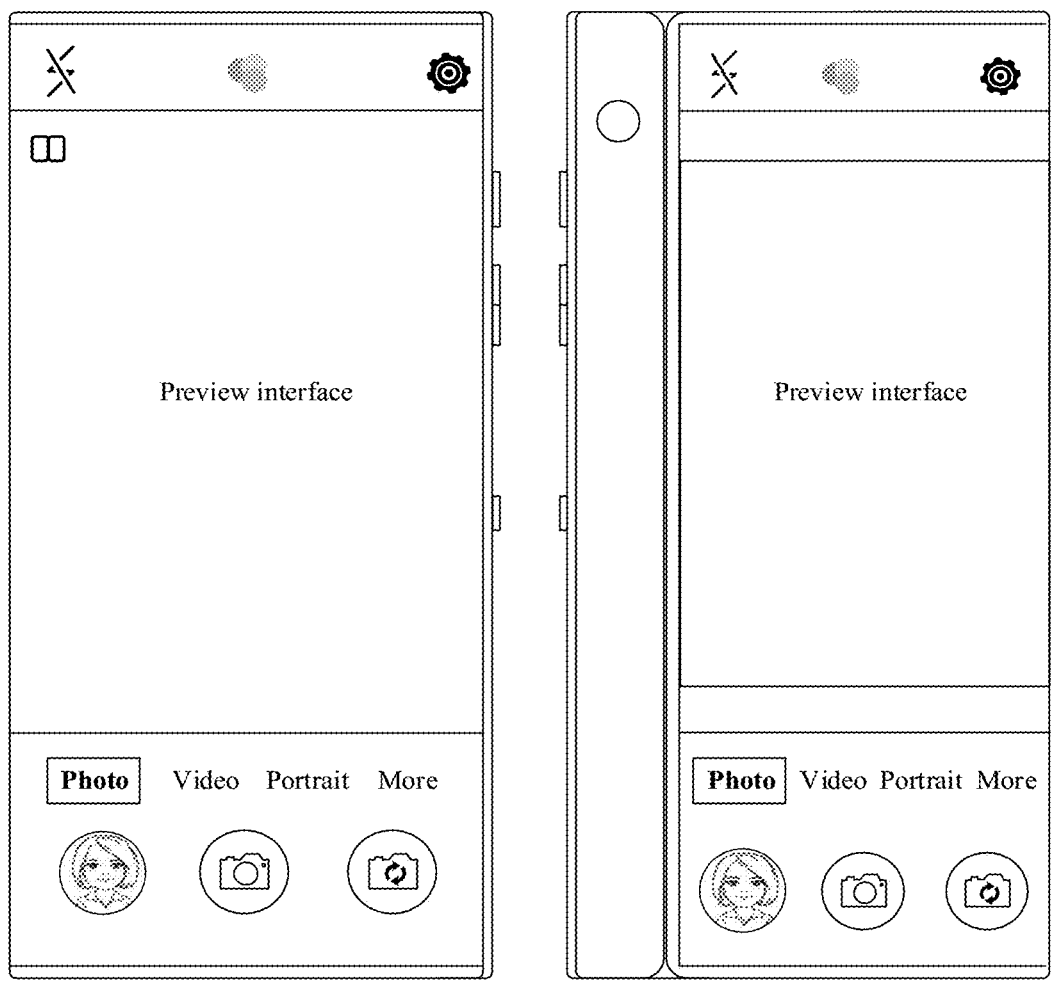

For another example, as shown in FIG. 16(*a*), after detecting an operation of tapping the deletion control on the screen, the mobile phone deletes a captured picture. In this case, as shown in FIG. 16(*b*), the primary screen and the secondary screen return to the preview interface. The user and a photographed person can choose to continue capturing a new picture.

Figure 17A:
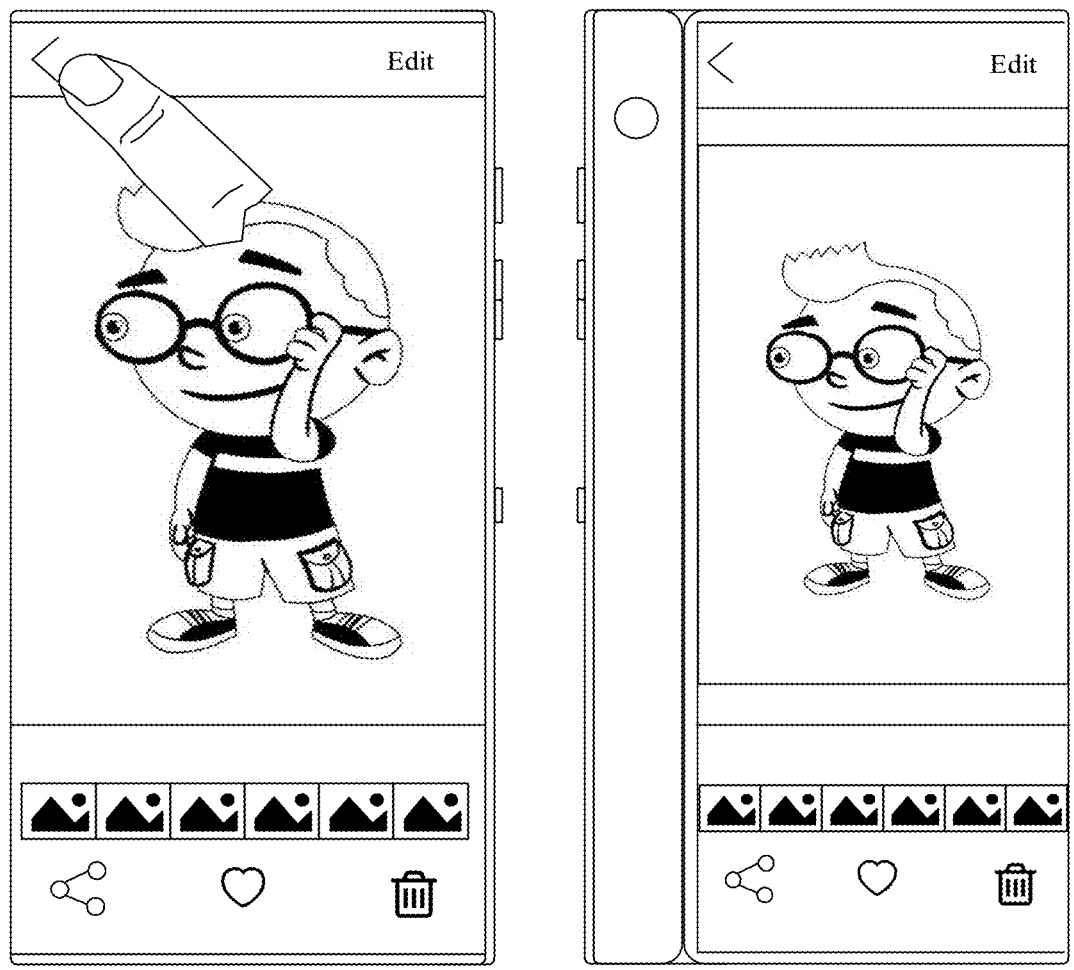
FIG. 17(a) and FIG. 17(b) are a schematic diagram of another group of display interfaces according to an embodiment of this application.
Figure 17B:
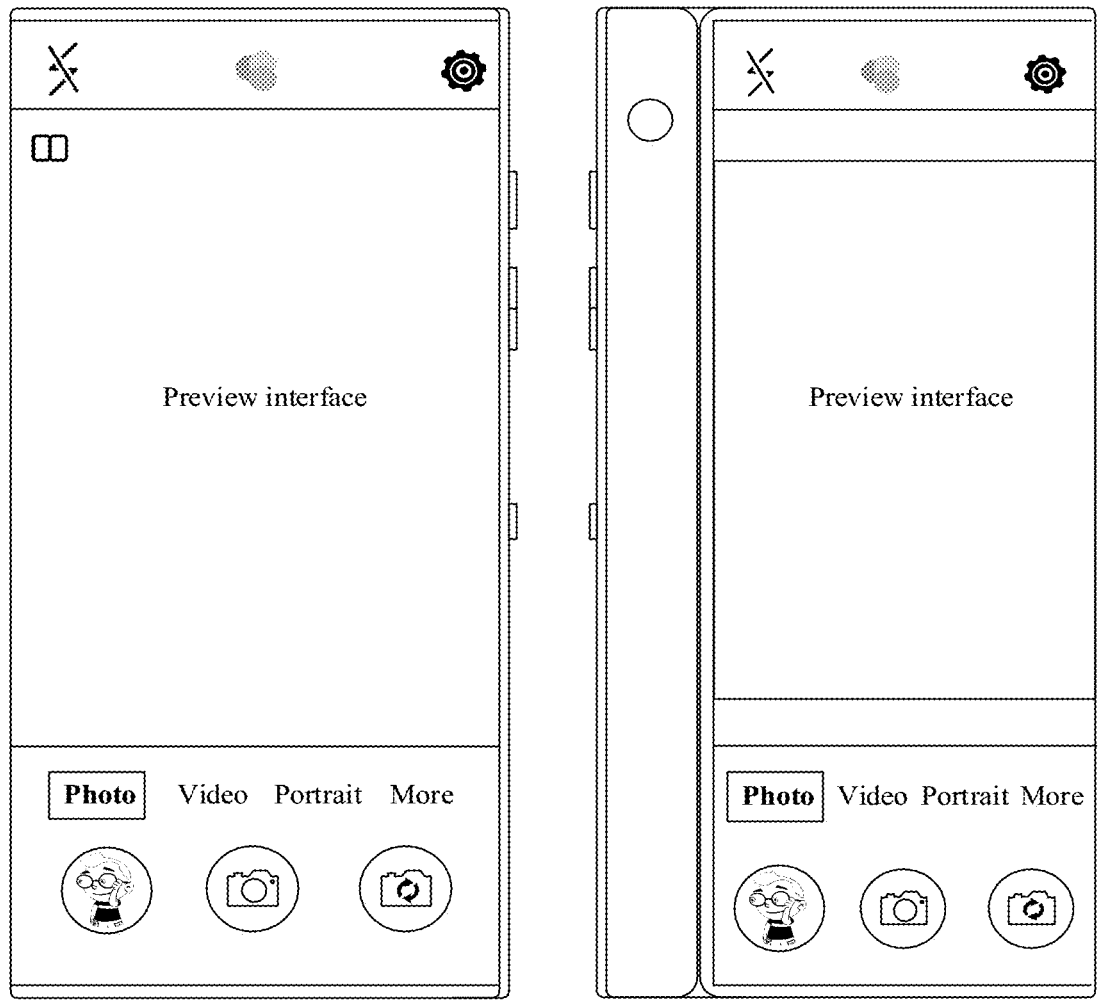

For another example, as shown in FIG. 17(*a*), after the mobile phone detects an operation of tapping the back control on the screen, as shown in FIG. 17(*b*), the primary screen and the secondary screen return to the preview interface. The user and a photographed person can choose to continue capturing a new picture.

Figure 18A:
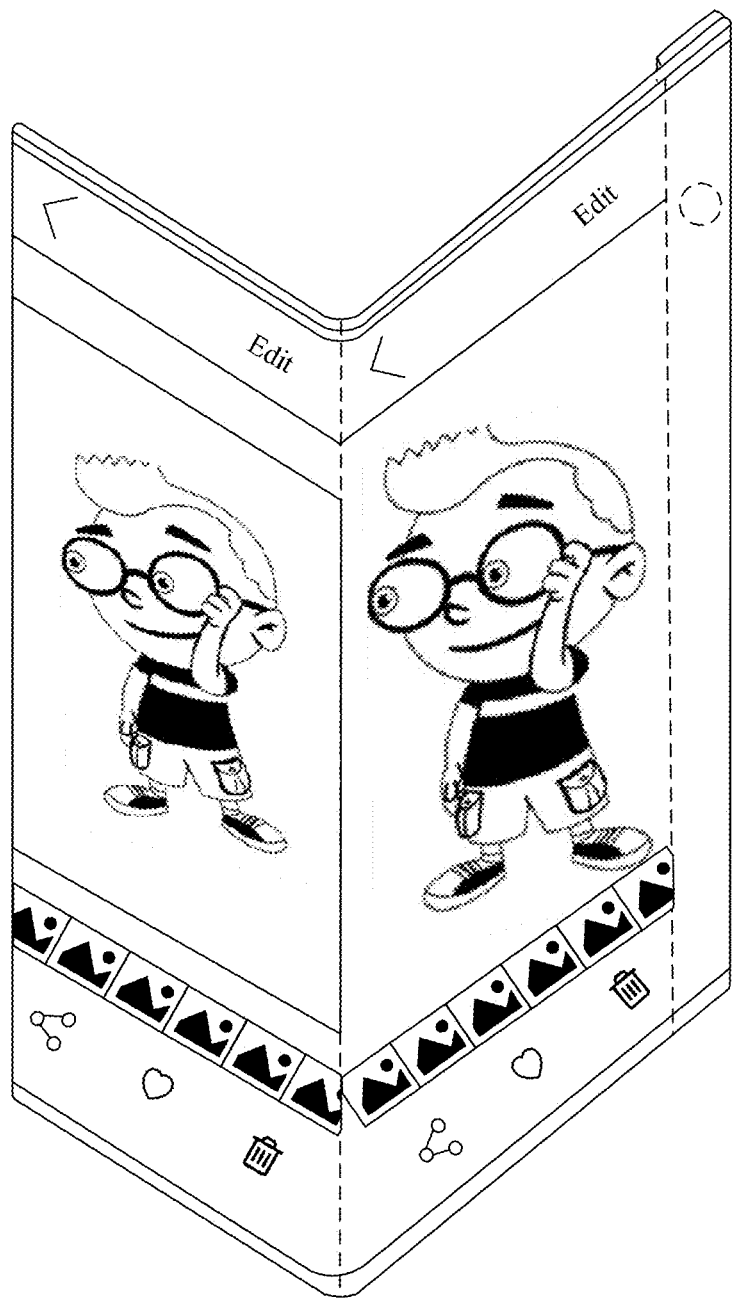
FIG. 18(a) and FIG. 18(b) are a schematic diagram of another group of display interfaces according to an embodiment of this application.
Figure 18B:

For another example, as shown in FIG. 18(*a*), the user unfolds the foldable screen after capturing a picture. In this case, as shown in FIG. 18(*b*), the primary screen and the secondary screen are combined into one complete screen, and the captured picture is displayed in full screen, so that the user can view the picture. In this case, the user may edit, share, and delete the picture. If the user taps the back control, the preview interface is displayed in full screen again.

Figure 19:
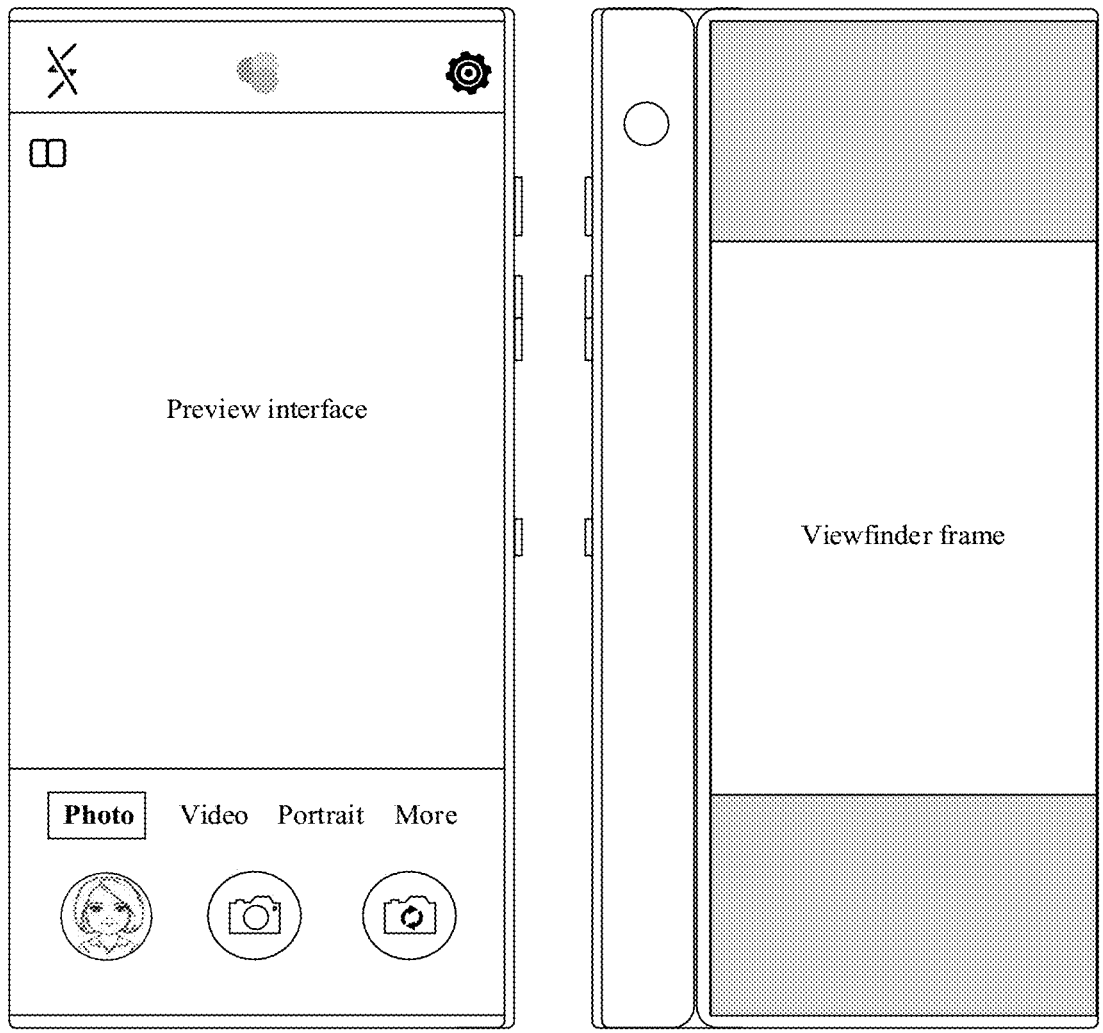
FIG. 19 is a schematic diagram of another group of display interfaces according to an embodiment of this application.

In another embodiment, after detecting that the user taps a control used to simultaneously display a photographing interface on the primary screen and the secondary screen, the mobile phone displays another GUI shown in FIG. 19. In this case, the secondary screen displays only a viewfinder frame. The viewfinder frame may display a same preview picture as a viewfinder frame on the primary screen in real time.

In any one of the foregoing embodiments, when the screen is in an unfolded state, for example, if the user edits the pictured picture, after the edition button is tapped, the screen of the mobile phone automatically enters an interface for editing the picture in full screen, so as to facilitate edition by the user.

For example, refer to FIG. 20(*a*). After the mobile phone detects that the user taps the edition control, the GUI changes to that in FIG. 20(*b*), that is, enters a full-screen edition state. The GUI may be referred to as an edition interface 2001. The edition interface 2001 may further include a control 2002 used to cancel edition, a control 2003 used to crop a picture size, a control 2004 used to modify a picture filter, a control 2005 used to select other more functions, a control 2006 used to save edition after the complete edition, and a back control 2007 used to return to a split-screen preview interface from an edition interface. Refer to FIG. 7(*c*). After the mobile phone detects that the user taps the back control, the GUI returns to the split-screen preview interface, that is, the preview interface is displayed on the right, and the gallery application interface is displayed on the left.

In an embodiment, the foldable screen is in an unfolded state, the user starts the camera, and the screen is evenly divided into two parts after a picture is captured. A preview interface is displayed on a same screen as a camera placement location, and a picture and a photographing guide that are recommended by a network are displayed on the other screen. The network recommends a best picture template based on a photographing location or a photographing light scenario for reference by the user.

For example, FIG. 21(*a*) shows a graphical user interface when the mobile phone with the foldable screen is unfolded. After detecting that the user taps an icon of a camera application on the home screen, the mobile phone may start the camera application, and display another GUI shown in FIG. 21(*b*). In the GUI, the screen of the mobile phone is evenly divided into two parts, that is, split-screen display is implemented. A preview interface is displayed on the right screen, and a picture and a photographing guide that are recommended by a network are displayed on the left screen, which may be referred to as a recommendation interface 2101. In this case, the mobile phone learns that the user is located in Hong Kong Disney. Therefore, the recommendation page is used to recommend, to the user, a guide suitable for performing photographing in Hong Kong Disney, and the user may preview, by performing a slide operation, the photographing guide recommended on the recommendation interface 2101. As shown in FIG. 21(*c*), after the mobile phone detects that the user taps the photographing control, the mobile phone performs a photographing operation, and displays FIG. 21(*d*). In this case, the primary screen still displays the preview interface, and the secondary screen displays the gallery application interface. A captured picture is displayed in a form of a large picture.

The mobile phone may record a recommended filter type selected by the user in recommended content each time, to serve as a basis for next recommendation, so as to recommend a photographing guide that is more suitable for user's preference to the user.

After detecting that the user taps the deletion control, the mobile phone deletes a captured picture. In this case, the GUI returns to the right screen to display a photographing interface, and the left screen displays a picture and a photographing guide that are recommended by the network. In this case, the user may continue to select another template recommended by the network to capture a new picture.

When the mobile phone detects that the user taps the back control, a preview interface is still displayed on the right screen, and a gallery application interface is displayed on the left screen. The gallery application interface displays a gallery picture in a form of a thumbnail, so that the user can quickly preview the gallery picture.

In an embodiment, the foldable screen is in an unfolded state, and the user starts the camera. In this case, the screen is divided into two parts. A preview interface is displayed on a same screen as a camera placement location, and a gallery application interface is displayed on the other screen. The gallery application interface displays the last captured picture in the gallery by default.

For example, FIG. 22(*a*) shows a graphical user interface when the mobile phone with the foldable screen is unfolded. After detecting that the user taps an icon of a camera application on the home screen, the mobile phone may start the camera application, and display another GUI shown in FIG. 22(*b*). In the GUI, the screen of the mobile phone is evenly divided into two parts, that is, split-screen display is implemented. A preview interface is displayed on the right screen, where the preview interface displays a picture 3, and a gallery application interface is displayed on the left screen. In this case, the gallery application interface displays the last captured picture in the gallery by default. After the mobile phone detects that the user taps the photographing control, the mobile phone performs a photographing operation, and displays an interface shown in FIG. 22(*c*). The preview interface is still displayed on the right screen, and a captured picture is displayed on the left screen. The gallery application interface displayed on the left of FIG. 22(*c*) may further include a deletion control used to delete a picture, an edition control used to edit a picture, a back control used to return to a thumbnail interface from a gallery application, a sharing control used to share a picture, and a control used to quickly preview a gallery picture thumbnail. In this case, the user may edit, share, or delete a newly captured picture.

After detecting that the user taps the deletion control, the mobile phone deletes a captured picture. In this case, the GUI returns to that in FIG. 22(*b*), a preview interface is displayed on the right screen, and a gallery application interface is displayed on the left screen. The gallery application interface displays the last picture in the gallery.

For example, as shown in FIG. 22(*d*), after the mobile phone detects that the user taps the back control, the GUI changes to that in FIG. 22(*e*), and a gallery picture is displayed on the left screen in a form of a thumbnail, so that the user quickly previews the gallery picture. In this case, if the user continues to perform photographing, as shown in FIG. 22(*f*), a newly captured picture is displayed in the gallery picture in a form of a thumbnail. In this case, the user may make a quick preview and delete an unwanted picture.

Figure 23:
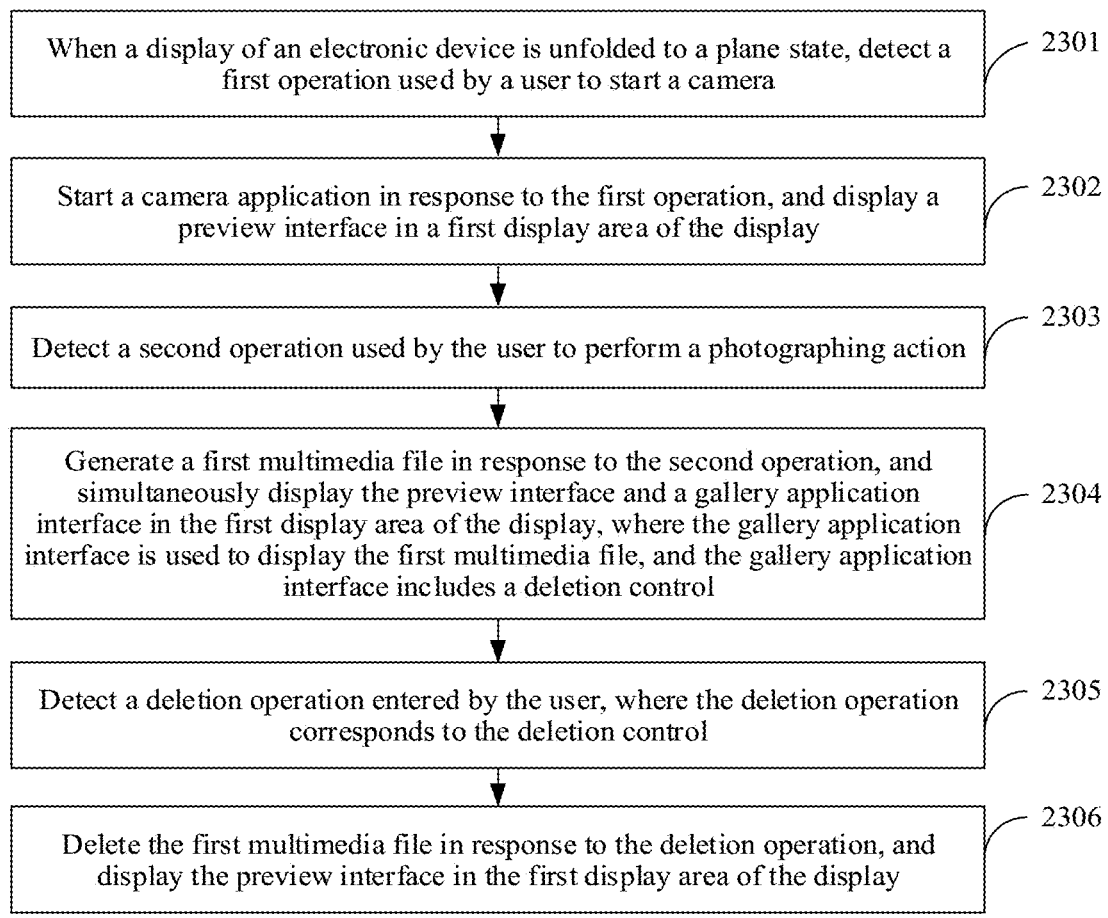
FIG. 23 is a flowchart of a photographing method according to an embodiment of this application.

With reference to the foregoing embodiments and related accompanying drawings, an embodiment of this application provides a photographing method. The method may be implemented in the electronic device shown in FIG. 1 to FIG. 4(a) to FIG. 4(c). As shown in FIG. 23, the method may include the following steps.

2301: When a display of the electronic device is unfolded to a plane state, detect a first operation used by a user to start a camera.

For example, a graphical user interface when the display of the electronic device is in an unfolded state may be the case shown in the home screen 501 in FIG. 5A, and the first operation may be an operation that the user taps the camera icon 502 shown in FIG. 5A.

2302: Start a camera application in response to the first operation, and display a preview interface in a first display area of the display.

The electronic device enters a photographing mode in response to the first operation, and displays the preview interface in the first display area of the display. The preview interface includes a viewfinder frame. For example, the preview interface may be 503 in FIG. 5B. The preview interface includes the photographing control 507. The first display area of the display may be an area, shown in FIG. 5B, in which the preview interface 503 is displayed.

2303: The electronic device detects a second operation used by the user to perform a photographing action.

For example, the second operation may be an operation that the user taps the photographing control shown in FIG. 5C.

2304: Generate a first multimedia file in response to the second operation, and simultaneously display the preview interface and a gallery application interface in the first display area of the display, where the gallery application interface is used to display the first multimedia file, and the gallery application interface includes a deletion control.

The first multimedia file may be a picture or a video. For example, after generating the first multimedia file in response to the second operation, the electronic device displays the interface shown in FIG. 5D, and simultaneously displays the preview interface and the gallery application interface in the first display area of the display. The gallery application interface displays a captured picture, and the gallery application interface includes the deletion control 511.

2305: The electronic device detects a deletion operation entered by the user, where the deletion operation corresponds to the deletion control.

For example, the second operation may be an operation that the user taps the photographing control shown in FIG. 5E.

2306: Delete the first multimedia file in response to the deletion operation, and display the preview interface in the first display area of the display.

For example, after deleting the first multimedia file in response to the deletion operation, the electronic device displays the interface shown in FIG. 5F. The display interface corresponds to the first display area of the display, and the first display area displays the preview interface. In this case, the user may choose to continue performing photographing.

Figure 24:
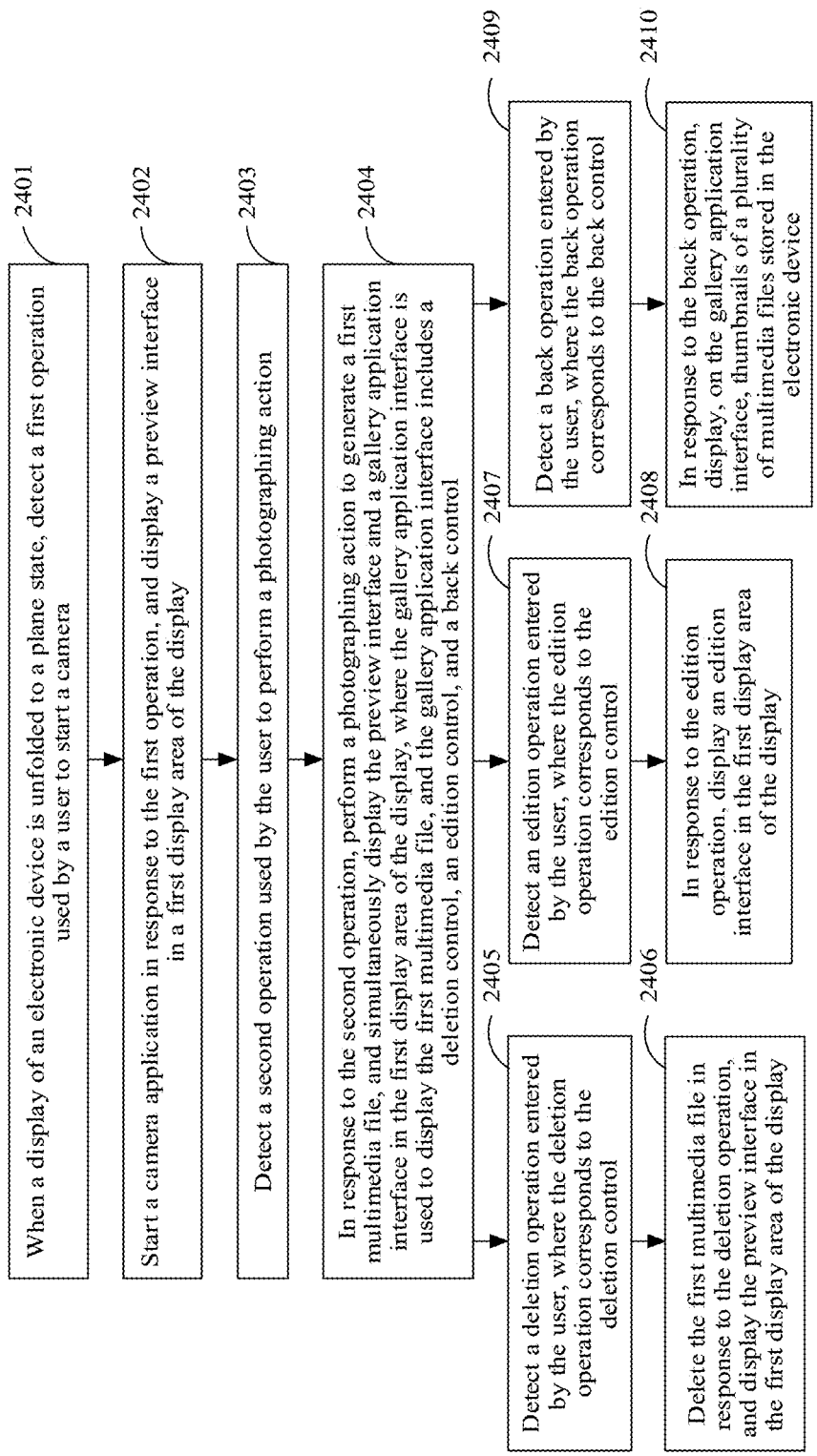
FIG. 24 is a flowchart of another photographing method according to an embodiment of this application.

In another embodiment, refer to FIG. 24. In FIG. 23, step 2304 may include the following step:

2404: In response to the second operation, control the camera to perform a photographing action to generate the first multimedia file, and simultaneously display the preview interface and the gallery application interface in the first display area of the display, where the gallery application interface is used to display the first multimedia file, and the gallery application interface includes a deletion control, an edition control, and a back control.

The first multimedia file may be a picture or a video. For example, after generating the first multimedia file in response to the second operation, the electronic device displays the interface shown in FIG. 5D, and simultaneously displays the preview interface and the gallery application interface on the display. The gallery application interface displays a captured picture. For example, as shown in FIG. 5D, the gallery application interface may further include the deletion control 511 used to delete a picture, the edition control 512 used to edit a picture, and the back control 513 used to return to a thumbnail interface from a gallery application interface.

After step 2404, the method may further include the following steps.

2407: Detect an edition operation entered by the user, where the edition operation corresponds to the edition control.

The edition operation is an operation used to indicate an edition action. For example, the edition operation may be an operation that the user taps the edition control shown in FIG. 20(a).

2408: In response to the edition operation, the electronic device displays an edition interface in the first display area of the display.

Figure 20A:
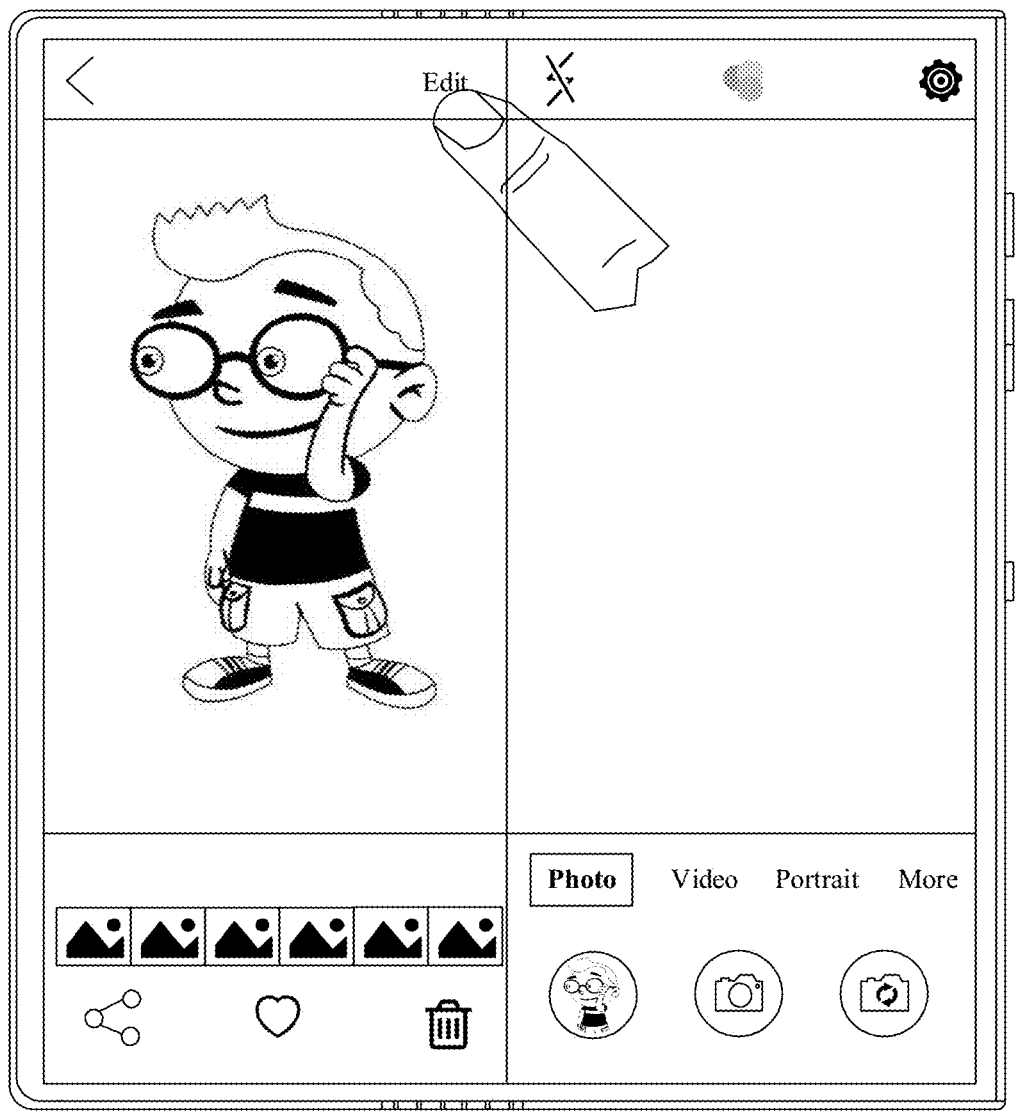
FIG. 20(a) to FIG. 20(d) are a schematic diagram of another group of display interfaces according to an embodiment of this application.
Figure 20B:
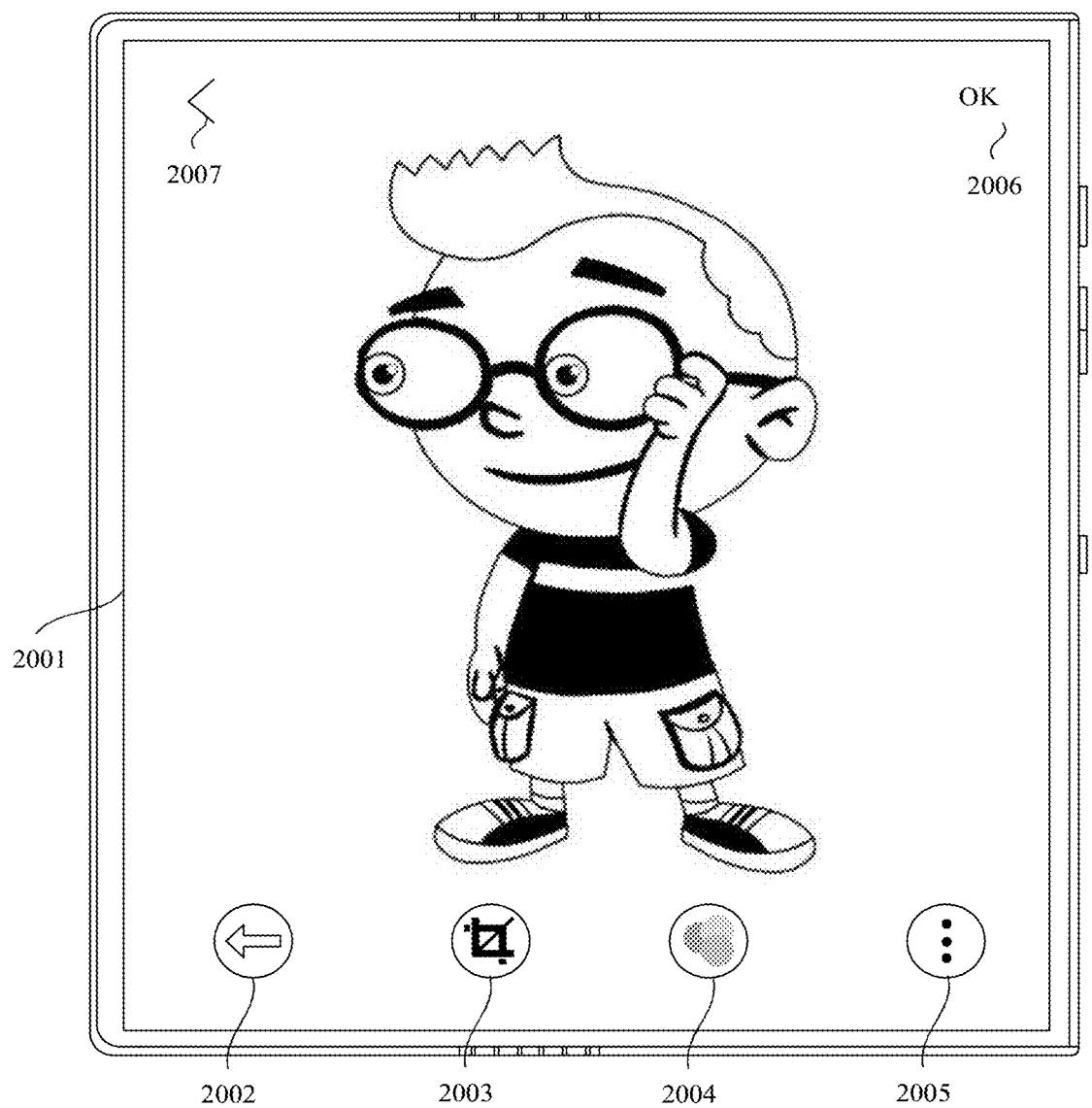
Figure 20C:
Figure 20D:
Figure 21A:
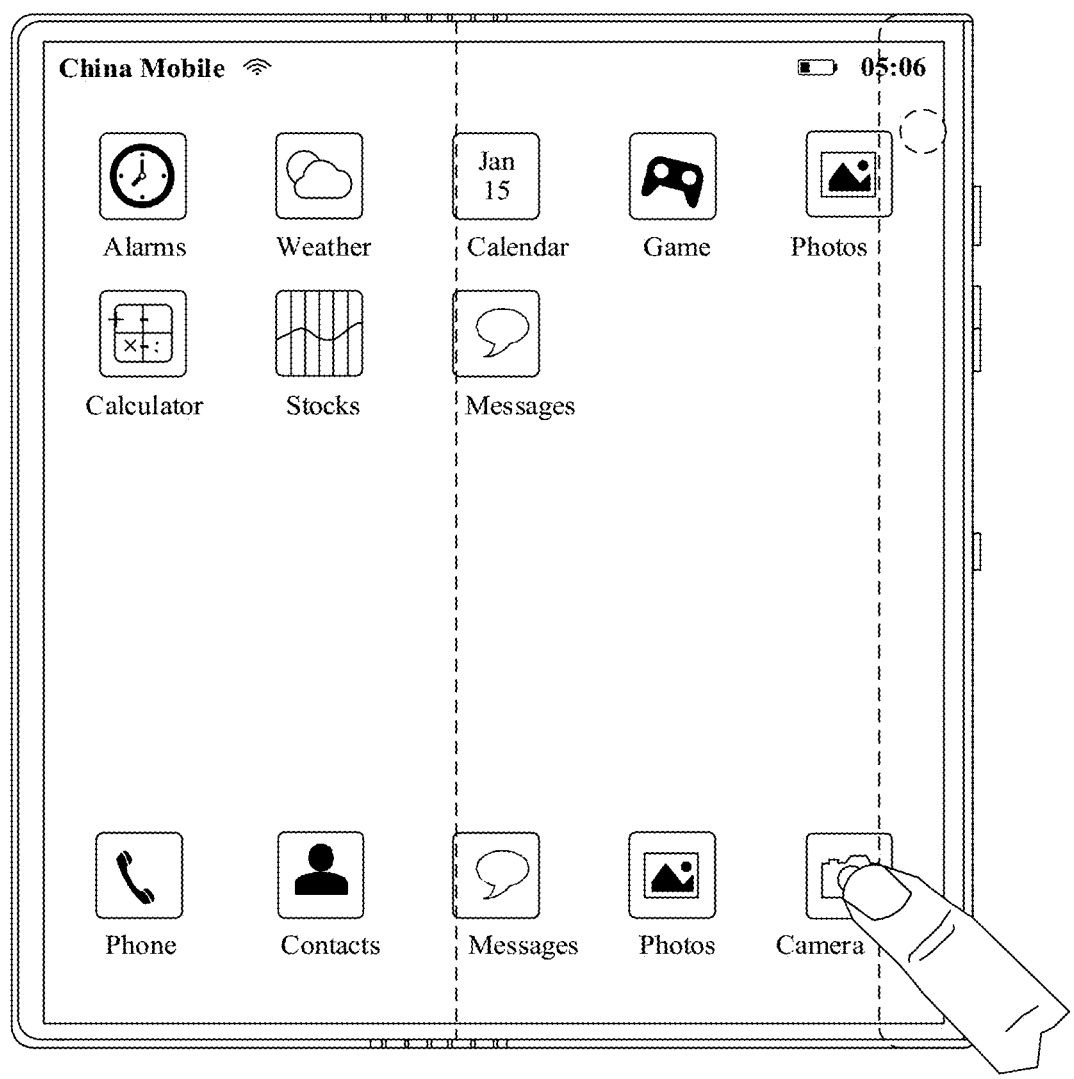
FIG. 21(a) to FIG. 21(d) are a schematic diagram of another group of display interfaces according to an embodiment of this application.
Figure 21B:
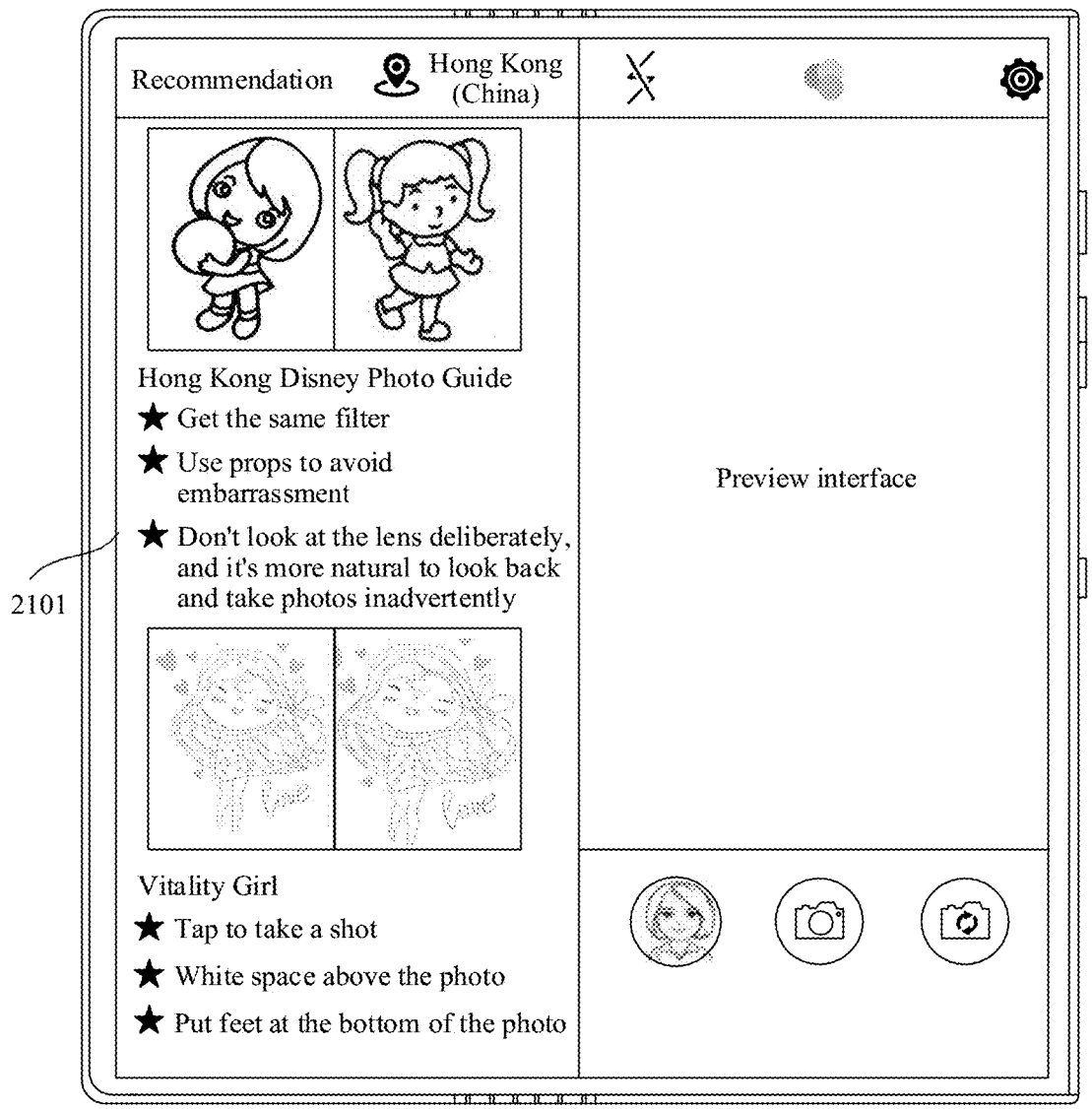
Figure 21C:
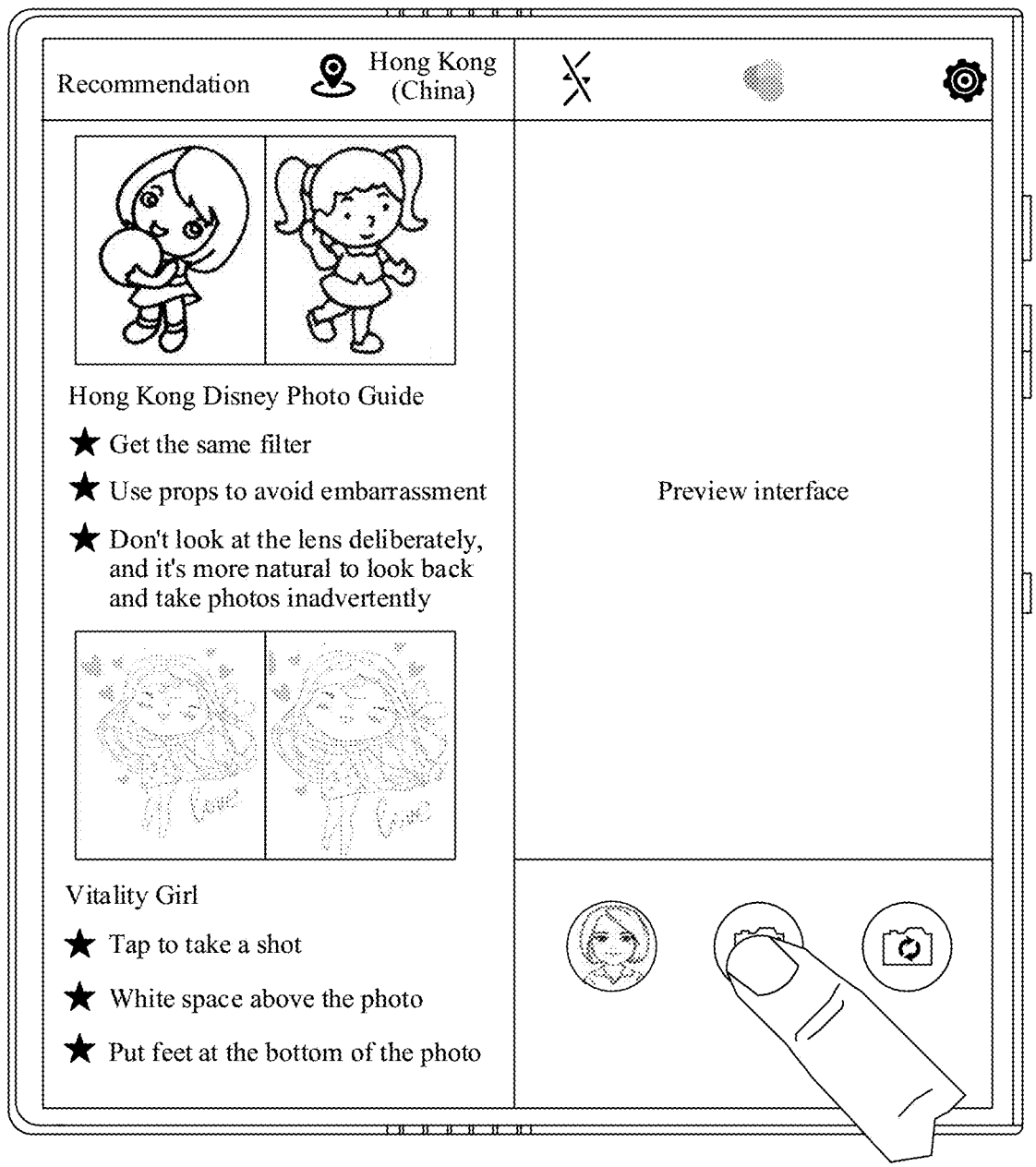
Figure 21D:
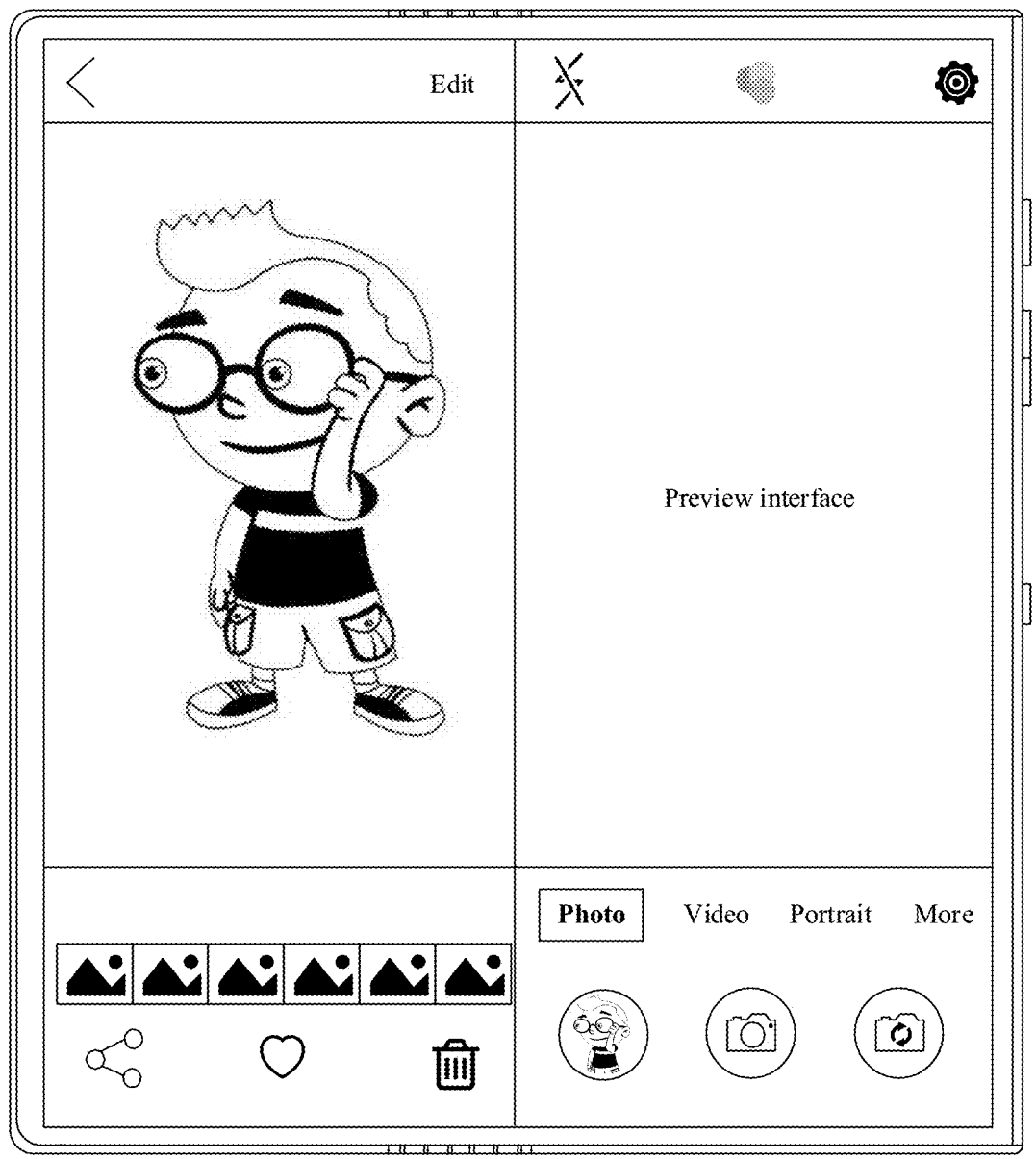
Figure 22A:
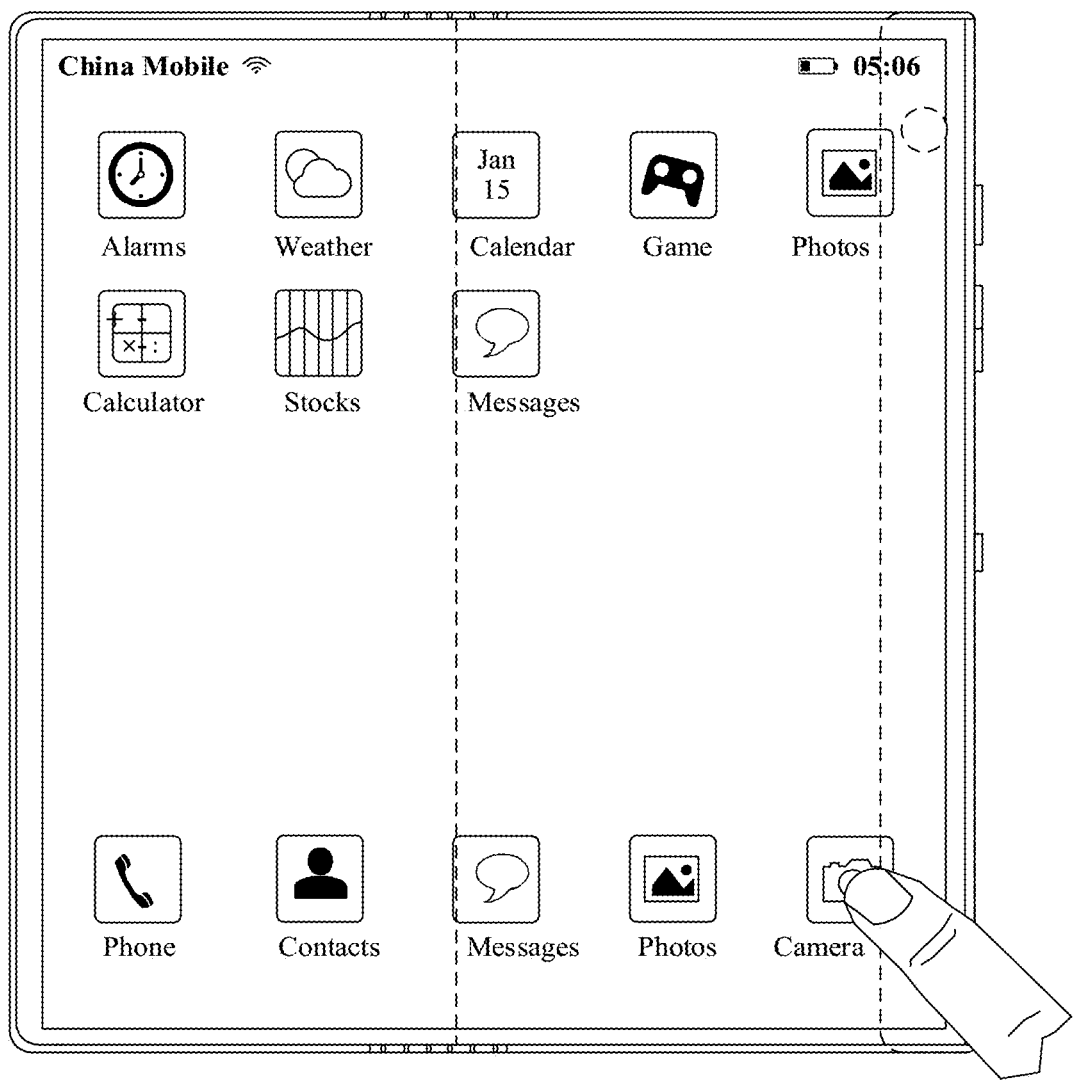
FIG. 22(a) to FIG. 22(f) are a schematic diagram of another group of display interfaces according to an embodiment of this application.
Figure 22B:
Figure 22C:
Figure 22D:
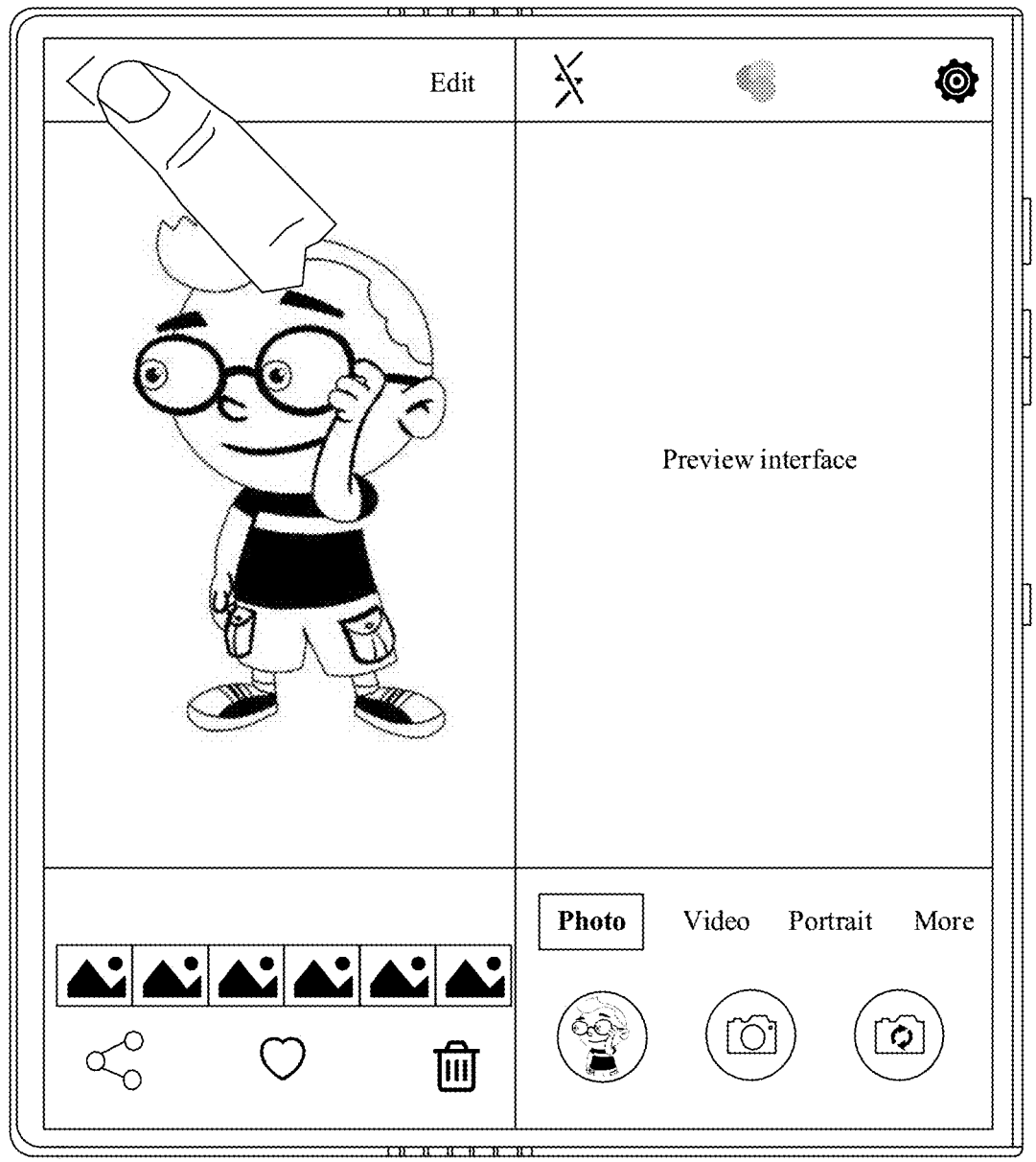
Figure 22E:
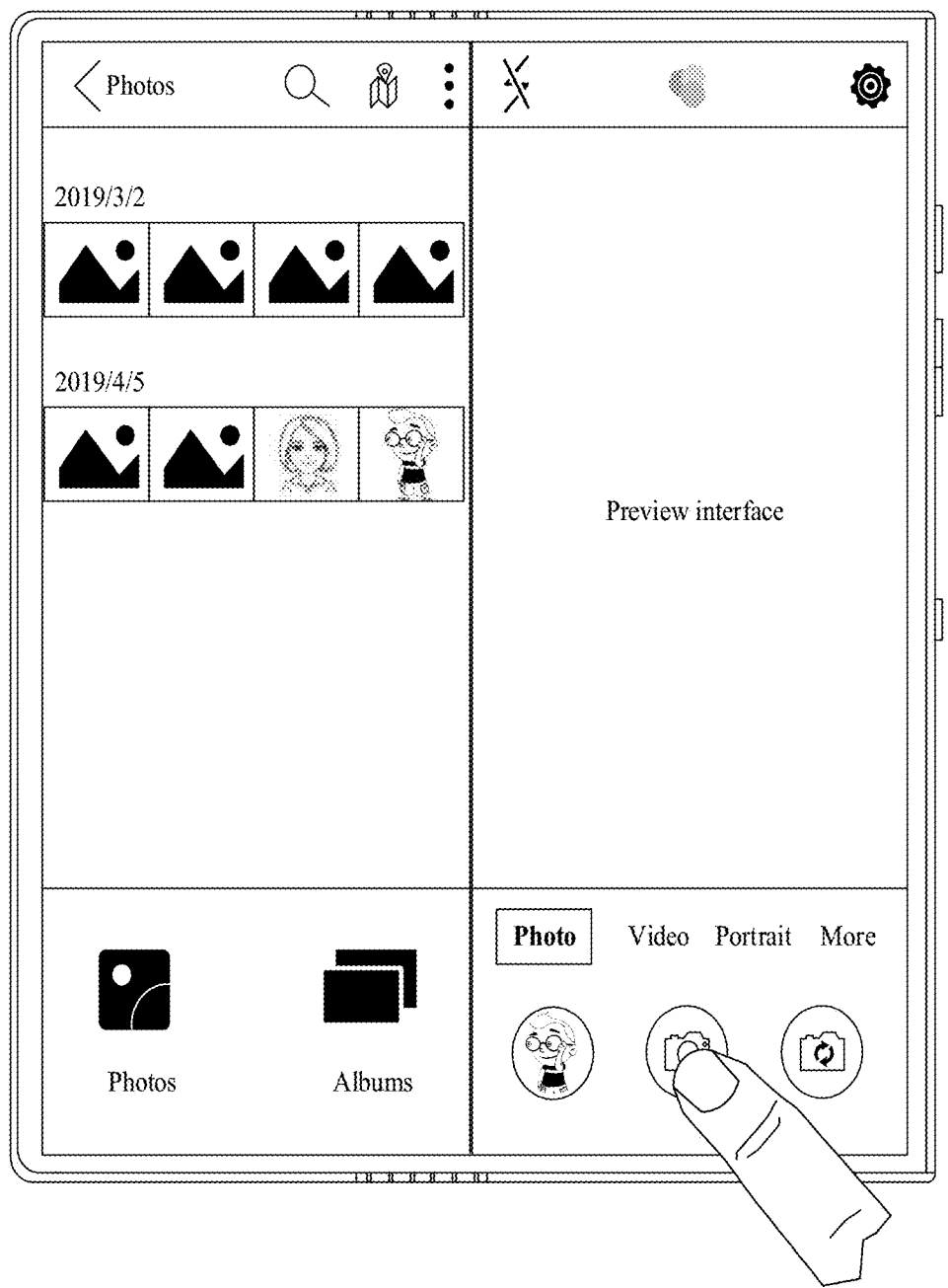
Figure 22F:
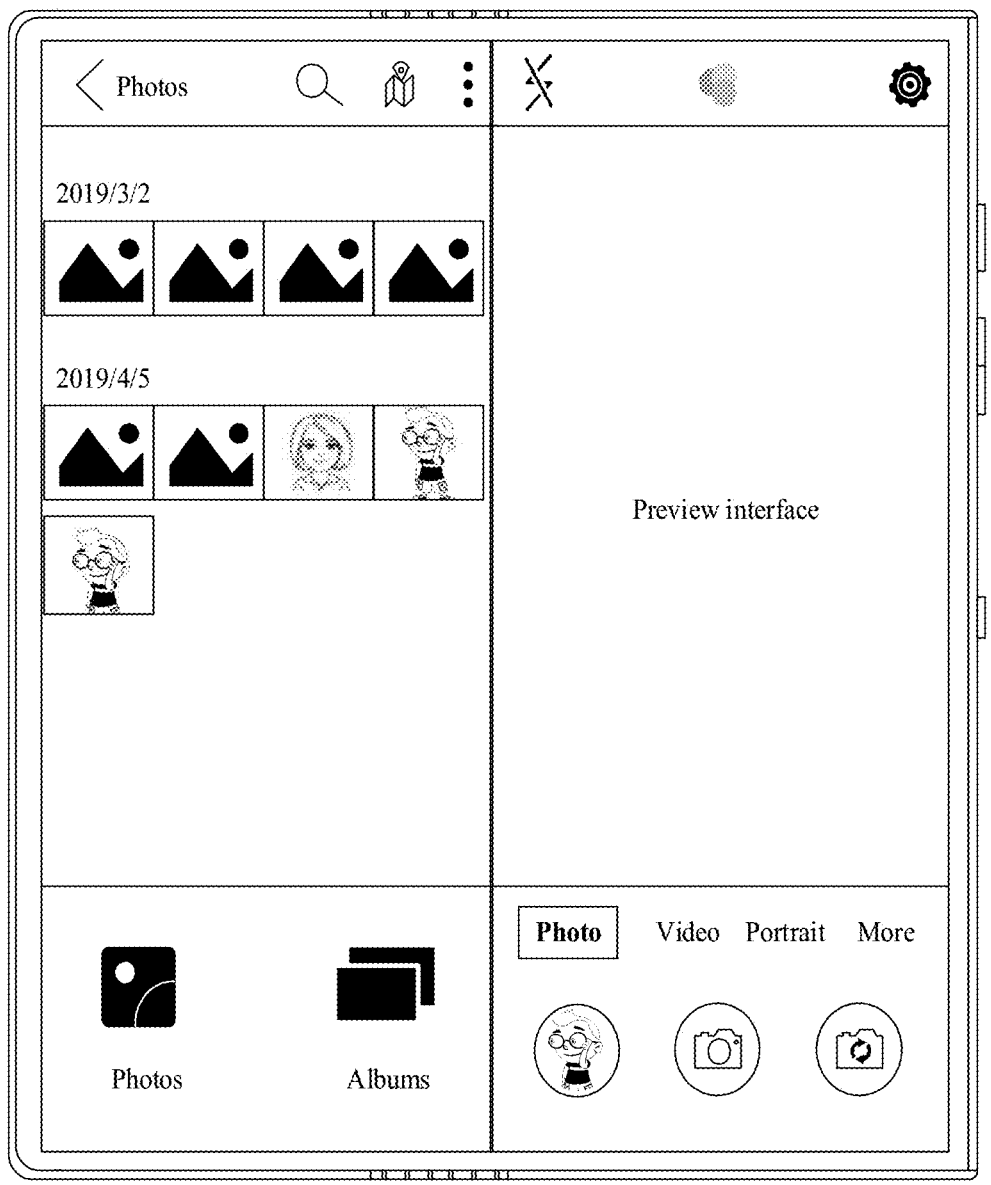

For example, the electronic device enters the edition interface 2001 in response to the edition operation, and displays the interface shown in FIG. 20(b) on the display of the electronic device. For example, the edition interface 2001 may further include the control 2002 used to cancel edition, the control 2003 used to crop a picture size, the control 2004 used to modify a picture filter, the control 2005 used to select other more functions, the control 2006 used to save edition after the complete edition, and the back control 2007 used to return to a split-screen preview interface from an edition interface.

After step 2408, for example, the method may further include: The user taps the return control on the edition interface shown in FIG. 20(c), and in response to the operation, the electronic device displays the interface shown in FIG. 20(d). The first display area of the display of the electronic device simultaneously displays the preview interface and the gallery application interface.

In another embodiment, after step 2404, the method may further include the following steps.

2409: Detect a back operation entered by the user, where the back operation corresponds to the back control.

The back operation is an operation used to indicate a back action. For example, the back operation may be an operation that the user taps the back control shown in FIG. 5G.

2410: In response to the back operation, the electronic device displays, on the gallery application interface, thumbnails of a plurality of multimedia files stored in the electronic device.

Figure 5H:
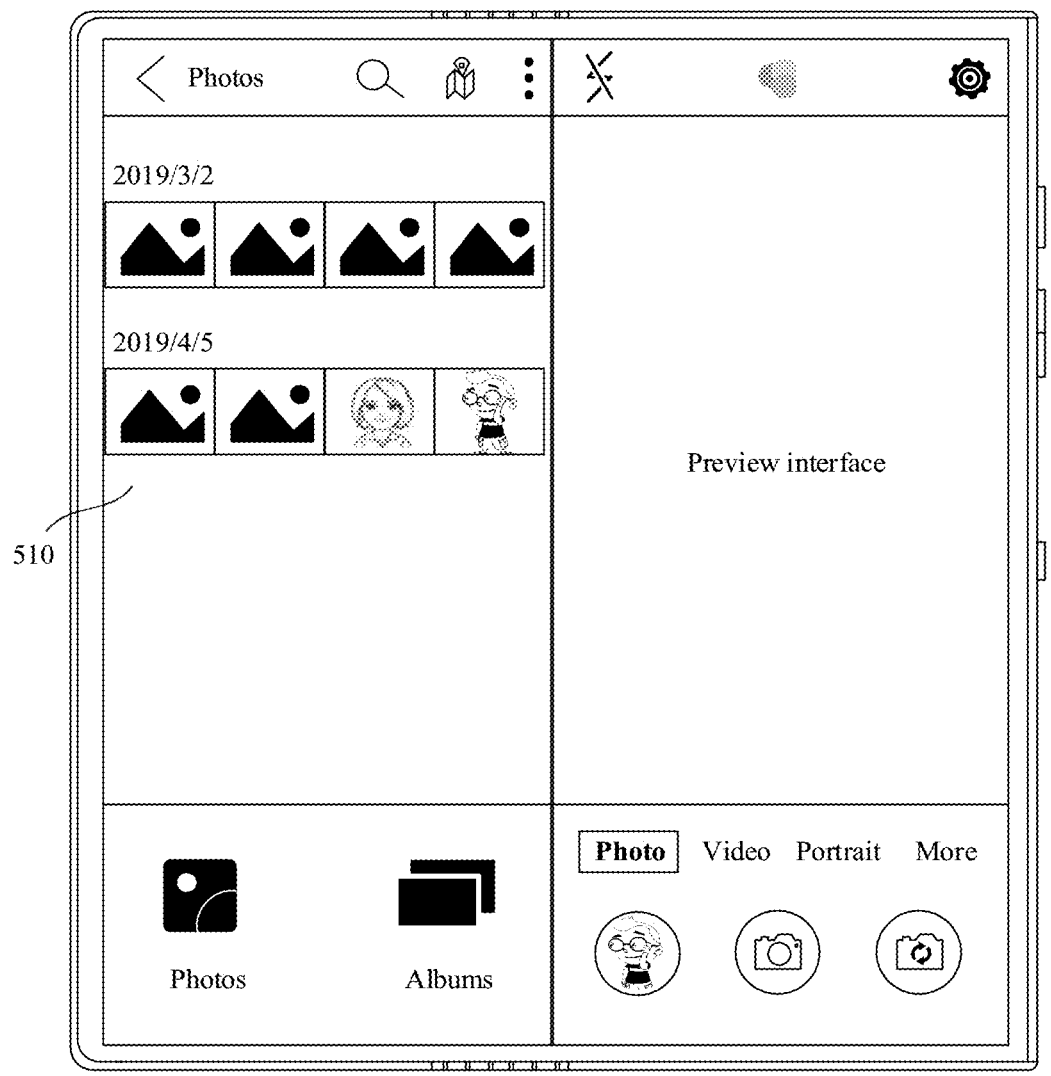
FIG. 5H is a schematic diagram of another group of display interfaces according to an embodiment of this application.

For example, in response to the back operation, the electronic device displays the interface shown in FIG. 5H on the display of the electronic device, and the gallery application interface displays thumbnails of a plurality of pictures stored in a gallery, so that the user can quickly view a gallery picture.

In an embodiment, in step 2403, the electronic device detects the second operation used by the user to perform a photographing action. The second operation may specifically include: The electronic device performs a continuous photographing action.

For example, the second operation may be an operation that the user taps the continuous photographing control 701 shown in FIG. 7(*b*). An operation of performing continuous photographing may be triggered by touching and holding a photographing control, by making voice, by calling a continuous photographing function in settings, or the like. This is not limited herein.

In step 2404, in response to the second operation, the electronic device performs the photographing action to generate the first multimedia file. The first multimedia file includes a plurality of continuously photographed multimedia files. That the gallery application interface is used to display the first multimedia file may include: The gallery application interface is used to display thumbnails of the plurality of continuously photographed multimedia files.

For example, after detecting that the user performs a continuous photographing action, the mobile phone displays another GUI shown in FIG. 7(*c*), and simultaneously displays the preview interface and the gallery application interface on the display. The gallery application interface is used to display the thumbnails of the plurality of continuously photographed multimedia files. The gallery application interface may further include the deletion control used to delete a picture, the back control used to return to a thumbnail interface from a gallery application, and the selection control 703 used to select a plurality of pictures.

In another embodiment, after the foregoing step, the method may further include:

detecting a selection operation entered by the user, where the selection operation corresponds to the selection control, and is used to select thumbnails of N continuously photographed multimedia files displayed on the gallery application interface, and N is a positive integer.

For example, the selection operation may be an operation that the user taps the selection control shown in FIG. 7(*d*).

In response to the selection operation, the electronic device selects the thumbnails of the N continuously photographed multimedia files displayed on the gallery application interface.

For example, as shown in FIG. 7(*e*), the user may select a plurality of continuously photographed multimedia files, and a selection manner may be a tap operation or a continuous slide operation. For example, the user may tap the deletion control shown in FIG. 7(*e*), to delete the thumbnails of the selected N continuously photographed multimedia files.

Figure 25A:
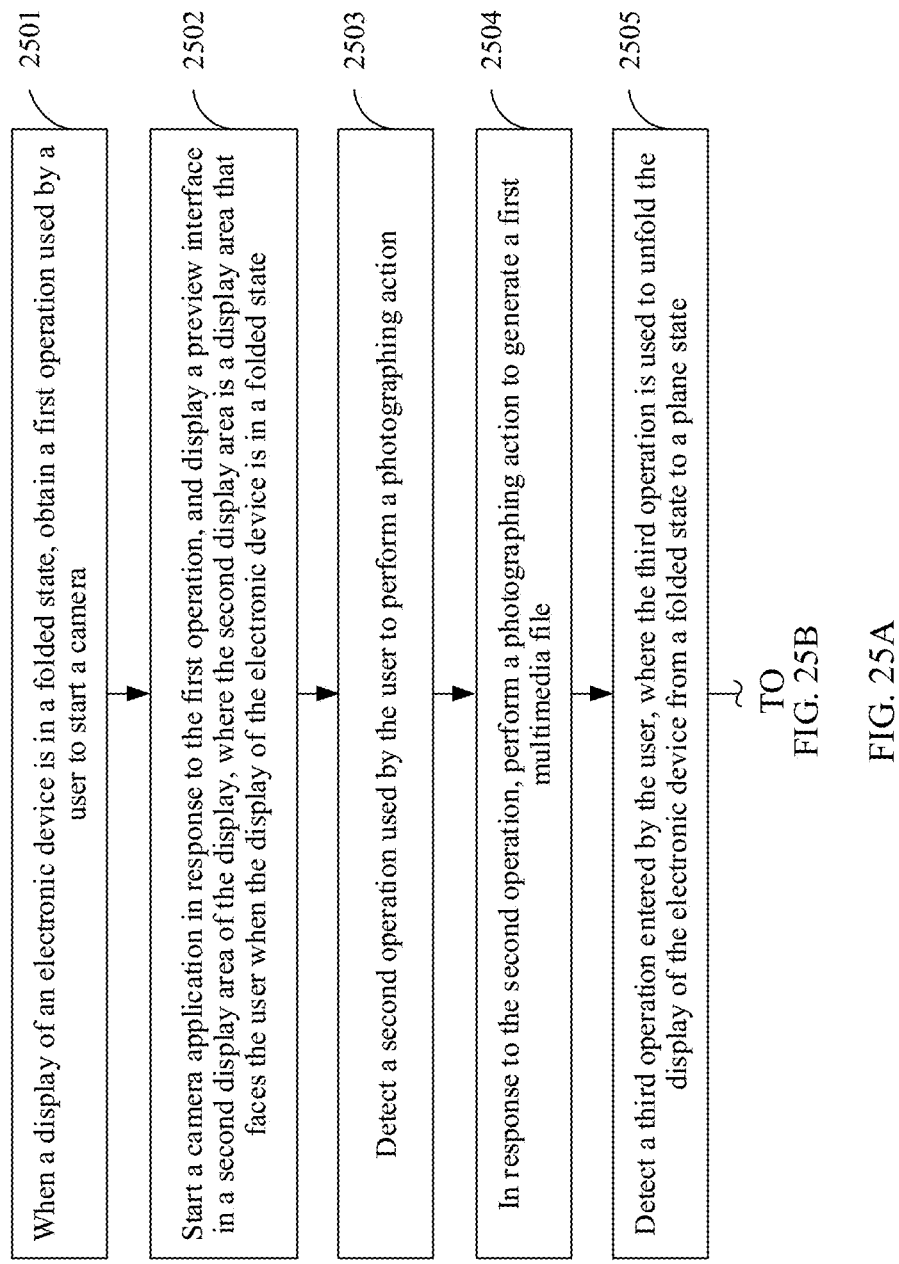
FIG. 25A and FIG. 25B are a flowchart of another photographing method according to an embodiment of this application.
Figure 25B:
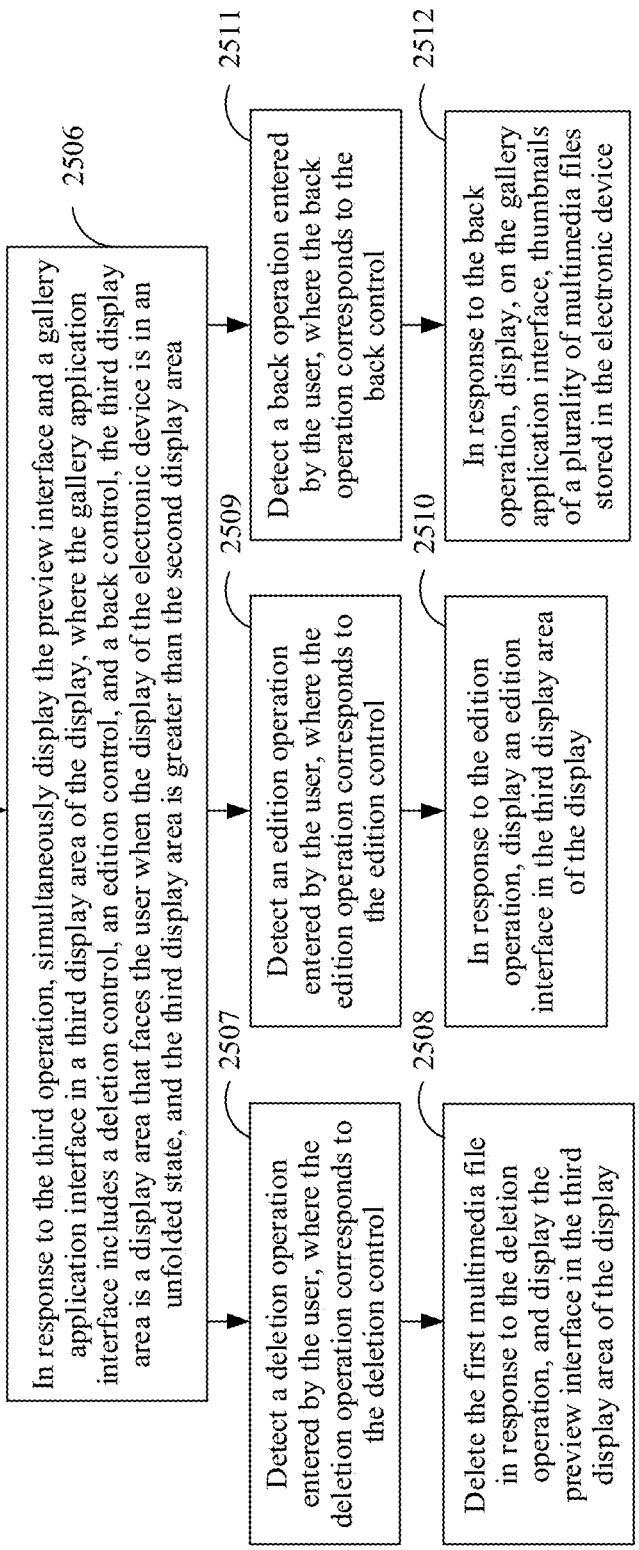

In another embodiment, refer to FIG. 25. The display of the electronic device is foldable, and a photographing action is performed when the foldable screen is in a folded state.

For example, a schematic diagram in which the foldable screen of the mobile terminal is in a folded state may be the case shown in FIG. 4(*a*) to FIG. 4(*c*). FIG. 4(*a*) shows a state of a screen of a mobile phone when the foldable screen is folded. When the screen of the mobile terminal is folded, the screen is divided into two parts: a primary screen 401 and a secondary screen 402. FIG. 4(*b*) shows a state of the primary screen when the foldable screen is folded, and FIG. 4(*c*) shows a state of the secondary screen when the foldable screen is folded. When the foldable screen of the terminal is in a folded state, the secondary screen of the foldable screen may fit with a raised part on the back of the primary screen. In an actual use process, when a mobile phone is in a folded state, a user may press an eject key on the right side of the mobile phone to eject the mobile phone from the folded state.

The method may include the following steps.

2501: When a display of the electronic device is in a folded state, obtain a first operation used by a user to start a camera.

For example, a graphical user interface when the display of the electronic device is in a folded state may be the case shown in the home screen 1001 in FIG. 10(*a*). A primary screen and a secondary screen display a same interface. The first operation may be an operation that the user taps the camera icon shown in FIG. 10(*a*).

2502: Start a camera application in response to the first operation, and display a preview interface in a second display area of the display, where the second display area is a display area that faces the user when the display of the electronic device is in a folded state.

The electronic device enters a photographing mode in response to the first operation, and displays the preview interface. The preview interface includes a viewfinder frame. For example, the preview interface may be shown in FIG. 10(*b*). The primary screen displays the preview interface, and the secondary screen is in a black screen state. The preview interface includes a photographing control. For example, the second display area of the display may be an area, shown in FIG. 10(*b*), in which the preview interface is displayed on the primary screen.

2503: Detect a second operation used by the user to perform a photographing action.

For example, the second operation may be an operation that the user taps the photographing control shown in FIG. 10(*c*).

2504: In response to the second operation, perform a photographing action to generate a first multimedia file.

The first multimedia file may be a picture or a video. For example, after generating the first multimedia file in response to the second operation, the electronic device displays the interface shown in FIG. 10(*d*). The primary screen displays the preview interface, and the secondary screen is in a black screen state.

2505: Detect a third operation entered by the user, where the third operation is used to unfold the display of the electronic device from a folded state to a plane state.

For example, the third operation may be an operation that the user presses the eject key shown in FIG. 11(*a*).

2506: In response to the third operation, simultaneously display the preview interface and a gallery application interface in a third display area of the display, where the third display area is a display area that faces the user when the display of the electronic device is in an unfolded state, and the third display area is greater than the second display area.

For example, after the mobile phone detects that the user presses the eject key on the right side of the screen, the foldable screen ejects. FIG. 11(*b*) shows a form in which the foldable screen is in an unfolded state. After the user unfolds the foldable screen, the third display area of the display of the electronic device may be shown in FIG. 11(*c*). In this case, the display is evenly divided into two parts, and the preview interface and the gallery application interface are simultaneously displayed, and the gallery application interface displays the first multimedia file. The gallery application interface may further include a deletion control used to delete a picture, an edition control used to edit a picture, a back control used to return to a thumbnail interface from a gallery application interface, a sharing control used to share a picture, and a control used to quickly preview a gallery picture thumbnail.

Figure 11A:
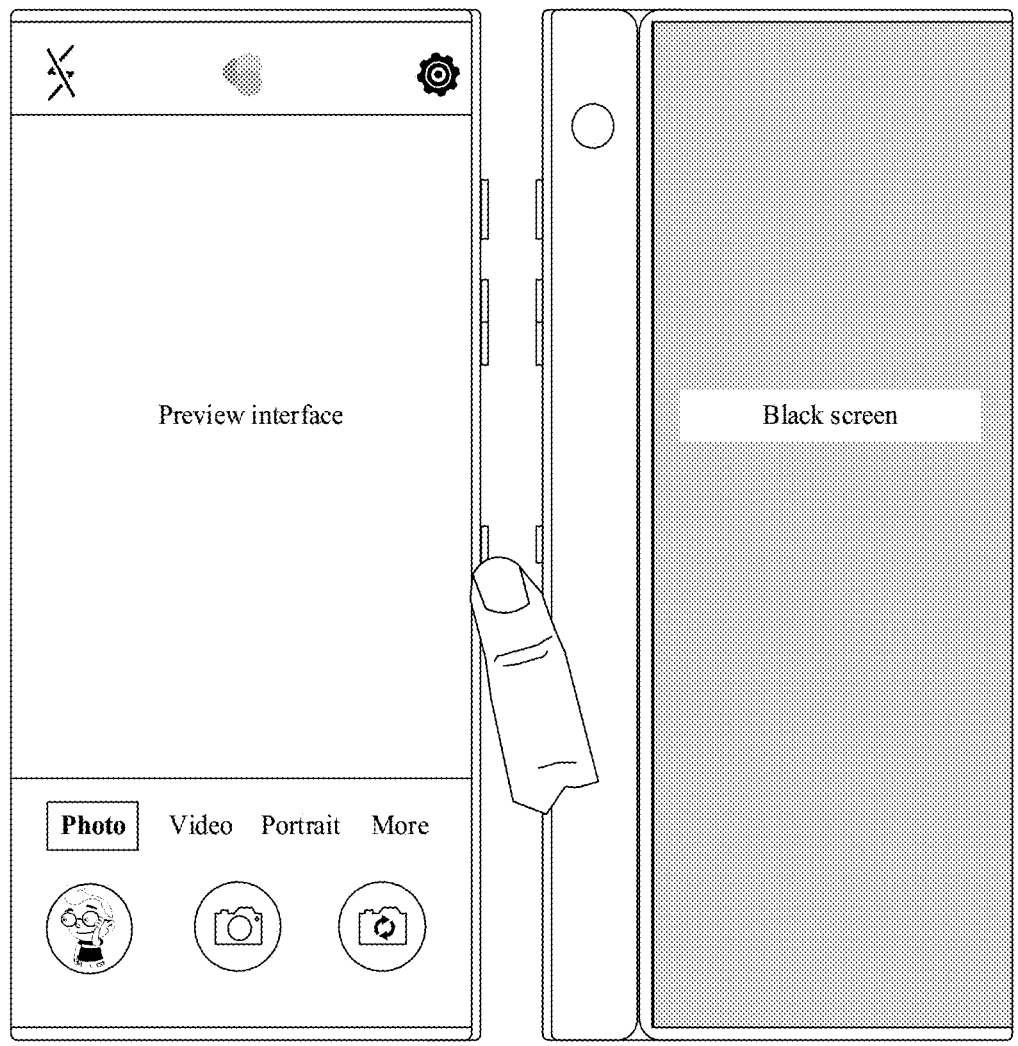
FIG. 11(a) to FIG. 11(d) are a schematic diagram of another group of display interfaces according to an embodiment of this application.
Figure 11B:
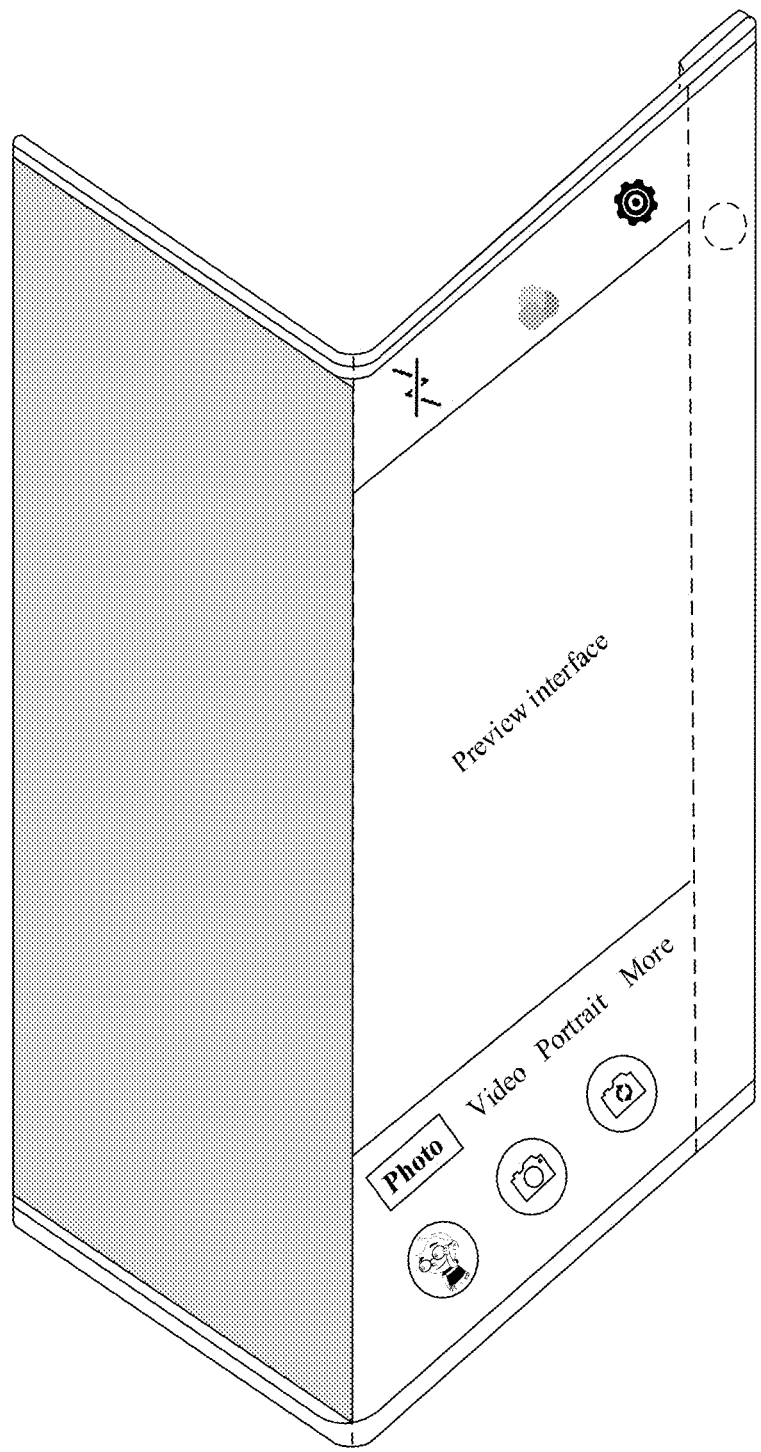
Figure 11C:
Figure 11D:
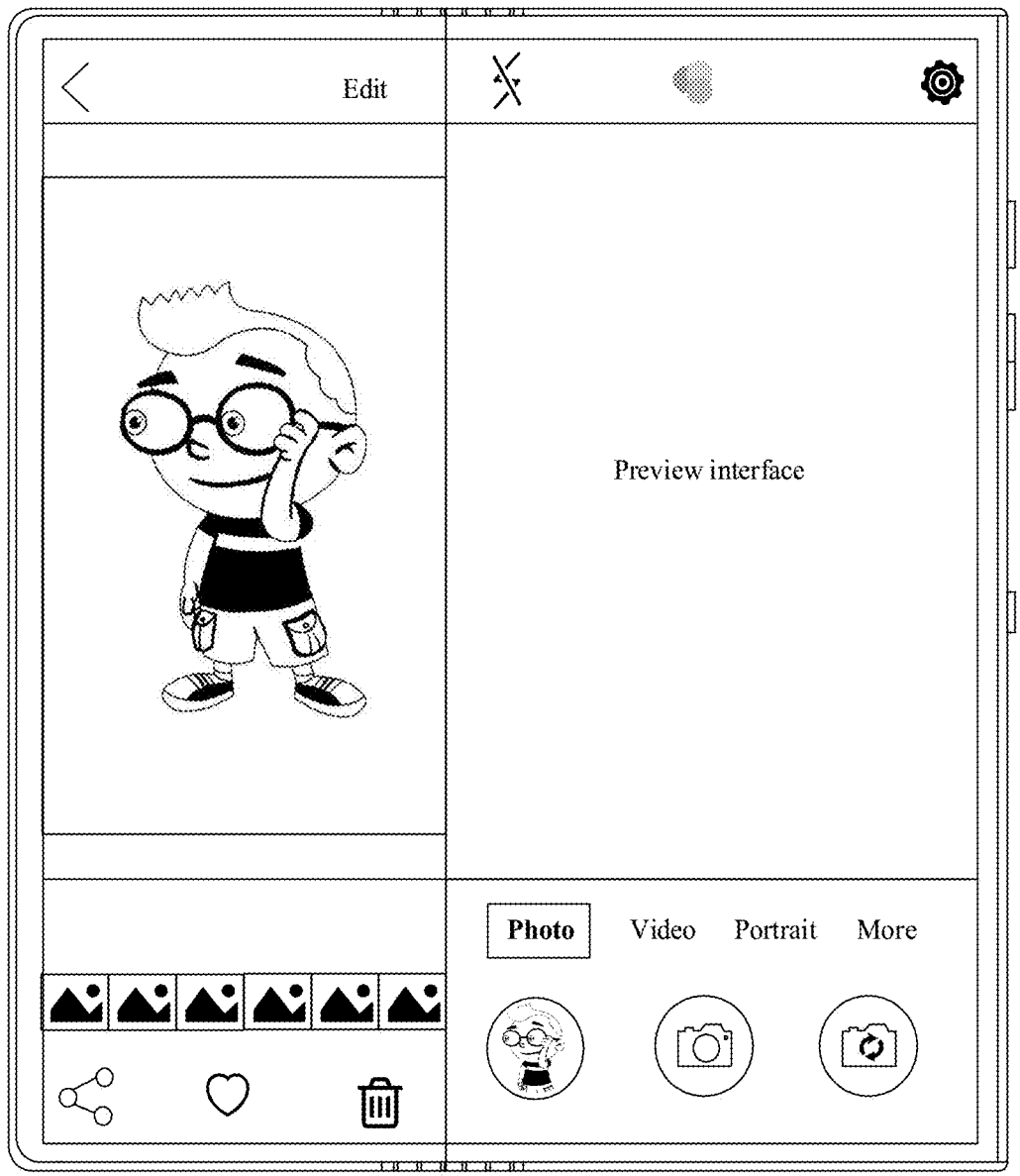

For another example, after the user unfolds the foldable screen, the third display area of the display of the electronic device may be shown in FIG. 11(d). In this case, the display is divided into two parts by using a hinge as a dividing line, and the preview interface and the gallery application interface are simultaneously displayed.

In another embodiment, after step 2506, the method may further include the following steps.

2507: Detect a deletion operation entered by the user, where the deletion operation corresponds to the deletion control.

The deletion operation is an operation used to indicate a deletion action. For example, the deletion operation may be an operation that the user taps the deletion control shown in FIG. 12(a).

2508: Delete the first multimedia file in response to the deletion operation, and display the preview interface in the third display area of the display.

Figure 12B:
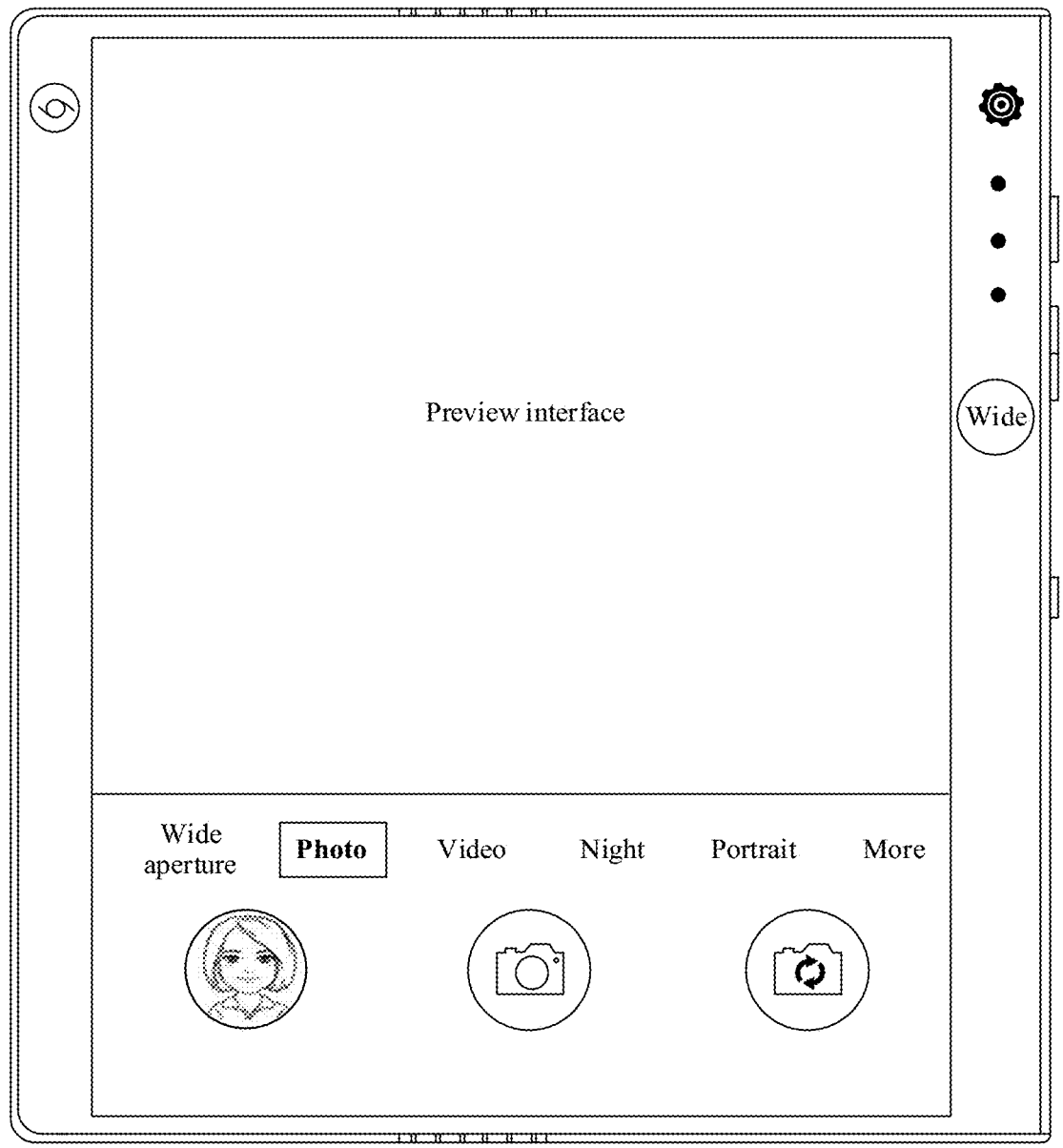

For example, after deleting the first multimedia file in response to the deletion operation, the electronic device displays the interface shown in FIG. 12(b). The display interface corresponds to the third display area of the display, and the third display area displays the preview interface. In this case, the user may choose to continue performing photographing. It should be noted that, in an actual design, the third display area may be the same as or different from the first display area.

In another embodiment, after step 2506, the method may further include the following steps.

2509: Detect an edition operation entered by the user, where the edition operation corresponds to the edition control.

The edition operation is an operation used to indicate an edition action. For example, the edition operation may be an operation that the user taps the edition control shown in FIG. 20(a).

2510: In response to the edition operation, display an edition interface in the third display area of the display.

For example, the electronic device enters the edition interface 2001 in response to the edition operation, and displays the interface shown in FIG. 20(b) on the display of the electronic device. For example, the edition interface 2001 may further include the control 2002 used to cancel edition, the control 2003 used to crop a picture size, the control 2004 used to modify a picture filter, the control 2005 used to select other more functions, the control 2006 used to save edition after the complete edition, and the back control 2007 used to return to a split-screen preview interface from an edition interface.

In another embodiment, after step 2506, the method may further include the following steps.

2511: Detect a back operation entered by the user, where the back operation corresponds to the back control.

The back operation is an operation used to indicate a back action. For example, the back operation may be an operation that the user taps the back control shown in FIG. 13(a).

2512: In response to the back operation, display, on the gallery application interface, thumbnails of a plurality of multimedia files stored in the electronic device.

Figure 13B:
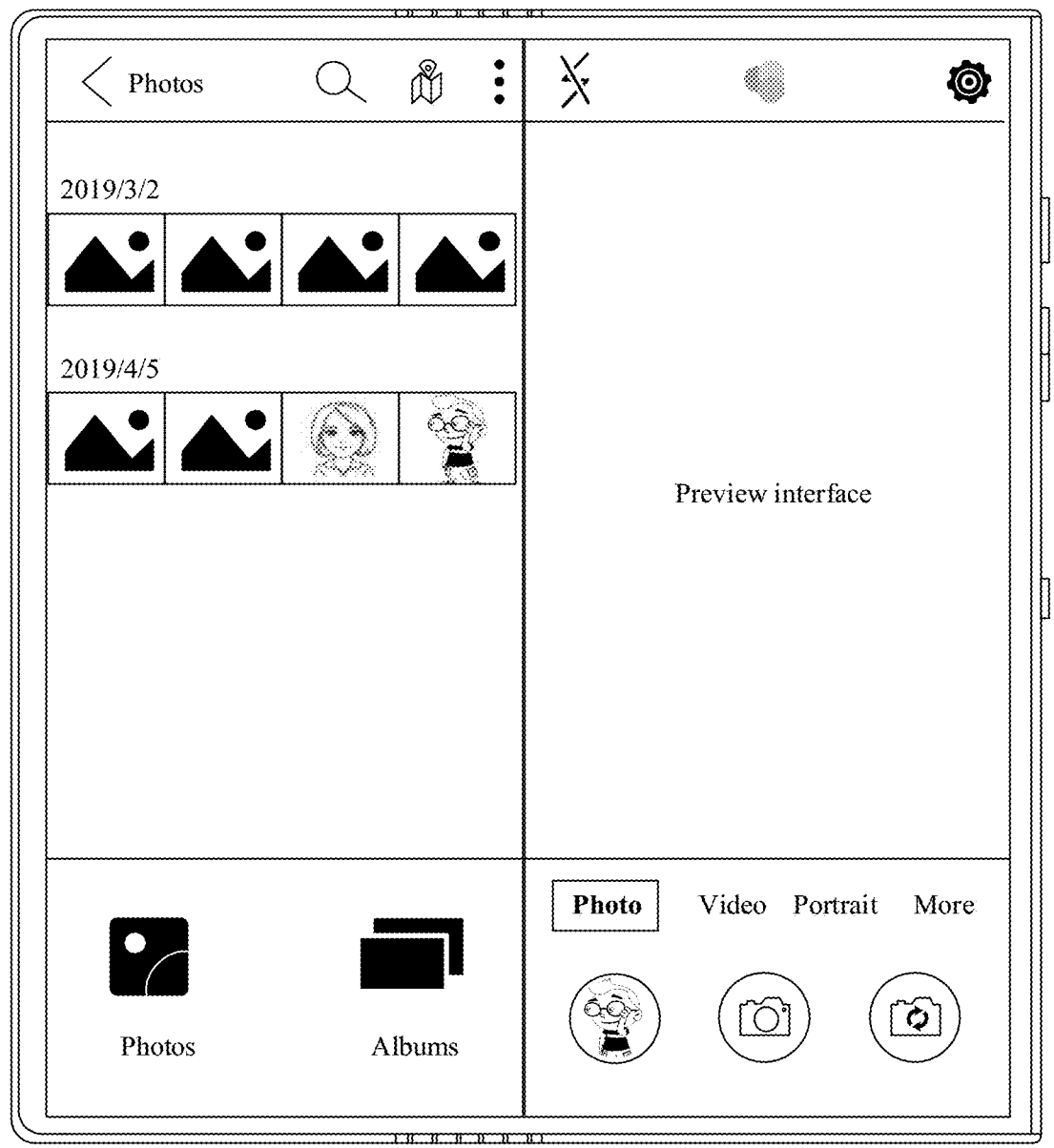

For example, in response to the back operation, the electronic device displays the interface shown in FIG. 13(b) on the display of the electronic device, and the gallery application interface displays thumbnails of a plurality of pictures stored in a gallery, so that the user can quickly view a gallery picture.

In another embodiment, in step 2502, the electronic device displays the preview interface in the second display area of the display. The second display area is a display area that faces the user when the display of the electronic device is in a folded state. The method may further include: The preview interface may further include a control used to simultaneously display the preview interface on the primary screen and the secondary screen.

Figure 14A:
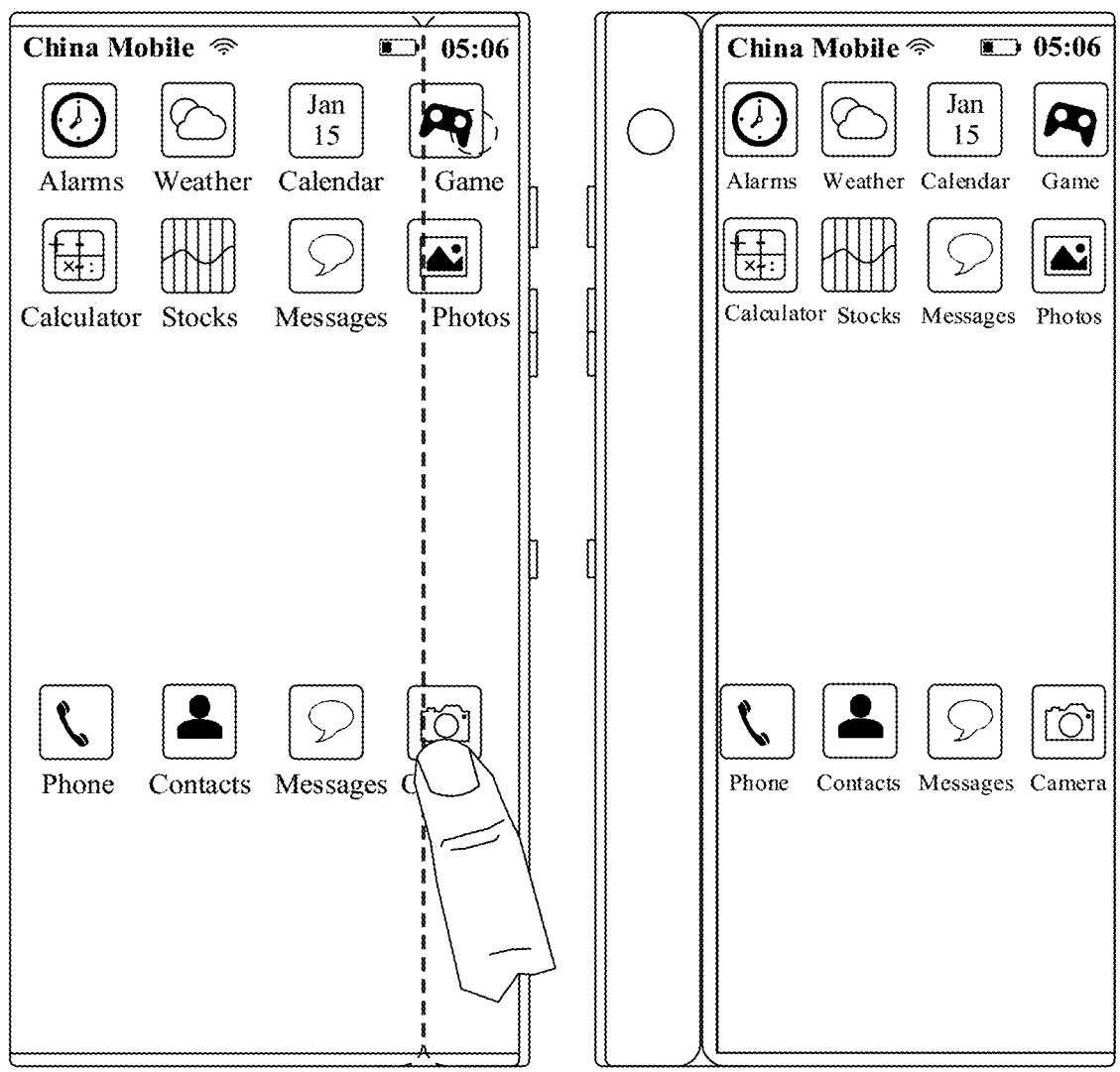
FIG. 14(a) to FIG. 14(d) are a schematic diagram of another group of display interfaces according to an embodiment of this application.
Figure 14B:
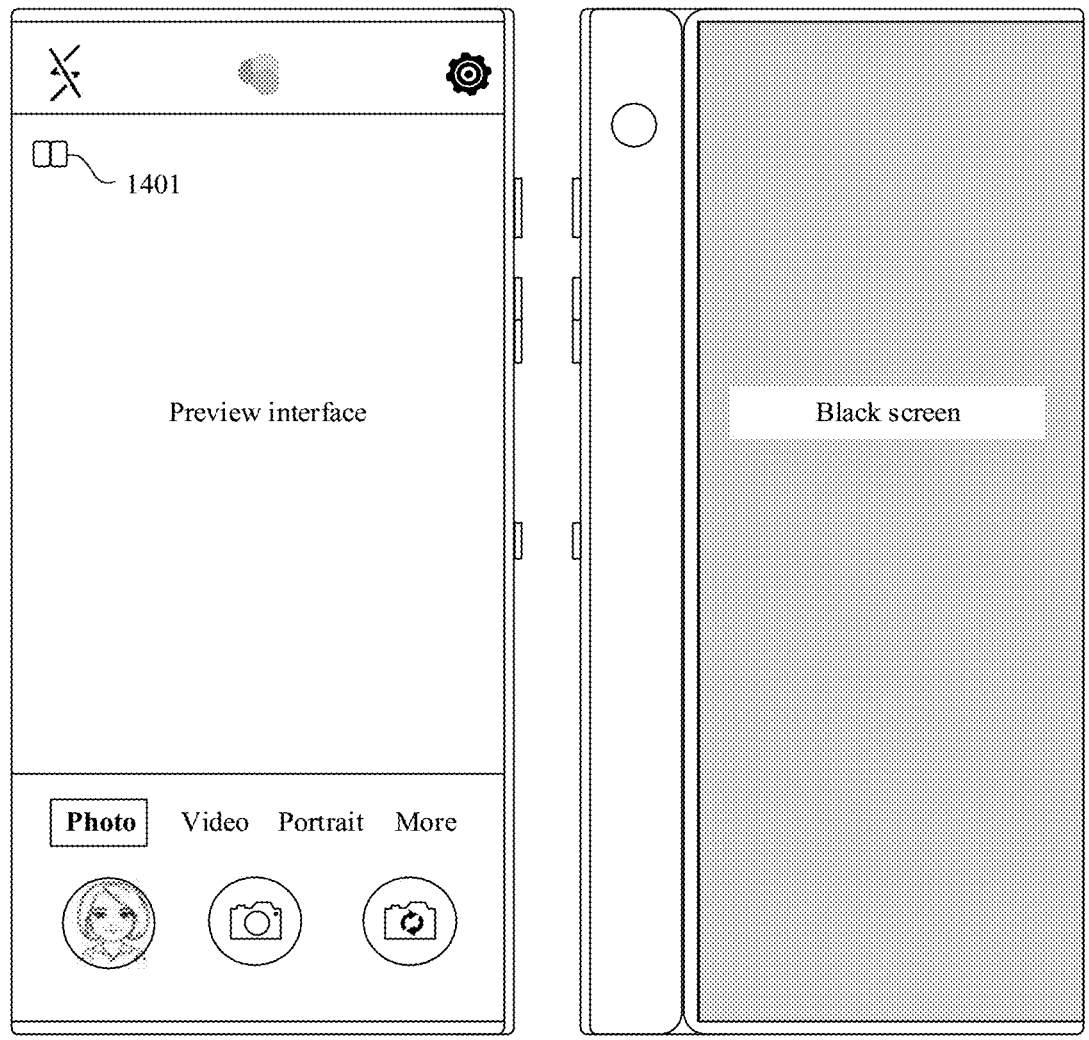
Figure 14C:
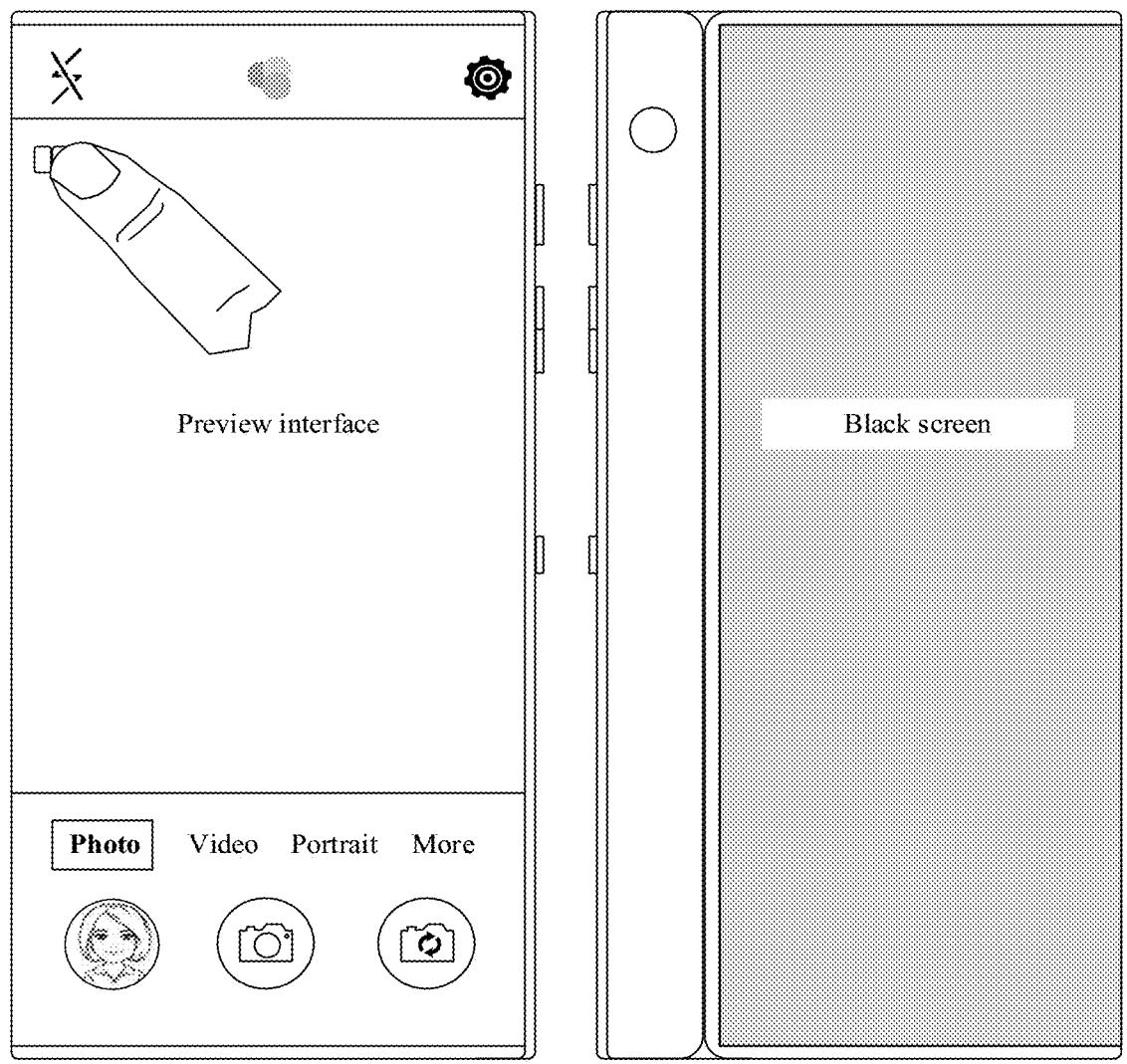
Figure 14D:
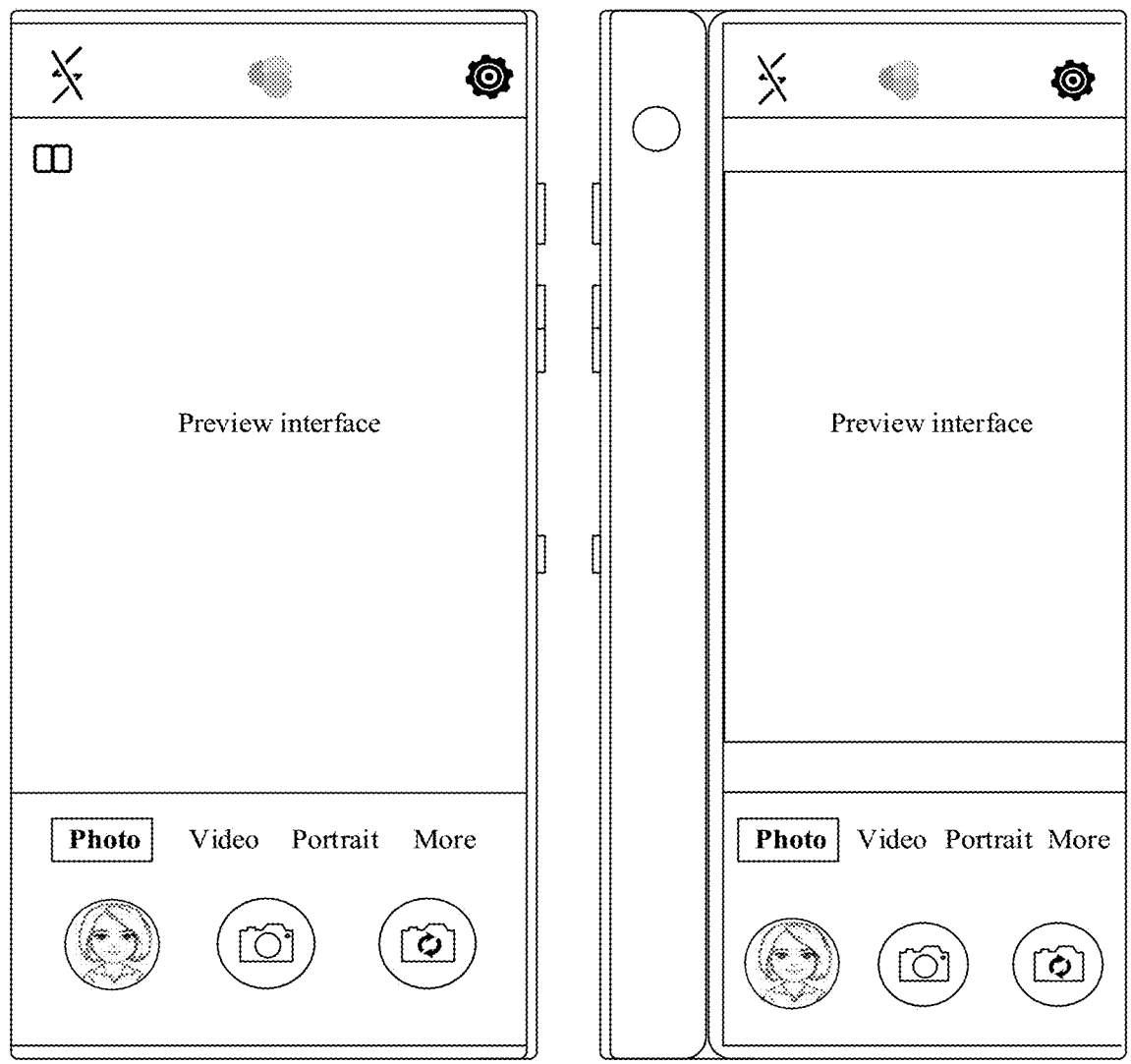

For example, the control used to simultaneously display the preview interface on the primary screen and the secondary screen may be the control 1401 shown in FIG. 14(b).

After step 2502, the method may further include:

If it is detected that the user taps the control used to simultaneously display the preview interface on the primary screen and the secondary screen, in response to the operation, the electronic device simultaneously displays the preview interface on the primary screen and the secondary screen. In this case, both the user and a photographed person can view the preview interface.

Another embodiment of this application provides an electronic device, including: one or more cameras, configured to capture a picture; a display, configured to display an interface; and one or more processors, one or more memories, and one or more computer programs. The one or more computer programs are stored in the memory, the one or more computer programs include instructions, and when the instructions are executed by the processor, the electronic device is enabled to perform the photographing method in the foregoing embodiments.

For example, when the electronic device is the mobile phone shown in FIG. 1, the processor in the electronic device may be the processor 110 in FIG. 1, the memory may be the internal memory 121 in FIG. 1, the display may be the display 194 in FIG. 1, and the N cameras may be the cameras 193 in FIG. 1. The one or more computer programs are stored in the internal memory 121, the one or more computer programs include instructions, and when the instructions are executed by the processor 110, the mobile phone is enabled to perform the photographing method in the foregoing embodiments.

An embodiment further provides a computer storage medium. The computer storage medium stores computer instructions; and when the computer instructions are run on an electronic device, the electronic device is enabled to perform the foregoing related method steps, to implement the photographing method in the foregoing embodiments.

An embodiment further provides a computer program product. When the computer program product is run on a computer, the computer is enabled to perform the foregoing related steps, to implement the photographing method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the photographing method in the foregoing method embodiments.

The electronic device, the computer storage medium, the computer program product, or the chip provided in the embodiments is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for the purpose of convenient and brief description, division of the foregoing function modules is taken as an example for illustration. During actual application, the foregoing functions can be allocated to different modules and implemented based on a requirement, in other words, an inner structure of an apparatus is divided into different function modules, to implement all or some of the functions described above.

In the several embodiments provided in this application, it should be understood that the disclosed apparatuses and methods may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions in the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by an electronic device, wherein the method comprises:
    detecting, from a user, a first operation when a display of the electronic device is unfolded to a plane state, wherein the display is foldable;
    starting, in response to the first operation, a camera application;
    displaying a preview interface of the camera application in a first display area of the display;
    detecting, from the user, a second operation;
    performing, in response to the second operation, a photographing action and generating a first multimedia file;
    displaying simultaneously, in response to the second operation, the preview interface and a gallery application interface in the first display area, wherein the gallery application interface displays the first multimedia file and comprises a deletion control;
    detecting, from the user, a deletion operation corresponding to the deletion control;
    deleting, in response to the deletion operation, the first multimedia file;
    displaying the preview interface in the first display area;
    detecting, from the user, a third operation when the display is in a folded state;
    starting, in response to the the third operation, the camera application;
    displaying the preview interface in a second display area of the display, wherein the second display area faces the user when the display is in the folded state;
    detecting, from the user, a fourth operation;
    performing, in response to the fourth operation, the photographing action and generating a second multimedia file;
    detecting, from the user, a fifth operation to unfold the display from the folded state to the plane state;
    displaying simultaneously, in response to the fifth operation, the preview interface and the gallery application interface in a third display area of the display, wherein the third display area faces the user when the display is in an unfolded state, and wherein the third display area is greater than the second display area,
    detecting, from the user, the deletion operation;
    deleting, in response to the deletion operation, the second multimedia file; and
    displaying the preview interface in the third display area.

2. The method of claim 1, wherein the gallery application interface comprises an edition control, and wherein the method further comprises:
    detecting, from the user, an edition operation corresponding to the edition control; and
    displaying, in response to the edition operation, an edition interface in the first display area.

3. The method of claim 1, wherein the gallery application interface comprises an edition control, and wherein the method further comprises:
    detecting, from the user, an edition operation corresponding to the edition control; and
    displaying, in response to the edition operation, an edition interface in the third display area.

4. The method of claim 1, wherein the gallery application interface comprises a back control, and wherein the method further comprises:
    detecting, from the user, a back operation corresponding to the back control; and
    displaying, in response to the back operation and on the gallery application interface, thumbnails of a plurality of multimedia files stored in the electronic device.

5. The method of claim 1, wherein the second operation instructs the electronic device to perform a continuous photographing action, wherein the first multimedia file comprises a plurality of continuously photographed multimedia files, and wherein the method further comprises displaying, on the gallery application interface, a plurality of thumbnails of the continuously photographed multimedia files.

6. The method of claim 5, further comprising:
  detecting, from the user, a sixth operation corresponding to a first thumbnail of the thumbnails; and
  displaying, in response to the sixth operation, a third multimedia file corresponding to the first thumbnail on the gallery application interface.

7. The method of claim 5, wherein the gallery application interface comprises a selection control, and wherein the method further comprises:
  detecting, from the user, a selection operation corresponding to the selection control;
  selecting, in response to the selection operation, N thumbnails from the thumbnails displayed on the gallery application interface, wherein N is a positive integer;
  detecting, from the user, the deletion operation;
  deleting, in response to the deletion operation, N files from the continuously photographed multimedia files corresponding to the selected N thumbnails; and
  displaying, on the gallery application interface, unselected thumbnails from the thumbnails of the continuously photographed multimedia files.

8. The method of claim 1, further comprising:
  starting, in response to the first operation, the camera application; and
  simultaneously displaying the preview interface and a recommendation interface in the first display area, wherein the recommendation interface displays photographing recommendation information.

9. The method of claim 1, wherein the first multimedia file is either a picture or a video.

10. An electronic device comprising:
  one or more cameras;
  a display configured to display a preview interface, wherein the display is foldable; and
  a memory configured to store instructions; and
  a processor coupled to the one or more cameras, the display, and the memory, wherein when executed by the processor, the instructions cause the electronic device to:
    detect, from a user, a first operation when the display is unfolded to a plane state;
    start, in response to the first operation, a camera application;
    display the preview interface of the camera application in a first display area of the display;
    detect, from the user, a second operation;
    control, in response to the second operation, the camera to perform a photographing action and generate a first multimedia file;
    display simultaneously, in response to the second operation, the preview interface and a gallery application interface in the first display area, wherein the gallery application interface displays the first multimedia file and comprises a deletion control;
    detect, from the user, a deletion operation corresponding to the deletion control;
    delete, in response to the deletion operation, the first multimedia file;
    display the preview interface in the first display area;
    detect, from the user, a third operation when the display is in a folded state;
    start, in response to the third operation, the camera application;
    display the preview interface in a second display area of the display, wherein the second display area faces the user when the display is in the folded state;
    detect, from the user, a fourth operation in the preview interface;
    control, in response to the second operation, the camera to perform the photographing action and generate a second multimedia file;
    detect, from the user, a fifth operation to unfold the display from the folded state to the plane state;
    display simultaneously, in response to the fifth operation, the preview interface and the gallery application interface in a third display area of the display, wherein the third display area faces the user when the display is in an unfolded state, and wherein the third display area is greater than the second display area;
    detect, from the user, the deletion operation;
    delete, in response to the deletion operation, the second multimedia file;
    display the preview interface in the third display area.

11. The electronic device of claim 10, wherein the gallery application interface comprises an edition control, and wherein when executed by the processor, the instructions further cause the electronic device to:
  detect, from the user, an edition operation corresponding to the edition control; and
  display, in response to the edition operation, an edition interface in the first display area.

12. The electronic device of claim 10, wherein the gallery application interface comprises an edition control, and wherein when executed by the processor, the instructions further cause the electronic device to:
  detect, from the user, an edition operation corresponding to the edition control; and
  display, in response to the edition operation, an edition interface in the third display area.

13. The electronic device of claim 10, wherein when executed by the processor, the instructions further cause the electronic device to:
  detect, from the user, a back operation, wherein the back operation corresponds to a back control; and
  display, in response to the back operation, thumbnails of a plurality of multimedia files stored in the electronic device on the gallery application interface.

14. The electronic device of claim 10, wherein the second operation instructs the electronic device to perform a continuous photographing action, wherein the first multimedia file comprises a plurality of continuously photographed multimedia files and wherein when executed by the processor, the instructions further cause the electronic device to display, on the gallery application interface, a plurality of thumbnails of the continuously photographed multimedia files.

15. The electronic device of claim 14, wherein when executed by the processor, the instructions further cause the electronic device to:
  detect, from the user, a selection operation, wherein the selection operation corresponds to a selection control;
  select, in response to the selection operation, N thumbnails from the thumbnails displayed on the gallery application interface, wherein N is a positive integer;
  detect, from the user, the deletion operation;
  delete, in response to the deletion operation, N files from the continuously photographed multimedia files corresponding to the selected N thumbnails; and
  display, on the gallery application interface, unselected thumbnails from the thumbnails of the continuously photographed multimedia files.

16. The electronic device of claim 15, wherein when executed by the processor, the instructions further cause the electronic device to:
- detect, from the user, a sixth operation corresponding to a first thumbnail of the thumbnails; and
- display, in response to the sixth operation, a third multimedia file corresponding to the first thumbnail on the gallery application interface.

17. The electronic device of claim 10, wherein when executed by the processor, the instructions further cause the electronic device to:
- start, in response to the first operation, the camera application; and
- simultaneously display the preview interface and a recommendation interface in the first display area, wherein the recommendation interface displays photographing recommendation information.

18. The electronic device of claim 10, wherein the first multimedia file is either a picture or a video.

19. A computer program product comprising computer-executable instructions that are stored on a non-transitory computer-readable storage medium and that, when executed by a processor, cause an electronic device to:
- detect, from a user, a first operation when a display of the electronic device is unfolded to a plane state, wherein the display is foldable;
- start, in response to the first operation, a camera application;
- display a preview interface of the camera application in a first display area of the display;
- detect, from the user, a second operation;
- perform, in response to the second operation, a photographing action and generating a first multimedia file;
- display simultaneously, in response to the second operation, the preview interface and a gallery application interface in the first display area, wherein the gallery application interface displays the first multimedia file and comprises a deletion control;
- detect, from the user, a deletion operation corresponding to the deletion control;
- delete, in response to the deletion operation, the first multimedia file;
- display the preview interface in the first display area;
- detect, from the user, a third operation when the display is in a folded state;
- start, in response to the third operation, the camera application;
- display the preview interface in a second display area of the display, wherein the second display area faces the user when the display is in the folded state;
- detect, from the user, a fourth operation;
- perform, in response to the fourth operation, the photographing action and generate a second multimedia file;
- detect, from the user, a fifth operation to unfold the display from the folded state to the plane state;
- display simultaneously, in response to the fifth operation, the preview interface and the gallery application interface in a third display area of the display, wherein the third display area faces the user when the display is in an unfolded state, and wherein the third display area is greater than the second display area;
- detect, from the user, the deletion operation;
- delete, in response to the deletion operation, the second multimedia file; and
- display the preview interface in the third display area.

20. The computer program product of claim 19, wherein the computer-executable instructions further cause the electronic device to:
- detect, from the user, an edition operation corresponding to the edition control; and
- display, in response to the edition operation, an edition interface in the first display area when the display is in the unfolded state or in the third display area when the display is in the folded state.

* * * * *